(12) United States Patent
Dojan et al.

(10) Patent No.: US 10,624,417 B2
(45) Date of Patent: Apr. 21, 2020

(54) ARTICLE OF FOOTWEAR WITH OUTSOLE BONDED TO CUSHIONING COMPONENT AND METHOD OF MANUFACTURING AN ARTICLE OF FOOTWEAR

(71) Applicant: NIKE, Inc., Beaverton, OR (US)

(72) Inventors: Frederick J. Dojan, Vancouver, WA (US); Brandon H. Workman, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 136 days.

(21) Appl. No.: 15/553,346

(22) PCT Filed: Feb. 23, 2016

(86) PCT No.: PCT/US2016/019119
§ 371 (c)(1),
(2) Date: Aug. 24, 2017

(87) PCT Pub. No.: WO2016/144531
PCT Pub. Date: Sep. 15, 2016

(65) Prior Publication Data
US 2018/0125160 A1  May 10, 2018
US 2019/0357628 A9  Nov. 28, 2019

Related U.S. Application Data

(63) Continuation of application No. 14/641,789, filed on Mar. 9, 2015, now Pat. No. 9,750,307, and a
(Continued)

(51) Int. Cl.
*A43B 13/20* (2006.01)
*A43B 13/12* (2006.01)
(Continued)

(52) U.S. Cl.
CPC ............ *A43B 13/122* (2013.01); *A43B 13/20* (2013.01); *B29D 35/122* (2013.01); *A43B 1/0018* (2013.01); *A43B 17/03* (2013.01)

(58) Field of Classification Search
CPC ..... A43B 13/20; A43B 13/203; A43B 13/206; A43B 13/122; A43B 7/145
(Continued)

(56) References Cited

U.S. PATENT DOCUMENTS

| 4,245,406 A | 1/1981 | Landay et al. |
| 5,220,737 A * | 6/1993 | Edington ............. A43B 1/0072 36/28 |

(Continued)

FOREIGN PATENT DOCUMENTS

| CN | 101600364 A | 12/2009 |
| CN | 101677652 A | 3/2010 |

(Continued)

OTHER PUBLICATIONS

International Search Report and Written Opinion for Application No. PCT/US2016/019119, dated May 10, 2016.
(Continued)

*Primary Examiner* — Ted Kavanaugh
(74) *Attorney, Agent, or Firm* — Quinn IP Law

(57) ABSTRACT

An article of footwear comprises a sole structure having a cushioning component defining an enclosed, fluid-filled chamber. The cushioning component has a top wall, a bottom wall, a medial side wall at a medial side of the article of footwear, and a lateral side wall at a lateral side of the article of footwear. The cushioning component includes a unitary outsole having a bottom portion, a medial side portion, and a lateral side portion. The bottom portion is bonded to the bottom wall, the medial side portion is bonded to the medial side wall, and the lateral side portion is bonded
(Continued)

to the lateral side wall. A method of manufacturing includes disposing the first and second polymer sheets and the outsole in a mold assembly and thermally bonding the outsole to the second polymer sheet, and the first and second polymer sheets to one another to form a chamber.

19 Claims, 63 Drawing Sheets

Related U.S. Application Data continuation of application No. 14/641,881, filed on Mar. 9, 2015, now Pat. No. 9,987,814, and a continuation of application No. 14/718,449, filed on May 21, 2015, now Pat. No. 9,801,428, and a continuation of application No. 14/725,701, filed on May 29, 2015, now Pat. No. 9,521,877.

(51) Int. Cl.
  B29D 35/12       (2010.01)
  A43B 1/00        (2006.01)
  A43B 17/03       (2006.01)

(58) Field of Classification Search
  USPC .................................................. 36/28, 29
  See application file for complete search history.

(56) References Cited

U.S. PATENT DOCUMENTS

| | | | |
|---|---|---|---|
| 5,771,606 A | 6/1998 | Litchfield et al. | |
| 5,987,781 A | 11/1999 | Pavesi et al. | |
| 6,178,663 B1 | 1/2001 | Schoesler | |
| 6,665,958 B2 | 12/2003 | Goodwin | |
| 6,837,951 B2* | 1/2005 | Rapaport | A43B 13/20 156/145 |
| 7,070,845 B2* | 7/2006 | Thomas | A43B 13/20 428/69 |
| 7,082,702 B2 | 8/2006 | Cretinon | |
| 7,131,218 B2 | 11/2006 | Schindler | |
| 7,555,851 B2 | 7/2009 | Hazenberg et al. | |
| 8,151,486 B2 | 4/2012 | Dua | |
| 8,241,451 B2 | 8/2012 | Rapaport et al. | |
| 8,789,294 B2 | 7/2014 | Dojan et al. | |
| 2001/0011427 A1 | 8/2001 | Seydel et al. | |
| 2003/0150131 A1* | 8/2003 | McManus | A43B 7/144 36/28 |
| 2005/0268492 A1 | 12/2005 | Fuerst | |
| 2007/0169379 A1 | 7/2007 | Hazenberg et al. | |
| 2007/0240332 A1 | 10/2007 | Ellis, III | |
| 2009/0139114 A1 | 6/2009 | Malek | |
| 2009/0178300 A1 | 7/2009 | Parker | |
| 2009/0293305 A1 | 12/2009 | Pelsue et al. | |
| 2010/0186265 A1 | 7/2010 | Evans et al. | |
| 2010/0263240 A1 | 10/2010 | Shelton et al. | |
| 2011/0252670 A1 | 10/2011 | Smith | |
| 2012/0260526 A1 | 10/2012 | Smith et al. | |
| 2012/0291312 A1 | 11/2012 | Peyton et al. | |
| 2013/0276329 A1 | 10/2013 | James | |
| 2014/0230272 A1 | 8/2014 | Feshbach et al. | |
| 2014/0230276 A1 | 8/2014 | Campos, II et al. | |
| 2014/0259742 A1 | 9/2014 | Wu et al. | |
| 2014/0259749 A1 | 9/2014 | Taylor et al. | |
| 2015/0040425 A1 | 2/2015 | Adams | |
| 2015/0040426 A1 | 2/2015 | Elder et al. | |
| 2015/0173456 A1 | 6/2015 | Rushbrook | |
| 2015/0257483 A1 | 9/2015 | Meschter et al. | |
| 2015/0272271 A1 | 10/2015 | Campos, II et al. | |
| 2015/0273778 A1 | 10/2015 | Campos, II et al. | |

FOREIGN PATENT DOCUMENTS

| | | |
|---|---|---|
| CN | 101842028 A | 9/2010 |
| CN | 101896087 A | 11/2010 |
| CN | 102202537 A | 9/2011 |
| CN | 104203029 A | 12/2014 |
| WO | 2014130626 A1 | 8/2014 |

OTHER PUBLICATIONS

American Society for Testing and Materials (ASTM) Standard D1003-00, Standard Test Method for Haze and Luminous Transmittance of Transparent Plastics, Jul. 2000, Book of Standards vol. 08.01, ASTM International, Pennsylvania, USA.

* cited by examiner

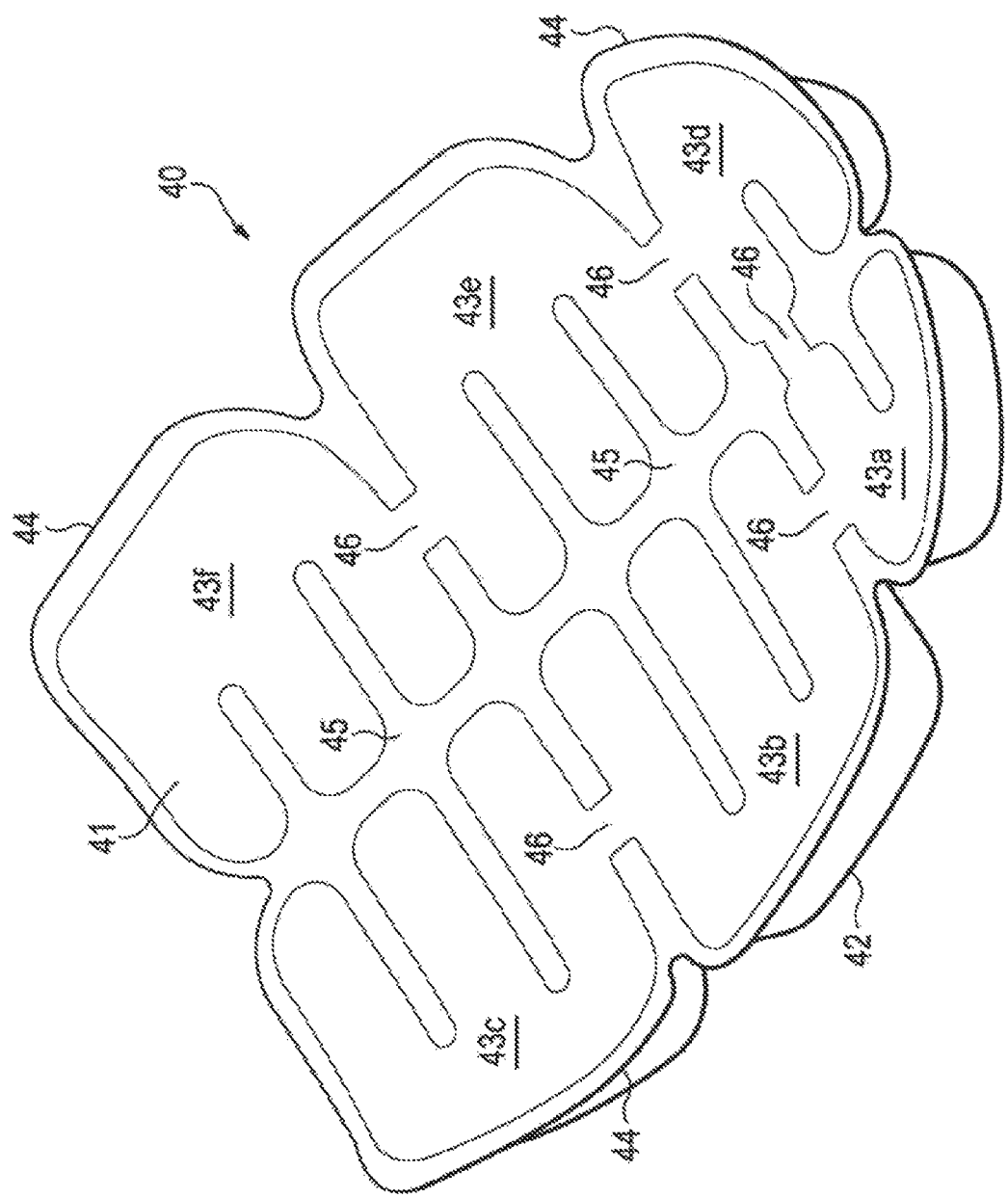

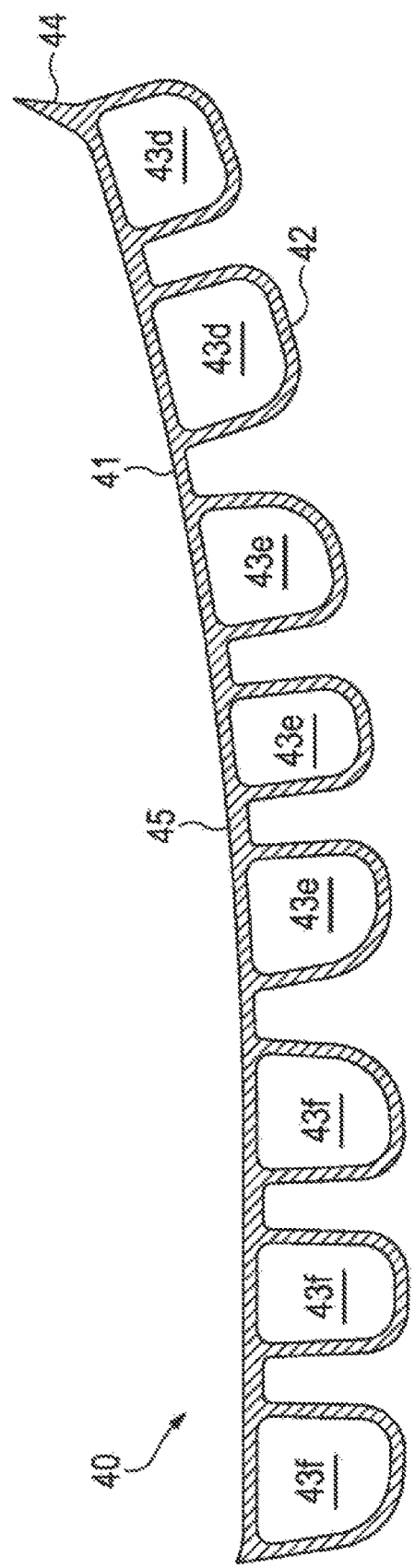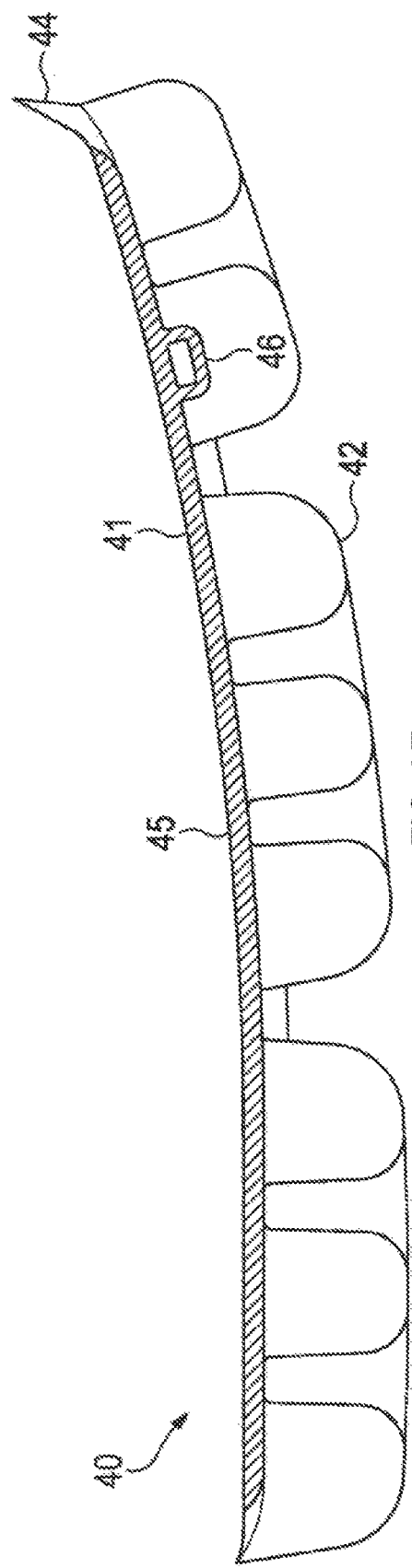

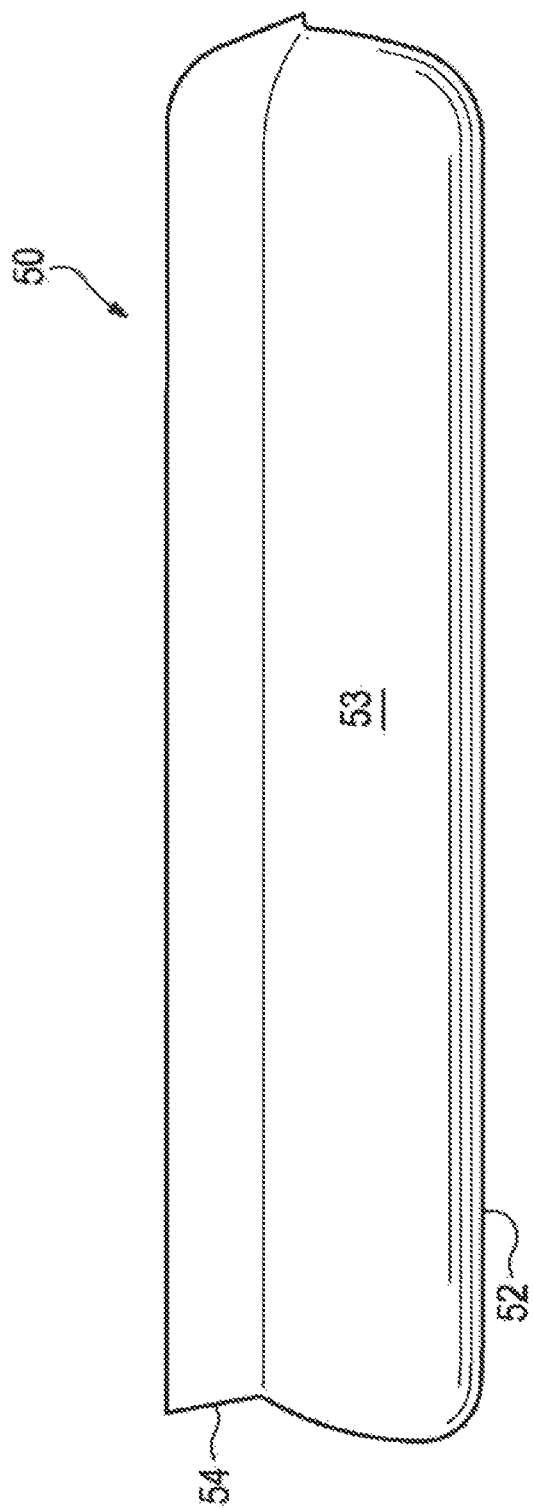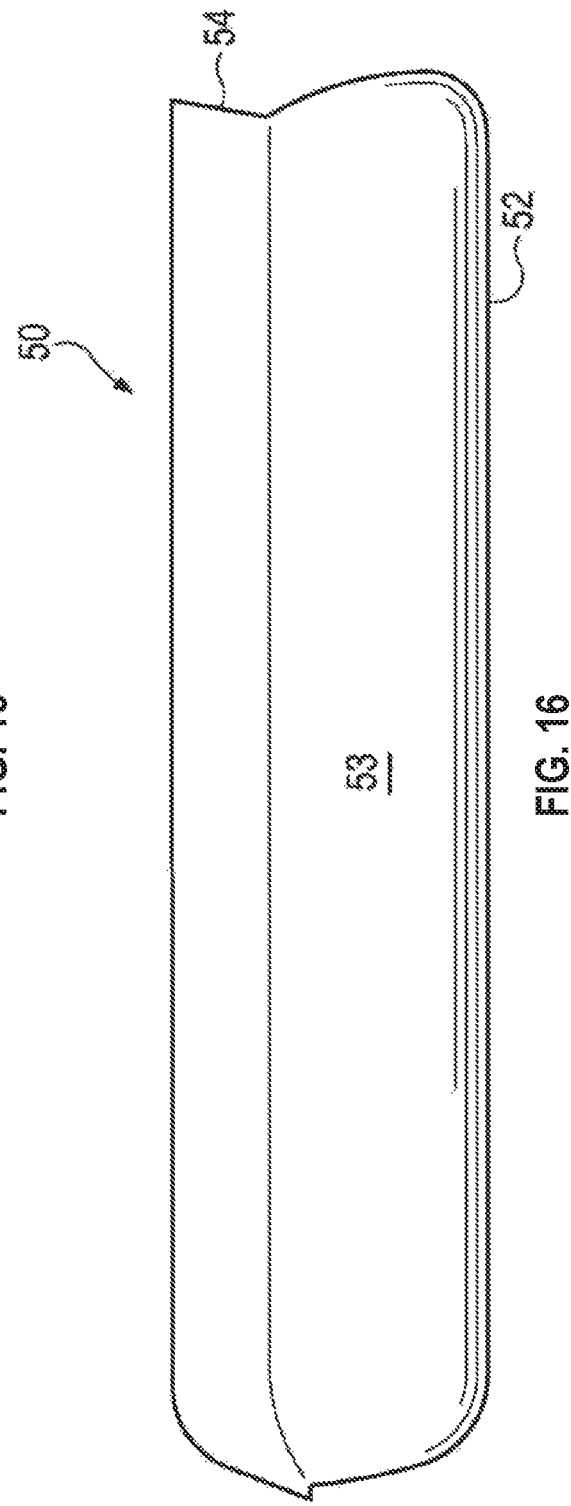

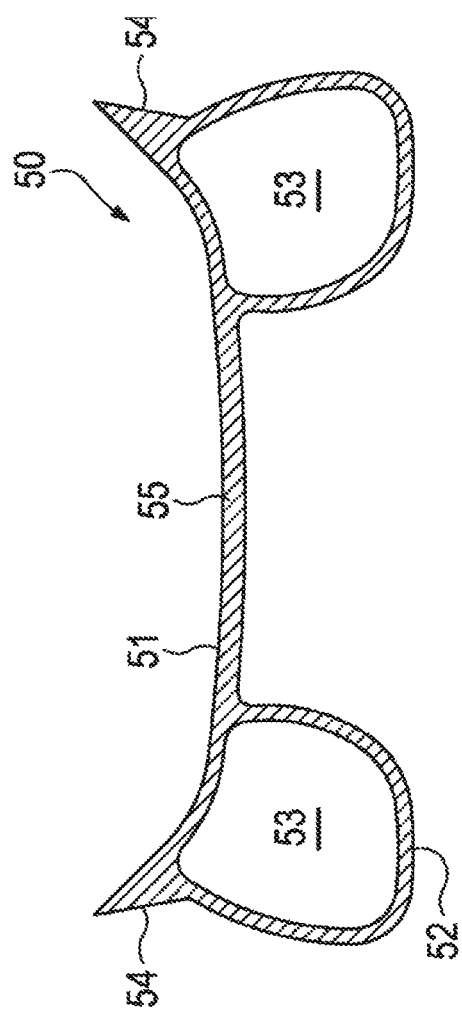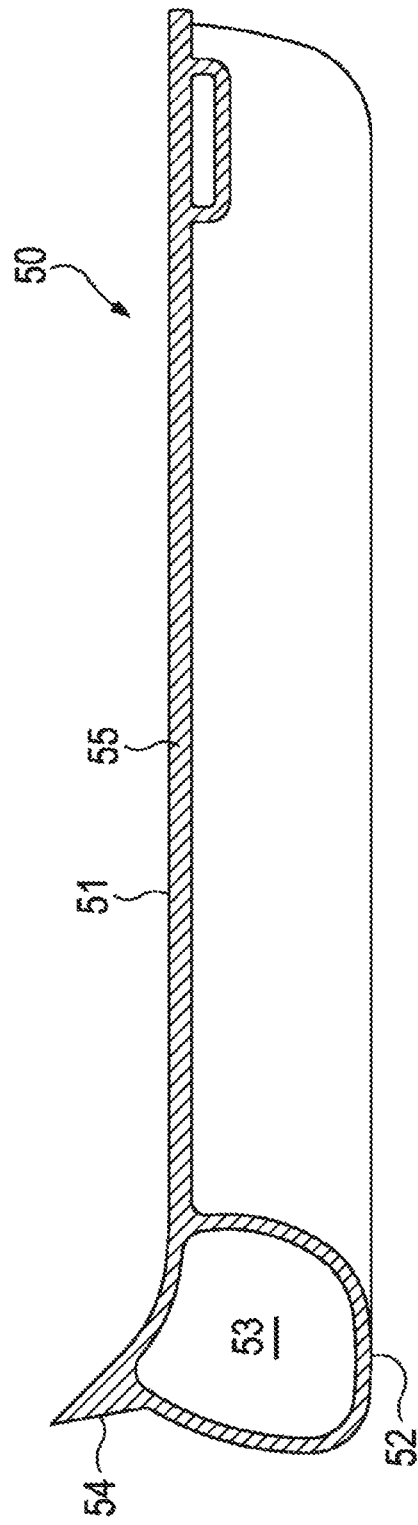
FIG. 17A
FIG. 17B

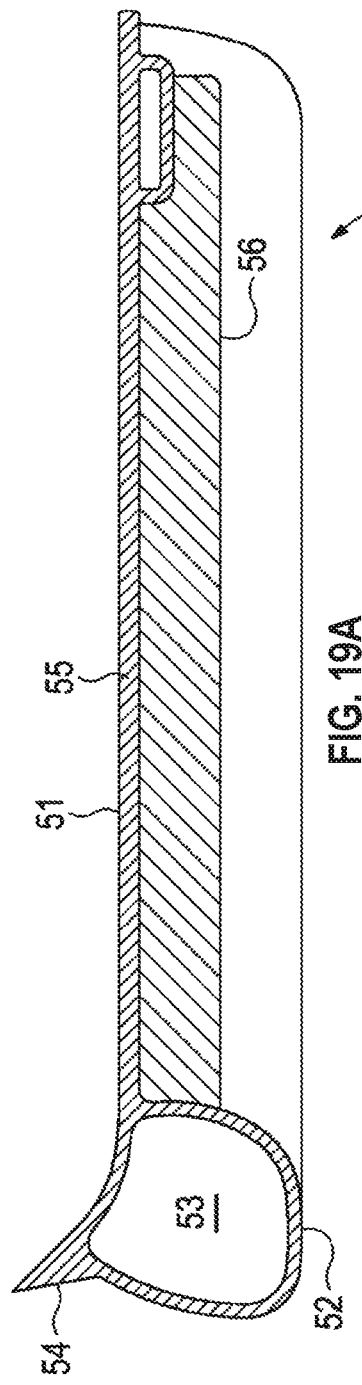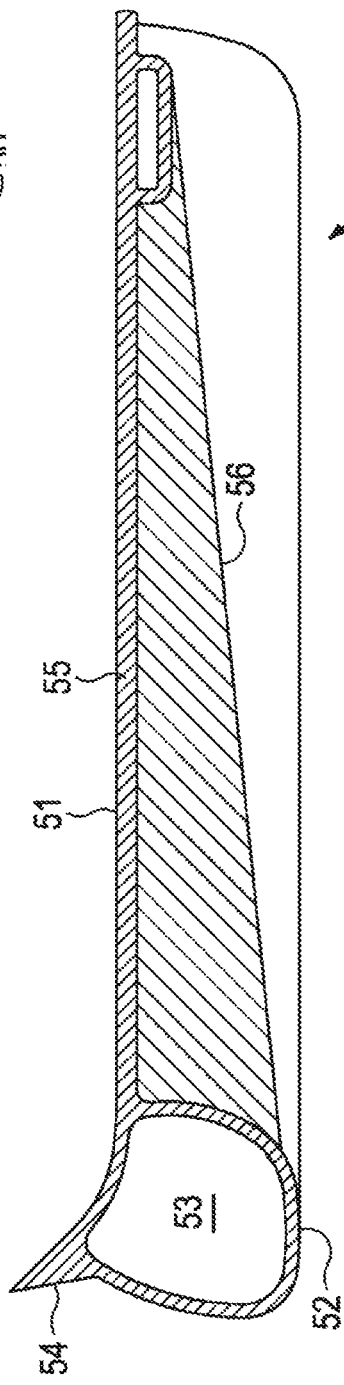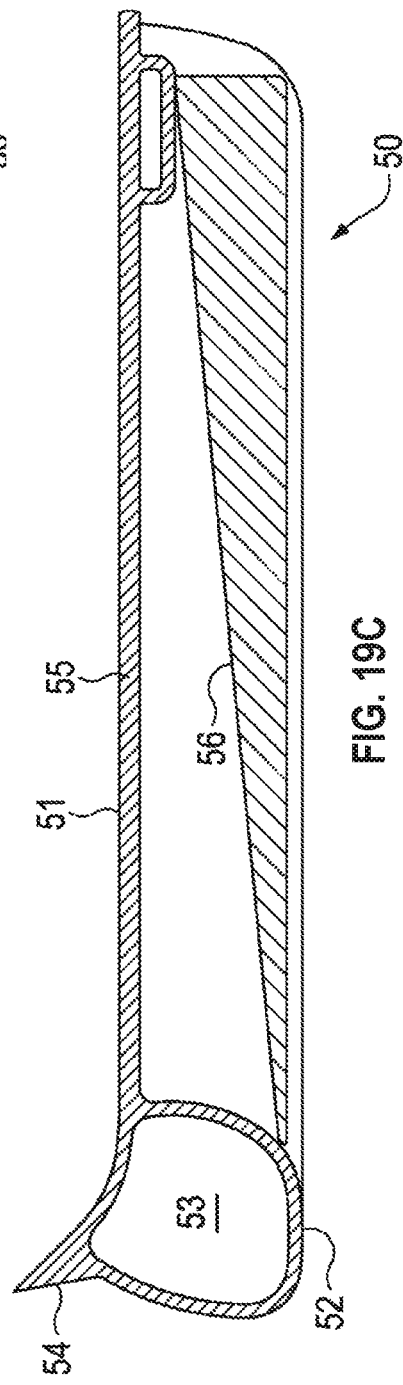

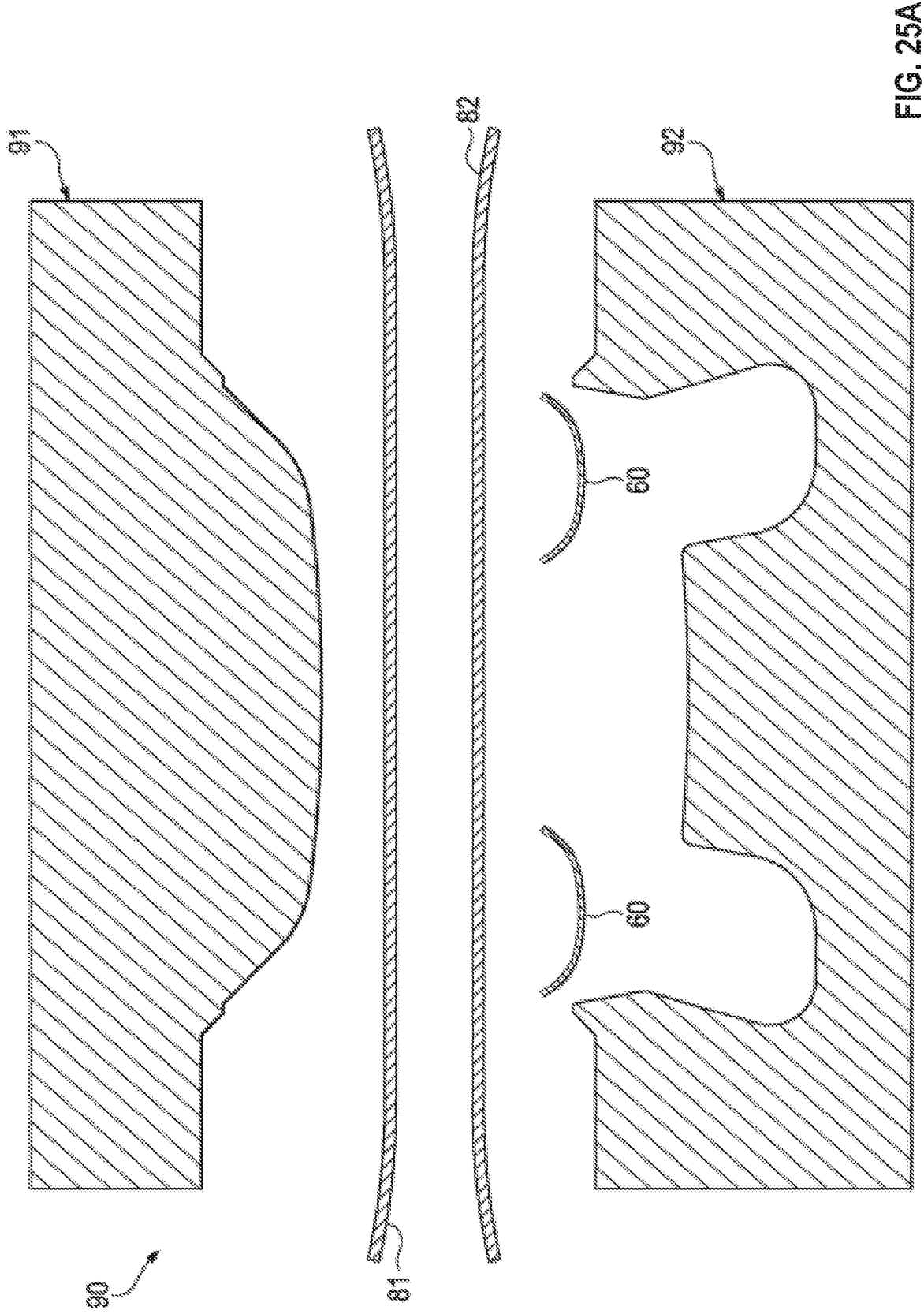

ARTICLE OF FOOTWEAR WITH OUTSOLE BONDED TO CUSHIONING COMPONENT AND METHOD OF MANUFACTURING AN ARTICLE OF FOOTWEAR

CROSS-REFERENCE TO RELATED APPLICATIONS

This application is a National Stage entry of International Patent Application No. PCT/US2016/019119, filed Feb. 23, 2016, which claims the benefit of priority to each of U.S. application Ser. No. 14/641,789, filed Mar. 9, 2015, U.S. application Ser. No. 14/641,881, filed Mar. 9, 2015, U.S. application Ser. No. 14/718,449, filed May 21, 2015, and U.S. application Ser. No. 14/725,701, filed May 29, 2015, now U.S. Pat. No. 9,521,877, issued Dec. 20, 2016, and all of which are incorporated by reference in their entirety.

TECHNICAL FIELD

The present teachings generally include an article of footwear with a cushioning component and an outsole.

BACKGROUND

Conventional articles of athletic footwear include two primary elements, an upper and a sole structure. The upper is generally formed from a plurality of elements (e.g., textiles, foam, leather, synthetic leather) that are stitched or adhesively bonded together to form an interior void for securely and comfortably receiving a foot. The sole structure incorporates multiple layers that are conventionally referred to as a sockliner, a midsole, and an outsole. The sockliner is a thin, compressible member located within the void of the upper and adjacent to a plantar (i.e., lower) surface of the foot to enhance comfort. The midsole is secured to the upper and forms a middle layer of the sole structure that attenuates ground reaction forces (i.e., imparts cushioning) during walking, running, or other ambulatory activities. The outsole forms a ground-contacting element of the footwear and is usually fashioned from a durable and wear-resistant rubber material that includes texturing to impart traction.

The primary material forming many conventional midsoles is a polymer foam, such as polyurethane or ethylvinylacetate. In some articles of footwear, the midsole may also incorporate a fluid-filled chamber that increases durability of the footwear and enhances ground reaction force attenuation of the sole structure. In some footwear configurations, the fluid-filled chamber may be at least partially encapsulated within the polymer foam, as in U.S. Pat. No. 5,755,001 to Potter, et al., U.S. Pat. No. 6,837,951 to Rapaport, and U.S. Pat. No. 7,132,032 to Tawney, et al. In other footwear configurations, the fluid-filled chamber may substantially replace the polymer foam, as in U.S. Pat. No. 7,086,180 to Dojan, et al. In general, the fluid-filled chambers are formed from a polymer material that is sealed and pressurized, but may also be substantially unpressurized or pressurized by an external source. In some configurations, textile or foam tensile members may be located within the chamber, or reinforcing structures may be bonded to an exterior surface of the chamber to impart shape to or retain an intended shape of the chamber.

Fluid-filled chambers suitable for footwear applications may be manufactured through various processes, including a two-film technique, thermoforming, and blowmolding. In the two-film technique, two planar sheets of polymer material are bonded together in various locations to form the chamber. In order to pressurize the chamber, a nozzle or needle connected to a fluid pressure source is inserted into a fill inlet formed in the chamber. Following pressurization, the fill inlet is sealed and the nozzle is removed. Thermoforming is similar to the two-film technique, but utilizes a heated mold that forms or otherwise shapes the sheets of polymer material during the manufacturing process. In blowmolding, a molten or otherwise softened elastomeric material in the shape of a tube (i.e., a parison) is placed in a mold having the desired overall shape and configuration of the chamber. The mold has an opening at one location through which pressurized air is provided. The pressurized air induces the liquefied elastomeric material to conform to the shape of the inner surfaces of the mold, thereby forming the chamber, which may then be pressurized.

BRIEF DESCRIPTION OF THE DRAWINGS

FIG. 4 is a perspective view of a forefoot component of the sole structure.

FIGS. 9A-9E are cross-sectional views of the forefoot component, as defined by section lines 9A-9E in FIG. 5.

FIG. 15 is a lateral side elevational view of the heel component.

FIG. 16 is a medial side elevational view of the heel component.

FIGS. 17A and 17B are cross-sectional views of the heel component, as defined by section lines 17A and 17B in FIG. 13.

FIGS. 19A-19C are cross-sectional views corresponding with FIG. 17B and depicting further configurations of the heel component.

FIGS. 25A-25D are cross-sectional views depicting a manufacturing process for forming the heel component utilizing the heel component mold, as defined along a section line 25 in FIGS. 23 and 24.

DESCRIPTION

Figure 1:
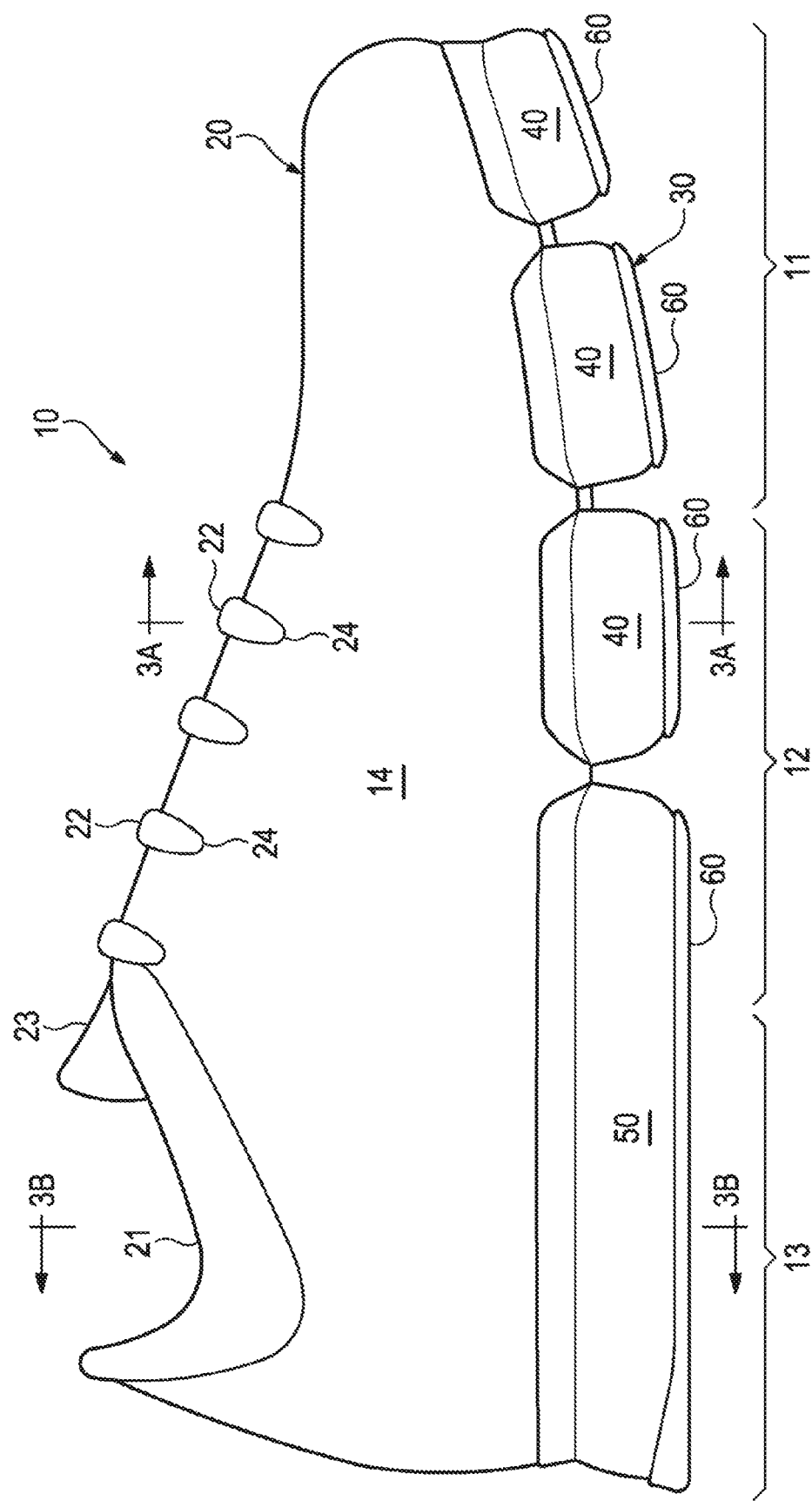
FIG. 1 is lateral side elevational view of an article of footwear.

An article of footwear is provided that comprises a sole structure having a cushioning component defining an enclosed, fluid-filled chamber. The cushioning component has a top wall, a bottom wall, a medial side wall, and a lateral side wall. The cushioning component includes a unitary outsole having a bottom portion, a medial side portion, and a lateral side portion. The bottom portion is bonded to the bottom wall, the medial side portion is bonded to the medial side wall, and the lateral side portion is bonded to the lateral side wall of the cushioning component. The unitary outsole thus wraps around the cushioning component by extending at least partially up the side portions from the bottom portion. The unitary outsole may also have integral tread portions on the bottom portion.

The bottom wall of the cushioning component may have a heel portion, a midfoot portion, and a forefoot portion. The bottom portion of the outsole may be coextensive with the bottom wall of the cushioning component.

In an embodiment, the cushioning component includes a first polymer sheet, and a second polymer sheet bonded to the first polymer sheet so that the first and second polymer sheets form a peripheral flange and define the fluid-filled chamber. The first polymer sheet includes the top wall, and the second polymer sheet includes the bottom wall, the medial side wall and the lateral side wall. The peripheral flange is nearer the top wall than the bottom wall.

The first polymer sheet and the second polymer sheet may be a variety of materials, such as multi-layer polymer sheets including thermoplastic polyurethane layers alternating with barrier layers that comprise a copolymer of ethylene and vinyl alcohol (EVOH) impermeable to fluid contained in the chamber.

The cushioning component may include a tether element joined to an inner surface of the top wall and to an inner surface of the bottom wall within the chamber. The tether element may be any of various configurations. In an embodiment, the tether element includes a first plate bonded to the inner surface of the top wall, a second plate bonded to the inner surface of the bottom wall, and a plurality of tethers secured to the first plate and to the second plate and extending in the fluid-filled chamber between the first plate and the second plate. The fluid-filled chamber may be pressurized by fluid in the chamber to place the tethers in tension.

In an embodiment, the cushioning component has a midfoot portion and a heel portion rearward of the midfoot portion. At least one of the lateral side portion and the medial side portion forms at least one peak disposed at or rearward of the midfoot portion and at least one valley disposed rearward of the at least one peak. The peak may be at least partially aligned with the tether element. In one embodiment, the cushioning component is substantially transparent. This allows the tethers to be viewed through the valley. Additionally, the outsole may be substantially transparent, such as a substantially transparent thermoplastic polyurethane. In such an embodiment, the tethers may be viewed both through the valley and through the peak.

The at least one peak may include multiple peaks and the at least one valley may include multiple valleys, with the peaks and the valleys arranged in alternating order such that the peaks are spaced apart from one another by the valleys. Additionally, the peaks may vary in height. For example, the cushioning component may have a heel portion, a midfoot portion, and a forefoot portion. A first one of the peaks may be at the heel portion and have a first height, and a second one of the peaks may be at the forefoot portion and have a second height less than the first height. A third one of the peaks may be at the midfoot portion and have a third height less than the second height. In an embodiment, the peaks and the valleys are fingers and notches, respectively.

The article of footwear may include an additional footwear component, such as an upper, that has a bottom surface, a lateral surface, and a medial surface. The bottom surface may be supported on the top wall of the cushioning component. The peripheral flange of the cushioning component may be bonded to the lateral surface and the medial surface of the additional footwear component. Accordingly, the outsole cups the cushioning component by wrapping at least partially up the sides of the cushioning component, and the peripheral flange of the cushioning component cups the additional footwear component by wrapping at least partially up the sides of the additional footwear component.

A method of manufacturing an article of footwear includes disposing first and second polymer sheets in a mold assembly, and disposing a preformed unitary outsole in the mold assembly adjacent the second polymer sheet. The preformed unitary outsole has a bottom portion, a medial side portion, and a lateral side portion, and may be preformed such as by injection molding. The method includes closing the mold assembly to compress the first and second polymer sheets and the outsole, and thermally bonding the first and second polymer sheets, and the outsole to one another in the mold assembly. The first and second polymer sheets are bonded to one another to form a cushioning component with a chamber. The cushioning component has a top wall, a bottom wall, a medial side wall, and a lateral side wall. The bottom portion of the outsole is bonded to the bottom wall, the medial portion of the outsole is bonded to the medial side wall, and the lateral side portion of the outsole is bonded to the lateral side wall.

In an embodiment, the cushioning component has a midfoot portion and a heel portion rearward of the midfoot portion, and at least one of the lateral side portion and the medial side portion forms at least one peak disposed at or rearward of the midfoot portion and at least one valley disposed rearward of the at least one peak. In such an embodiment, disposing the preformed unitary outsole adjacent the second polymer sheet may include aligning the at least one peak with the tether element.

In an embodiment, thermally bonding the first and second polymer sheets to one another in the mold assembly comprises establishing a peripheral flange, and the method further includes bonding the peripheral flange to side surfaces of an additional footwear component, such as an upper.

The method may include thermoforming the first and second polymer sheets in the mold assembly, such as to conform to shapes of the mold portions. The method may further include vacuum forming the first and second polymer sheets in the mold assembly, such as to draw the first polymer sheet against the surface of a portion of the mold and to draw the second polymer sheet against the outsole.

In an embodiment, the method includes disposing a tether element in a mold assembly between a first polymer sheet and a second polymer sheet. The chamber contains the tether element, and the tether element is bonded to inner surfaces of the first and second polymer sheets. The tether element may include a first plate thermally bonded to the top wall, a second plate thermally bonded to the bottom wall, and a plurality of tethers secured to the first plate and to the second plate and extending in the chamber between the first plate and the second plate. Thermally bonding the tether element to inner surfaces of the first and second polymer sheets may be simultaneous with thermally bonding the first and second polymer sheets to one another to establish a peripheral flange. The method may include inflating the chamber to place the tethers in tension.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

The following discussion and accompanying figures disclose various fluid-filled chambers. Concepts related to the chambers are disclosed with reference to footwear that is suitable for running. The chambers are not limited to footwear designed for running, however, and may be utilized with a wide range of athletic footwear styles, including basketball shoes, cross-training shoes, cycling shoes, football shoes, soccer shoes, tennis shoes, and walking shoes, for example. Various configurations of the chambers may be utilized with footwear styles that are generally considered to be non-athletic, including dress shoes, loafers, sandals, and boots. Accordingly, concepts related to the chambers may apply to a wide variety of footwear styles.

General Footwear Structure

Figure 2:
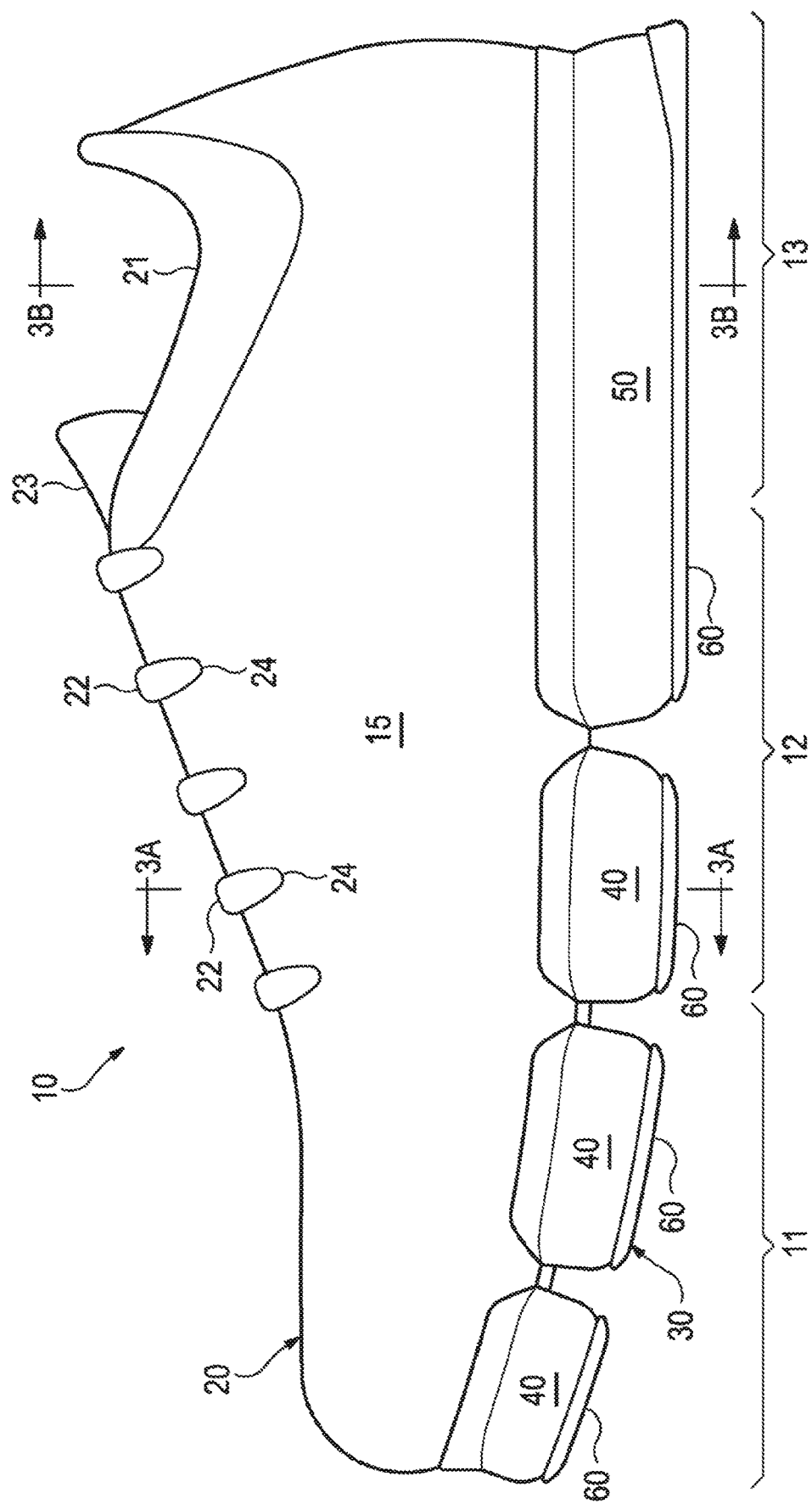
FIG. 2 is a medial side elevational view of the article of footwear.

An article of footwear 10 is depicted in FIGS. 1 and 2 as including an upper 20 and a sole structure 30. Upper 20 provides a comfortable and secure covering for a foot of a wearer. As such, the foot may be located within upper 20 to effectively secure the foot within footwear 10 or otherwise unite the foot and footwear 10. Sole structure 30 is secured to a lower area of upper 20 and extends between the foot and the ground to attenuate ground reaction forces (i.e., cushion the foot), provide traction, enhance stability, and influence the motions of the foot, for example. In effect, sole structure 30 is located under the foot and supports the foot.

For reference purposes, footwear 10 may be divided into three general regions: a forefoot region 11, a midfoot region 12, and a heel region 13. Forefoot region 11 generally includes portions of footwear 10 corresponding with toes of the foot and the joints connecting the metatarsals with the phalanges. Midfoot region 12 generally includes portions of footwear 10 corresponding with an arch area of the foot. Heel region 13 generally corresponds with rear portions of the foot, including the calcaneus bone. Footwear 10 also includes a lateral side 14 and a medial side 15, which correspond with opposite sides of footwear 10 and extend through each of regions 11-13. More particularly, lateral side 14 corresponds with an outside area of the foot (i.e. the surface that faces away from the other foot), and medial side 15 corresponds with an inside area of the foot (i.e., the surface that faces toward the other foot). Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to upper 20, sole structure 30, and individual elements thereof.

Figure 3A:
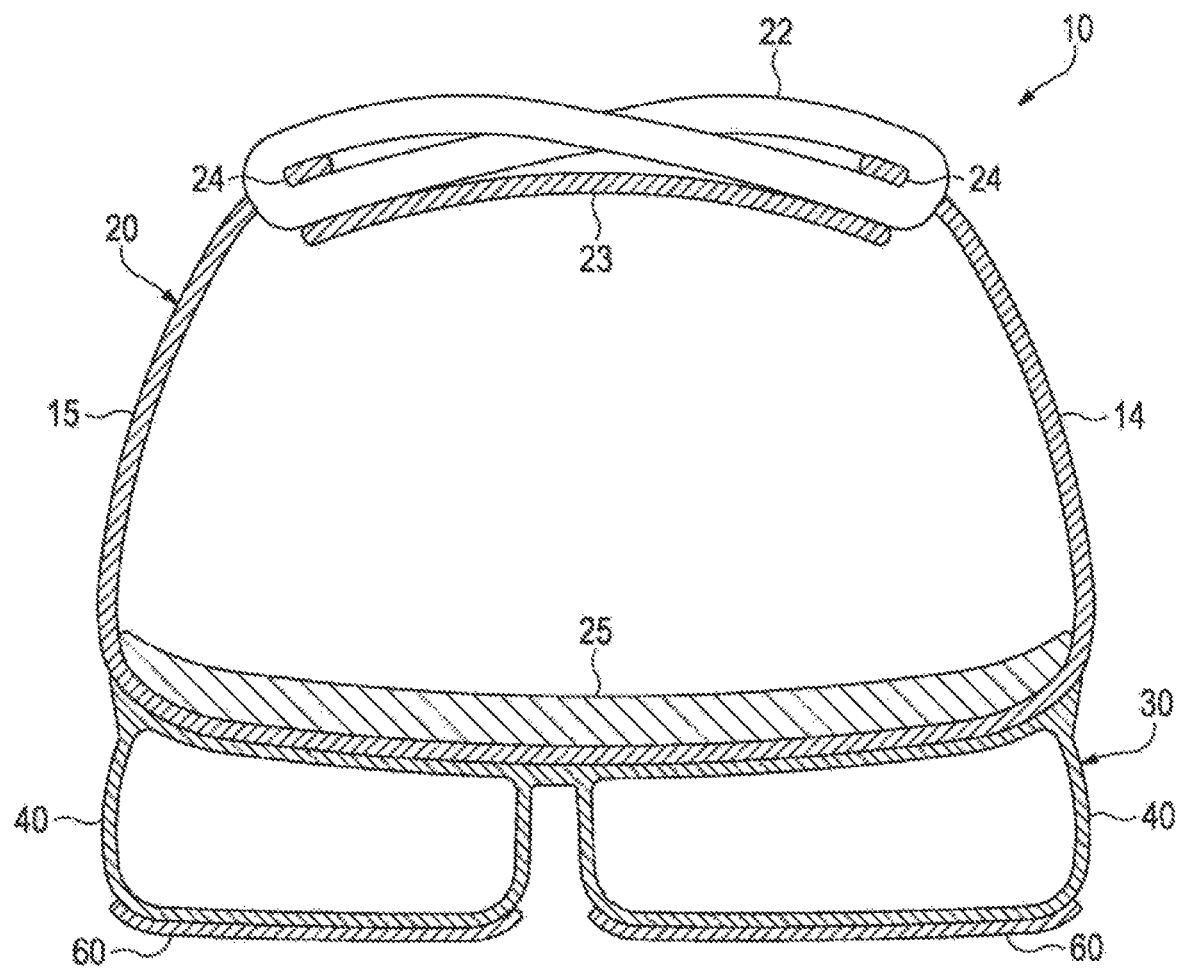
FIGS. 3A and 3B are cross-sectional views of the article of footwear, as defined by section lines 3A and 3B in FIGS. 1 and 2.
Figure 3B:
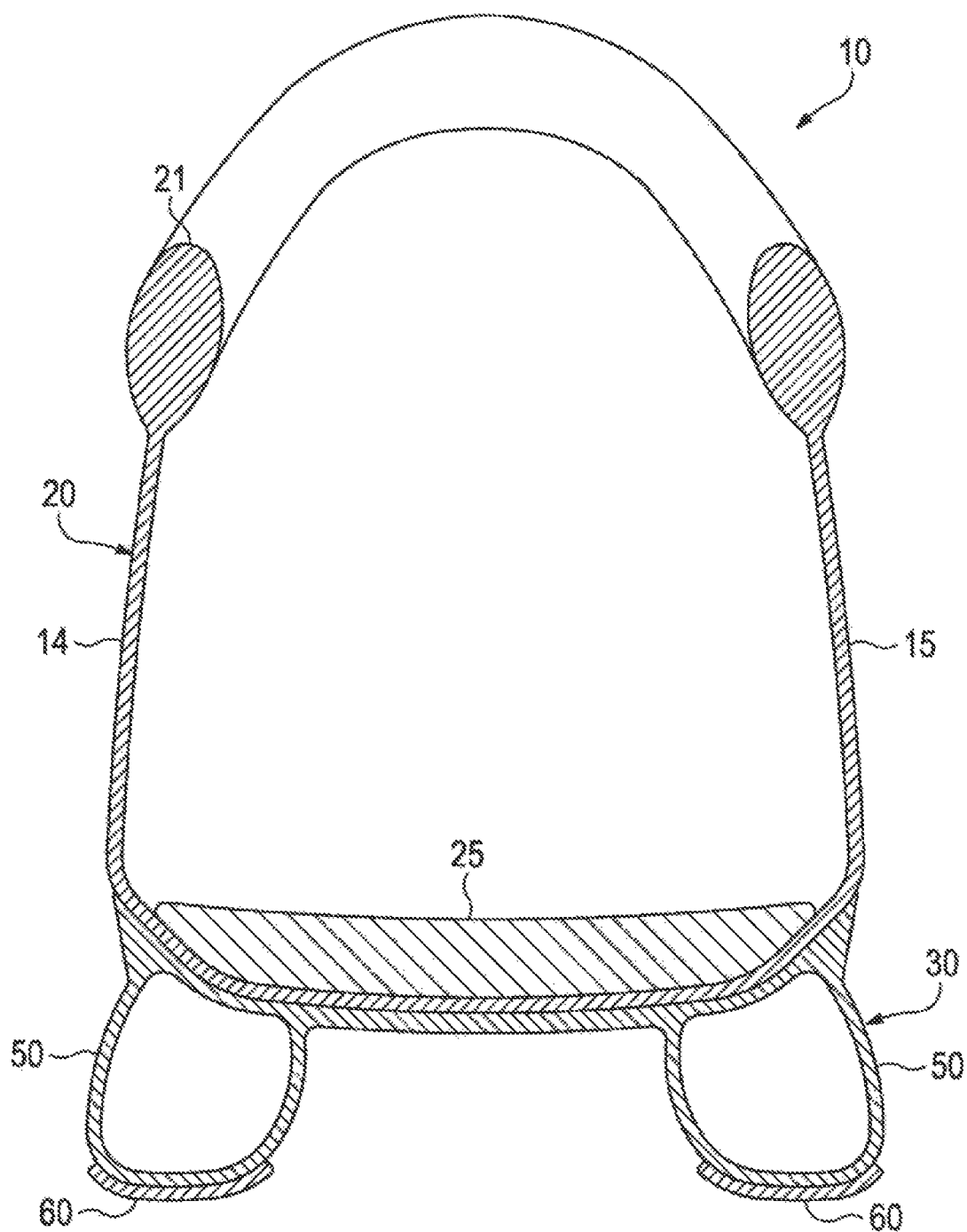

Upper 20 is depicted as having a substantially conventional configuration. A majority of upper 20 incorporates various material elements (e.g., textiles, foam, leather, and synthetic leather) that are stitched or adhesively bonded together to form an interior void for securely and comfortably receiving a foot. The material elements may be selected and located in upper 20 to selectively impart properties of durability, air-permeability, wear-resistance, flexibility, and comfort, for example. The void in upper 20 is shaped to accommodate the foot. When the foot is located within the void, therefore, upper 20 extends along a lateral side of the foot, along a medial side of the foot, over the foot, around the heel, and under the foot. An ankle opening 21 in heel region 13 provides the foot with access to the void. A lace 22 extends over a tongue 23 and through various lace apertures 24 or other lace-receiving elements in upper 20. Lace 22 and the adjustability provided by tongue 23 may be utilized in a conventional manner to modify the dimensions of ankle opening 21 and the interior void, thereby securing the foot within the interior void and facilitating entry and removal of the foot from the interior void. As depicted in FIGS. 3A and 3B, upper 20 also includes a sockliner 25 that is located within the void and positioned to extend under a lower surface of the foot to enhance the comfort of footwear 10. Further configurations of upper 20 may also include one or more of (a) a toe guard positioned in forefoot region 11 and formed of a wear-resistant material, (b) a heel counter located in heel region 13 for enhancing stability, and (c) logos, trademarks, and placards with care instructions and material information. Given that various aspects of the present discussion primarily relate to sole structure 30, upper 20 may exhibit the general configuration discussed above or the general configuration of practically any other conventional or non-conventional upper. Accordingly, the structure of upper 20 may vary significantly within the scope of the present disclosure.

The primary elements of sole structure 30 are a forefoot component 40, a heel component 50, and an outsole 60. Each of components 40 and 50 are directly secured to a lower area of upper 20 and formed from a polymer material that encloses a fluid, which may be a gas, liquid, or gel. During walking and running, for example, components 40 and 50 compress between the foot and the ground, thereby attenuating ground reaction forces. That is, components 40 and 50 are inflated and generally pressurized with the fluid to cushion the foot. Outsole 60 is secured to lower areas of components 40 and 50 and may be formed from a wear-resistant rubber material that is textured to impart traction. In some configurations, sole structure 30 may include a foam layer, for example, that extends between upper 20 and one or both of components 40 and 50, or a foam element may be located within indentations in the lower areas of components 40 and 50. In other configurations, sole structure 30 may incorporate plates, moderators, lasting elements, or motion control members that further attenuate forces, enhance stability, or influence the motions of the foot.

Forefoot Component

Forefoot component 40 is depicted separate from footwear 10 in FIGS. 4-8 and is formed from a polymer material that defines a first or upper surface 41 and an opposite second or lower surface 42. Whereas upper surface 41 is secured to upper 20, different portions of lower surface 42 are either secured to outsole 60 or exposed and visible from an exterior surface of footwear 10. As described in greater detail below, upper surface 41 and lower surface 42 are formed from polymer layers during a molding or thermoforming process. More particularly, upper surface 41 is formed from one polymer layer, and lower surface 42 is formed from another polymer layer.

Forefoot component 40 includes a plurality of chambers 43a-43f, a flange 44, a web area 45, and various conduits 46. Chambers 43a-43f enclose or contain the fluid within forefoot component 40. More particularly, chambers 43a-43f are areas of forefoot component 40 where the polymer layers forming surfaces 41 and 42 are separated or spaced from each other to form voids for enclosing the fluid within forefoot component 40. Flange 44 extends around a peripheral area of forefoot component 40 and is formed from portions of the polymer layers that are molded and joined together. Web area 45 extends through a central area of forefoot component 40 and between the various chambers 43. Like flange 44, web area 45 is formed from portions of the polymer layers that are joined together. Although adhesive bonding may be utilized in joining the polymer layers in flange 44 and web area 45, thermal bonding may also join the polymer layers during the molding or thermoforming process. Conduits 46 extend between chambers 43a-43f and form channels that place chambers 43a-43f in fluid communication. That is, the fluid within forefoot component 40 may be transferred between chambers 43a-43f by passing through conduits 46. Like chambers 43a-43f, conduits 46 are formed from separated or spaced portions of the polymer layers forming surfaces 41 and 42.

Chambers 43a-43f are the primary components of forefoot component 40 that enclose the fluid. In areas immediately adjacent to each of chambers 43a-43f, the polymer layers forming surfaces 41 and 42 are joined to each other to form a bond that seals the fluid within forefoot component 40. More particularly, flange 44 and web area 45 cooperatively bound or otherwise extend around each of chambers 43a-43f and are formed from areas of the polymer layers that are bonded to each other, thereby sealing the fluid within chambers 43. Although chambers 43a-43f effectively contain the fluid within forefoot component 40, each of chambers 43a-43f are placed in fluid communication through conduits 46. In further configurations of footwear 10, however, one or more of conduits 46 may be absent to segregate the fluid in one of chambers 43a-43f from the fluid in another one of chambers 43a-43f, and the fluids may be pressurized differently. In other configurations, forefoot component 40 may be a part of a fluid system that, for example, pumps fluid into chambers 43a-43f to tailor the pressure within forefoot component 40 to the preferences or running style of the wearer.

Upper surface 41 has a generally concave, rounded, and relatively smooth configuration that supports the foot when footwear 10 is worn. Referring to the cross-sections of FIGS. 9A-9C, for example, the rounded configuration of upper surface 41 lays on a curved plane that is cooperatively formed by chambers 43a-43f, flange 44, web area 45, and conduits 46. In contrast, lower surface 42 is more contoured, with chambers 43a-43f extending or protruding downward from flange 44 and web area 45. In effect, therefore, the portions of chambers 43a-43f that protrude downward form independent supports or cushioning elements in sole structure 30.

Undulations or other discontinuities in first surface 41, which supports the foot, that are greater than one millimeter may decrease footwear comfort. The pressure of the fluid within chambers 43a-43f tends to press outward upon the polymer layers forming surfaces 41 and 42, which causes areas of forefoot component 40 corresponding with chambers 43a-43f to bulge or protrude outward. Although first surface 41 may exhibit some undulations adjacent to chambers 43a-43f, the size of these undulations is generally limited to less than one millimeter, thereby enhancing the comfort of footwear 10.

Various features of forefoot component 40 operate cooperatively to limit the size of the undulations in first surface 41, including (a) a thickness of the polymer material forming chambers 43a-43f, (b) the pressure of the fluid within chambers 43a-43f, and (c) the width of chambers 43a-43f between spaced portions of web area 45. In general, as the thickness of the polymer material forming chambers 43a-43f increases, or as the pressure of the fluid within chambers 43a-43f decreases, the degree to which chambers 43a-43f bulge or protrude outward and form undulations decreases. For footwear applications, a polymer thickness of 0.75 millimeter (0.03 inch) and a fluid pressure of 138 kilopascals (20 pounds per square inch) provides a suitable degree of compliance, force attenuation, and other properties. Given this thickness and pressure, having a maximum width of less than 14 millimeters, and possibly less than 12 millimeters, in chambers 43a-43f limits the size of undulations in first surface 41 to less than one millimeter.

Figure 5:
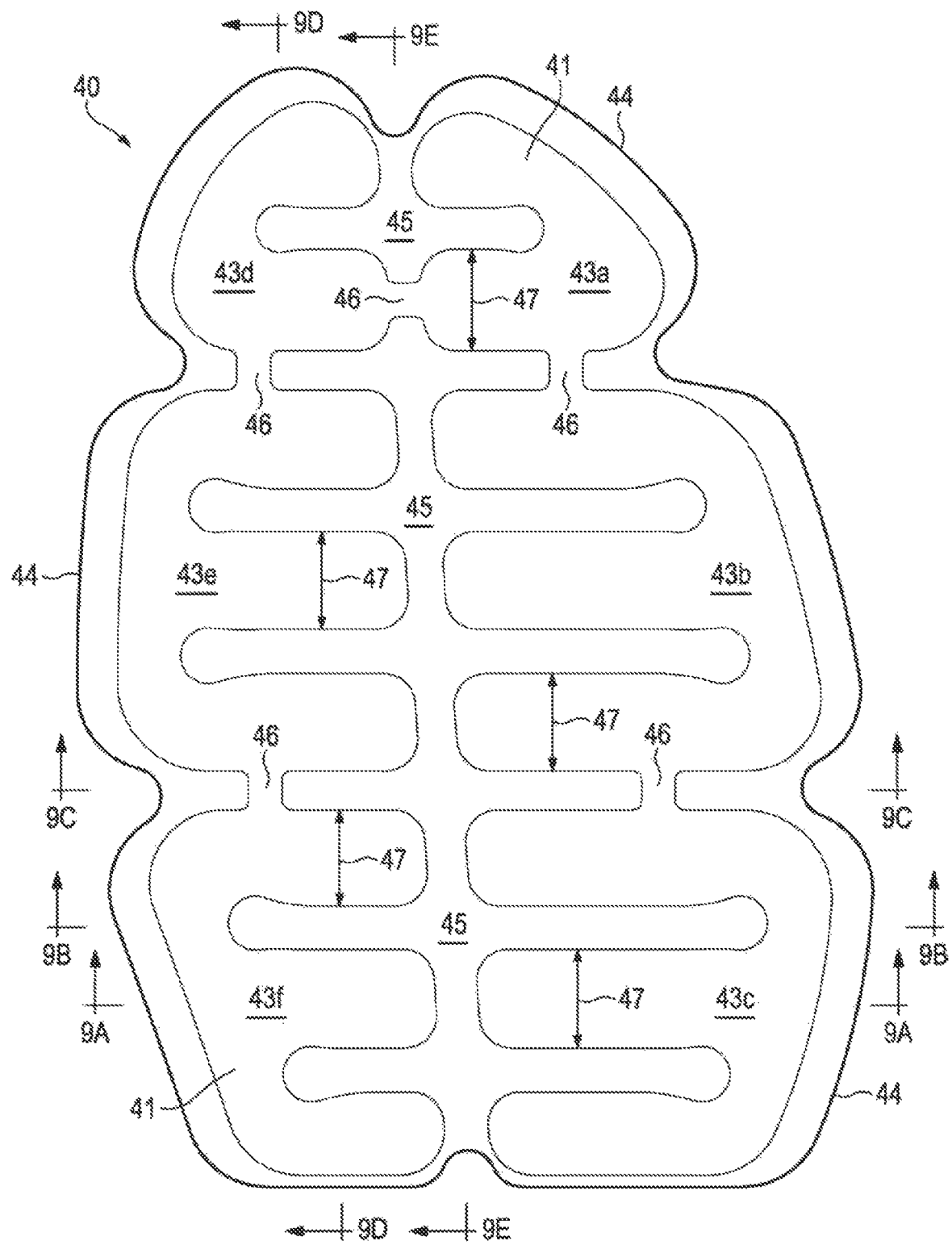
FIG. 5 is a top plan view of the forefoot component.
Figure 6:
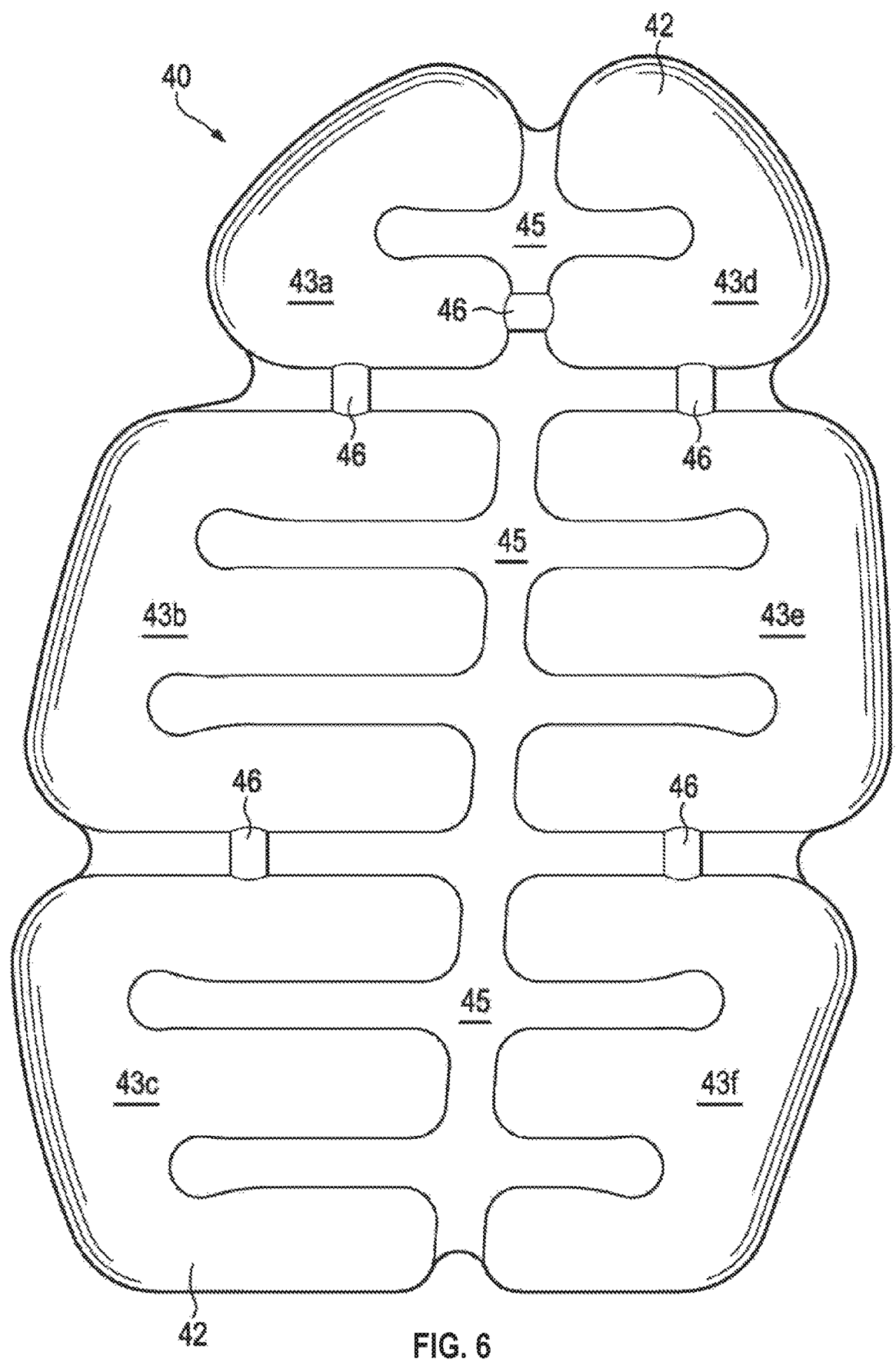
FIG. 6 is a bottom plan view of the forefoot component.
Figure 7:
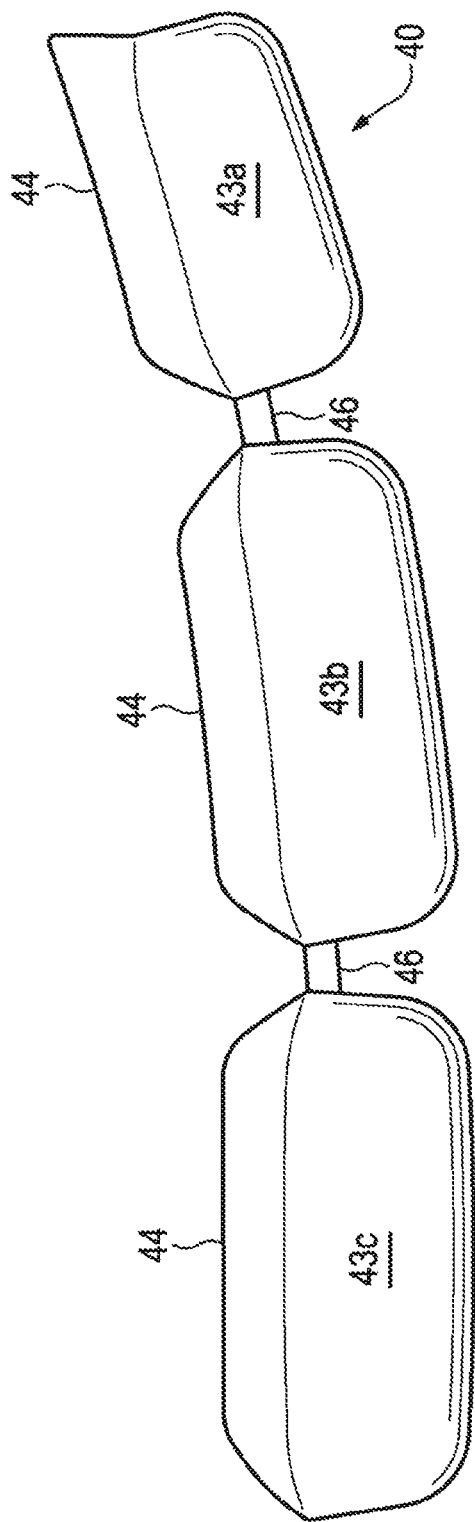
FIG. 7 is a lateral side elevational view of the forefoot component.
Figure 8:
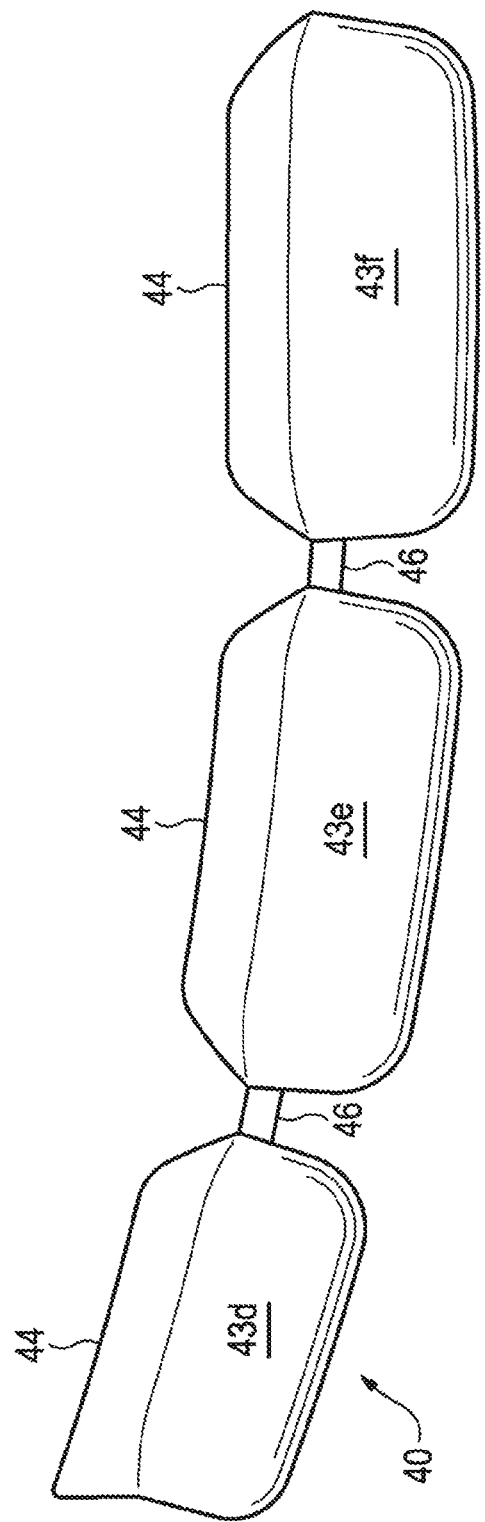
FIG. 8 is a medial side elevational view of the forefoot component.

A width dimension 47 is depicted in FIGS. 5, 6, and 9D as extending (a) across various portions of chambers 43a-43f, (b) between spaced portions of web area 45, and (c) in a direction that is generally parallel to the most proximal area of first surface 41. Chambers 43a-43f have E-shaped and C-shaped configurations. Whereas some areas of chambers 43a-43f are located adjacent to flange 44, other areas of chambers 43a-43f extend inward and toward a central area of forefoot component 40. In the example of subchambers 43b and 43e, which are E-shaped, each has three parallel and generally linear segments that extend inward and are bounded on opposite sides by portions of web area 45. As such, width dimension 47 may be measured between the spaced portions of web area 45 that are located on opposite sides of the three parallel segments. In the example of subchambers 43c and 43f, which are also E-shaped, each has two parallel and generally linear segments that extend inward and are bounded by web area 45. As such, width dimension 47 may be measured between the spaced portions of web area 45 that are located on opposite sides of two parallel segments. In the example of subchambers 43a and 43d, which are C-shaped, each has one generally curved segment that extends inward and is bounded by web area 45. As such, width dimension 47 may be measured between the spaced portions of web area 45 that are located on opposite sides of the segments. Note that portions of subchambers 43a-43f that are immediately adjacent to flange 44 may also have a maximum width of less than 14 millimeters, and possibly less than 12 millimeters, but may also have a maximum width greater than 14 millimeters.

In addition to E-shaped and C-shaped configurations, any of chambers 43a-43f may be structured to have F, H, I, J, K, L, M, N, S, T, U, V, W, X, and Y-shaped configurations, in addition to various other shapes, whether following letters of the alphabet or being non-regular. In general, however, one or more of chambers 43a-43f will have a shape formed from relatively narrow and elongate segments having a maximum width of less than 14 millimeters, and possibly less than 12 millimeters. Moreover, these segments will extend into a central area of forefoot component 40 and be bounded on opposite sides by portions of web area 45.

Although width dimension 47 of chambers 43a-43f may be limited to less than 14 or 12 millimeters, the height and length of the various segments forming chambers 43a-43f may vary considerably. In general and with all other factors being the same, as the volume of each of chambers 43a-43f increases, the degree of cushioning or force attenuation provided by forefoot component 40 also increases. By maximizing the heights and lengths of portions or segments in chambers 43a-43f, cushioning or force attenuation properties may also be enhanced. As an example, in some configurations of forefoot component 40, the height of chambers 43a-43f may be more than fourteen millimeters, with the height being measured in a direction that is perpendicular to the width dimension 47 and at a location of width dimension 47.

Chambers 43 are located along or adjacent to opposite sides of forefoot component 40. When incorporated into footwear 10, a first group of chambers 43a-43c are located on lateral side 14 and a second group of chambers 43d-43f are located on medial side 15. In effect, therefore, the two groups are located adjacent to sides 14 and 15, and web area 45 extends between the groups. In other configurations of forefoot component 40, however, chambers 43 may be positioned in other arrangements or locations within forefoot component 40. One or more of chambers 43 may also extend between opposite sides of forefoot component 40, rather than being positioned adjacent to one side of forefoot component 40.

Flange 44 forms a peripheral seam or bonded area that joins the polymer layers forming surfaces 41 and 42 and assists with sealing the fluid within forefoot component 40 and the voids of chambers 43a-43f. In general, flange 44 has a height of at least five millimeters and extends in an outward direction from a remainder of forefoot component 40. Relative to the voids within chambers 43a-43f flange 44 extends outward from the voids. More particularly, flange 44 extends in an upward direction from the peripheral area or an upper area of forefoot component 40. Whereas the area of flange 44 corresponding with first surface 41 faces toward and is secured to upper 20, the area of flange 44 corresponding with second surface 42 faces away from and forms a portion of an exterior surface of footwear 10. More simply, one surface of flange 44 is secured to upper 20, and the opposite surface of flange 44 faces away from upper 20. Given that flange 44 is a relatively thick and stiff portion of forefoot component 40, flange 44 may enhance the stability of footwear 10. Flange 44 may also provide a defined lasting margin during steps of the manufacturing process that involve bonding upper 20 to forefoot component 40.

Figure 9A:
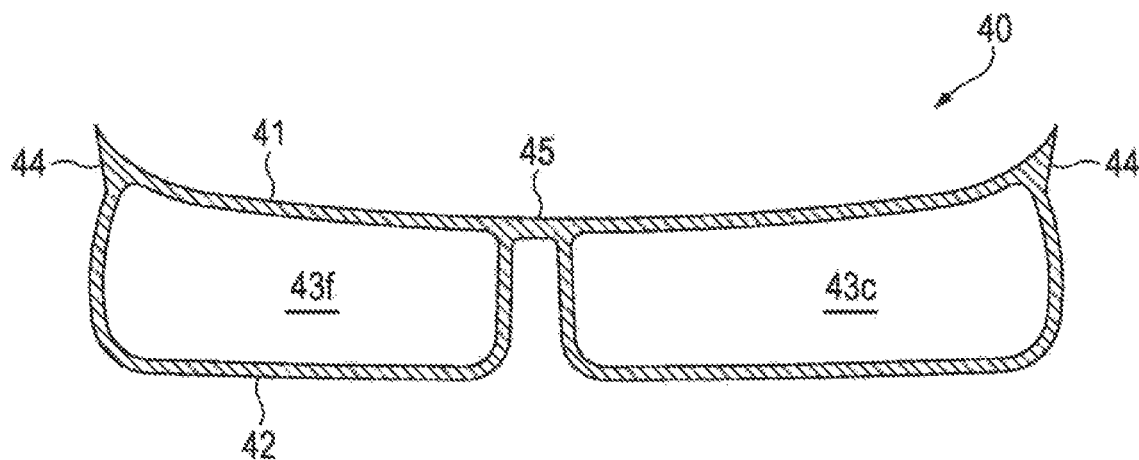
Figure 9B:
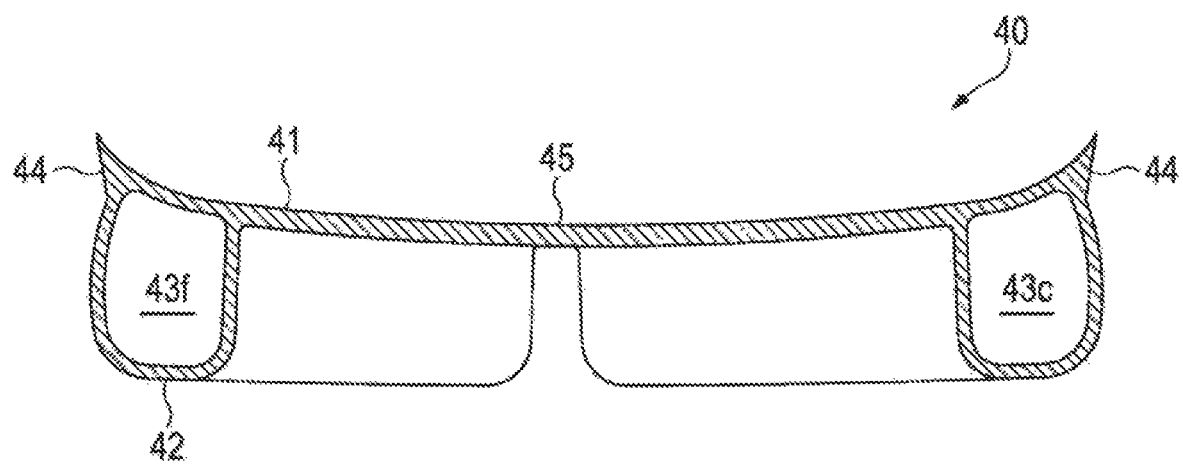

Referring to the cross-sections of FIGS. 9A and 9B, for example, flange 44 is depicted as having a tapered configuration, with the portions of flange 44 located adjacent to the voids in chambers 43a-43f having greater thickness than the portions of flange 44 that are spaced from the voids and form a distal end. In effect, therefore, flange 44 has a tapered configuration with a first thickness adjacent to the voids and a second thickness spaced away from the voids, the first thickness being greater than the second thickness. Moreover, thickness of the portions of flange 44 located adjacent to the voids (i.e., the first thickness) is greater than either of (a) the thickness of web area 45 in the central area of forefoot component 40 and (b) the sum of the thicknesses of the polymer layers forming surfaces 41 and 42. Although flange 44 is formed from the polymer layers forming surfaces 41 and 42 and web area 45, flange 44 has a greater thickness than both of the polymer layers combined. As noted above, flange 44 is a relatively thick and stiff portion of forefoot component 40. A portion of the stiffness may be due, therefore, to the greater thickness of flange 44 adjacent to chambers 43a-43f. A process for forming flange 44 to have this configuration will be discussed below.

Figure 9C:
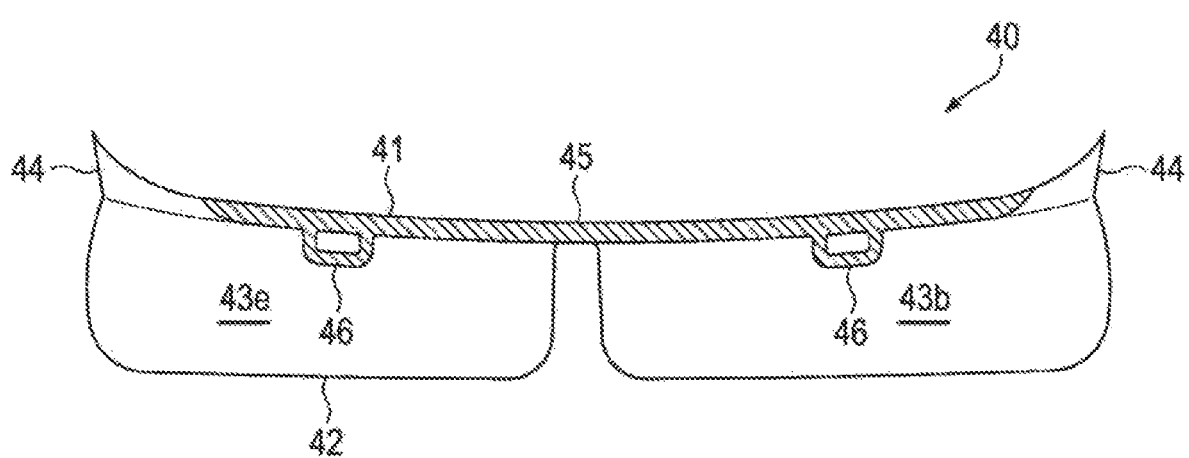

Although flange 44 is present in areas adjacent to chambers 43a-43f flange 44 is depicted as being absent or having minimal height and thickness in areas between chambers 43a-43f as depicted in FIGS. 9C and 9E. This configuration provides enhanced flexibility to forefoot component 40. More particularly, given that flange 44 is a relatively thick and stiff portion of forefoot component 40, areas where flange 44 are absent or minimized may have greater flexibility.

Web area 45 extends throughout a central area of forefoot component 40 to separate and interconnect the various chambers 43a-43f. In this position, web area 45 forms a bonded area that joins the polymer layers forming surfaces 41 and 42 and also assists with sealing the fluid within the voids of chambers 43a-43f. Whereas chambers 43a-43f protrude outward to form structures for receiving the fluid within forefoot component 40, web area 45 exhibits lesser thickness to provide flexibility in forefoot component 40 and permit each of chambers 43a-43f to move or deflect independently in footwear 100. As noted above, flange 44 may be absent or have minimal height and thickness in areas between chambers 43a-43f, thereby further contributing to flexibility in forefoot component 40.

Various factors may be considered when selecting materials for forefoot component 40, including each of polymer layers 41 and 42. As an example, the engineering properties of the materials (e.g., tensile strength, tear strength, flexural fatigue strength, modulus of elasticity, and abrasion resistance) may be considered. The ability of the materials to be shaped into chambers 43a-43f and bonded to form flange 44 and web area 45 during the manufacture of forefoot component 40 may also be considered. Additionally, the ability of the materials to prevent the transmission (e.g., diffusion, permeation) of the fluid contained by forefoot component 40 may be considered. Suitable materials for forefoot component 40 include a variety of thermoset and thermoplastic polymer materials. An advantage of thermoplastic polymer materials is that they may be molded (e.g., thermoformed) to impart the shapes of chambers 43a-43f and flange 44. Moreover, thermoplastic polymer materials may be thermal bonded to each other to form flange 44 and web area 45. Given these considerations, examples of polymer materials that may be utilized for forefoot component 40 include any of the following: polyurethane, urethane, polyester, polyester polyurethane, polyether, polyether polyurethane, latex, polycaprolactone, polyoxypropylene, polycarbonate macroglycol, and mixtures thereof.

Although any of the materials noted above may be utilized for forefoot component 40, various materials exhibit both diffusion-prevention and thermoplastic properties. An example of this material is disclosed in U.S. Pat. Nos. 5,713,141 and 5,952,065 to Mitchell, et al., both of which are incorporated herein by reference. Although various configurations may be utilized, this material generally includes layers of a thermoplastic polymer material and a barrier material. The thermoplastic polymer material provides the ability to form contoured shapes and thermal bonds, as well as a suitable degree of tensile strength, tear strength, flexural fatigue strength, modulus of elasticity, and abrasion resistance. The barrier material is effective in limiting the transmission of the fluid within forefoot component 40 (e.g., air, nitrogen, or sulfur-hexafluoride). As another example, forefoot component 40 may be formed from other layered materials, including a flexible microlayer membrane that has alternating layers of a gas barrier material and an elastomeric material, as disclosed in U.S. Pat. Nos. 6,082,025 and 6,127,026 to Bonk, et al., both of which are incorporated herein by reference. Additional suitable materials are disclosed in U.S. Pat. Nos. 4,183,156 and 4,219,945 to Rudy, both of which are incorporated herein by reference. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al., each of which are incorporated herein by reference.

Figure 10A:
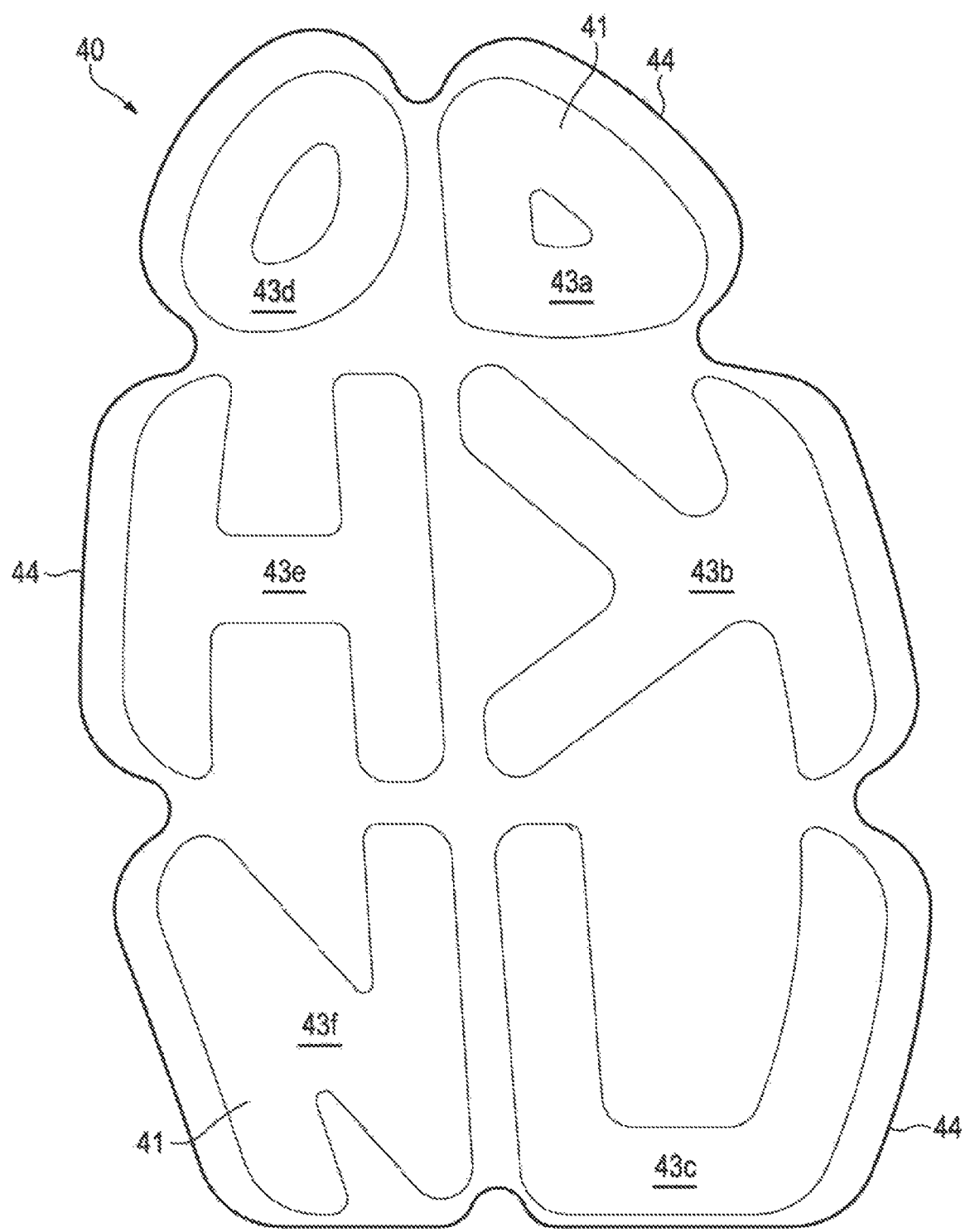
FIGS. 10A-10E are top plan views corresponding with FIG. 5 and depicting further configurations of the forefoot component.
Figure 10B:
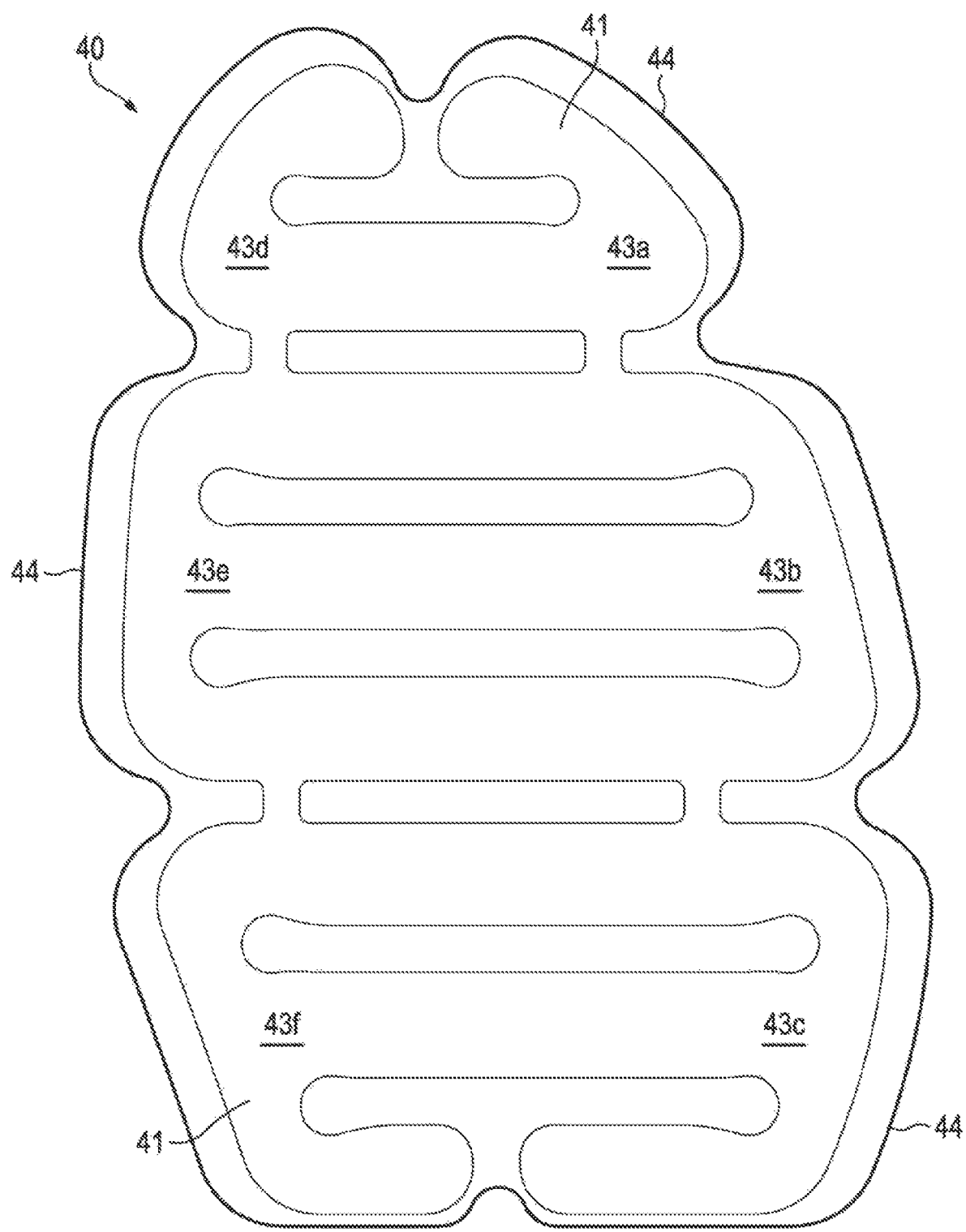
Figure 10C:
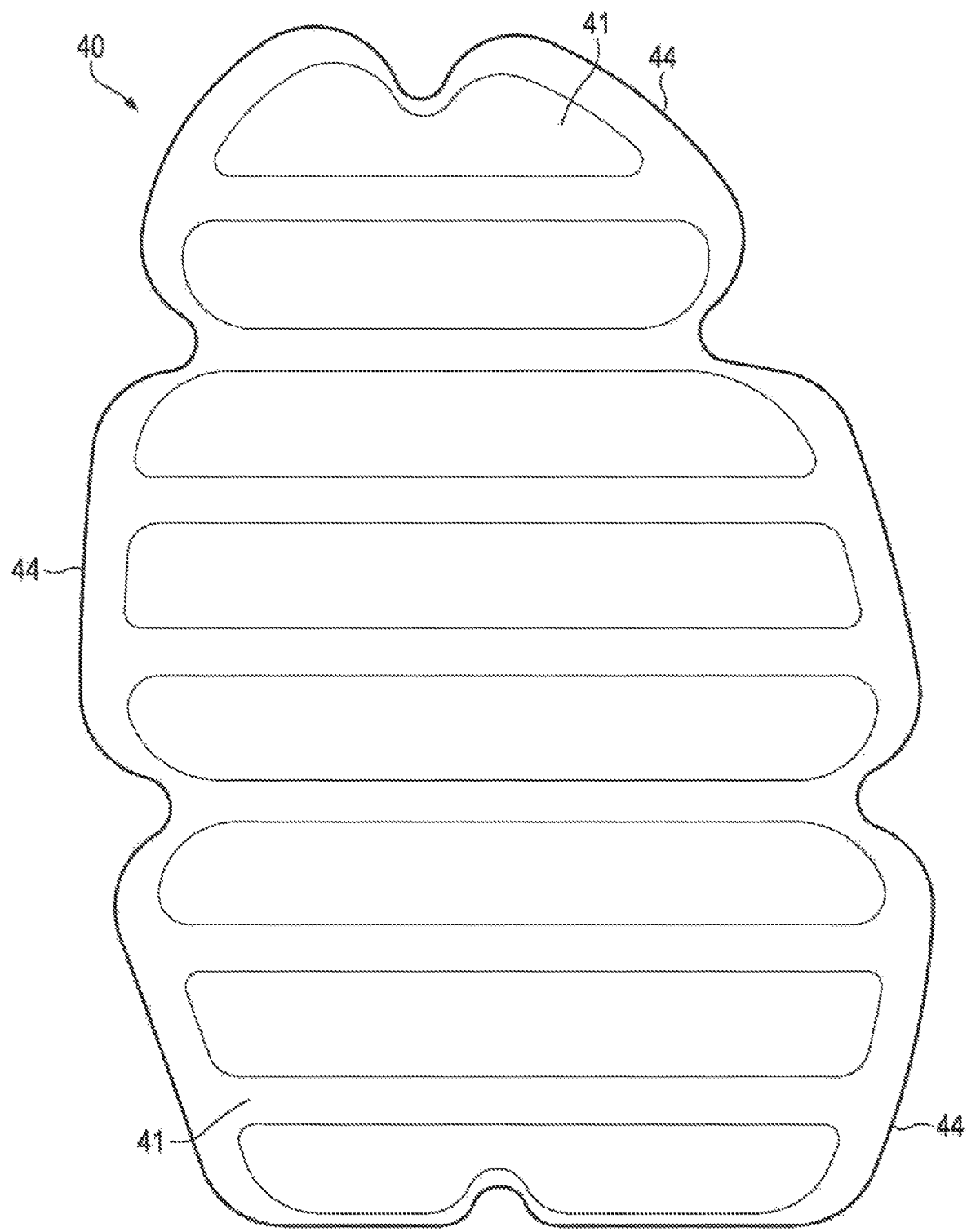
Figure 10D:
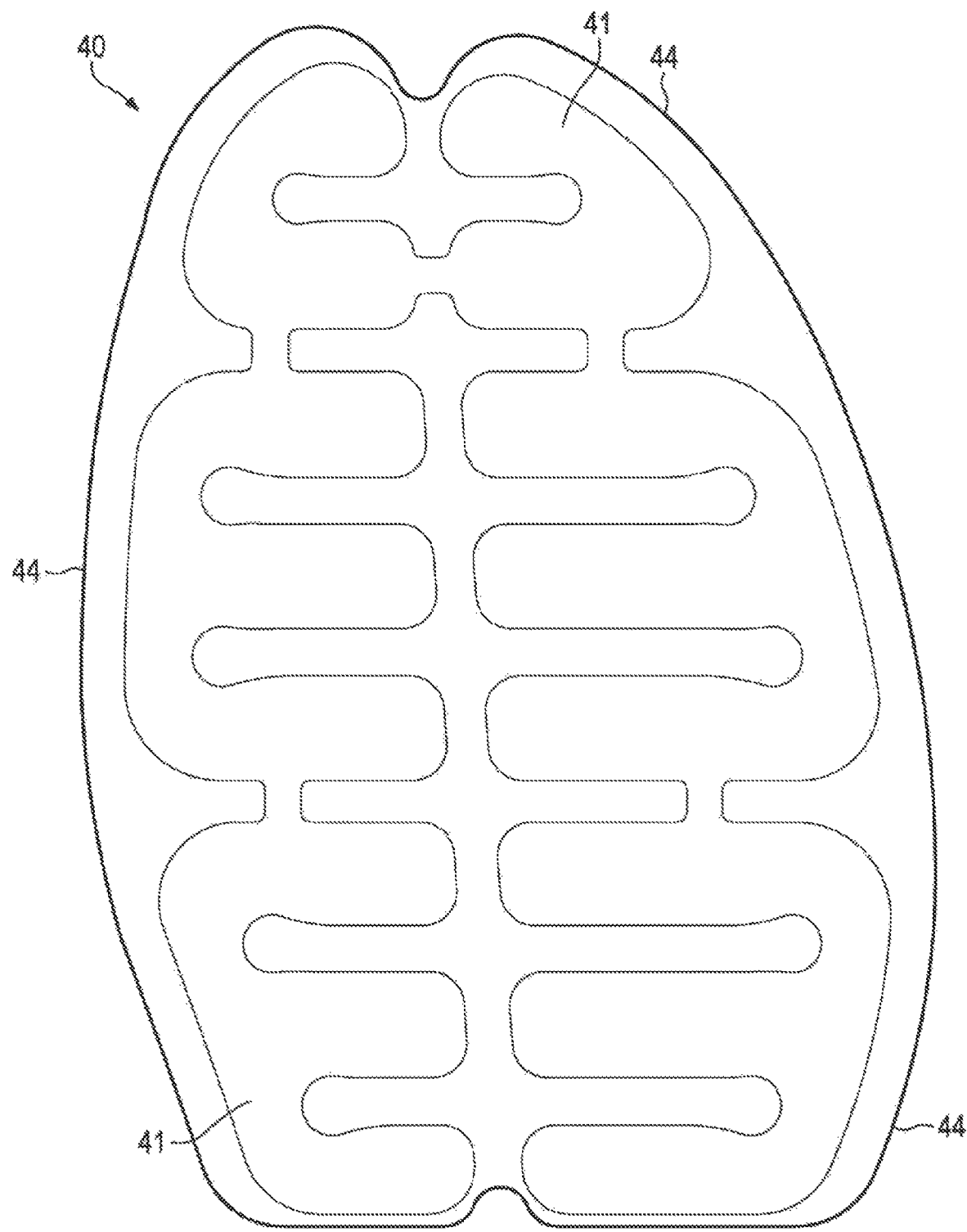
Figure 10E:
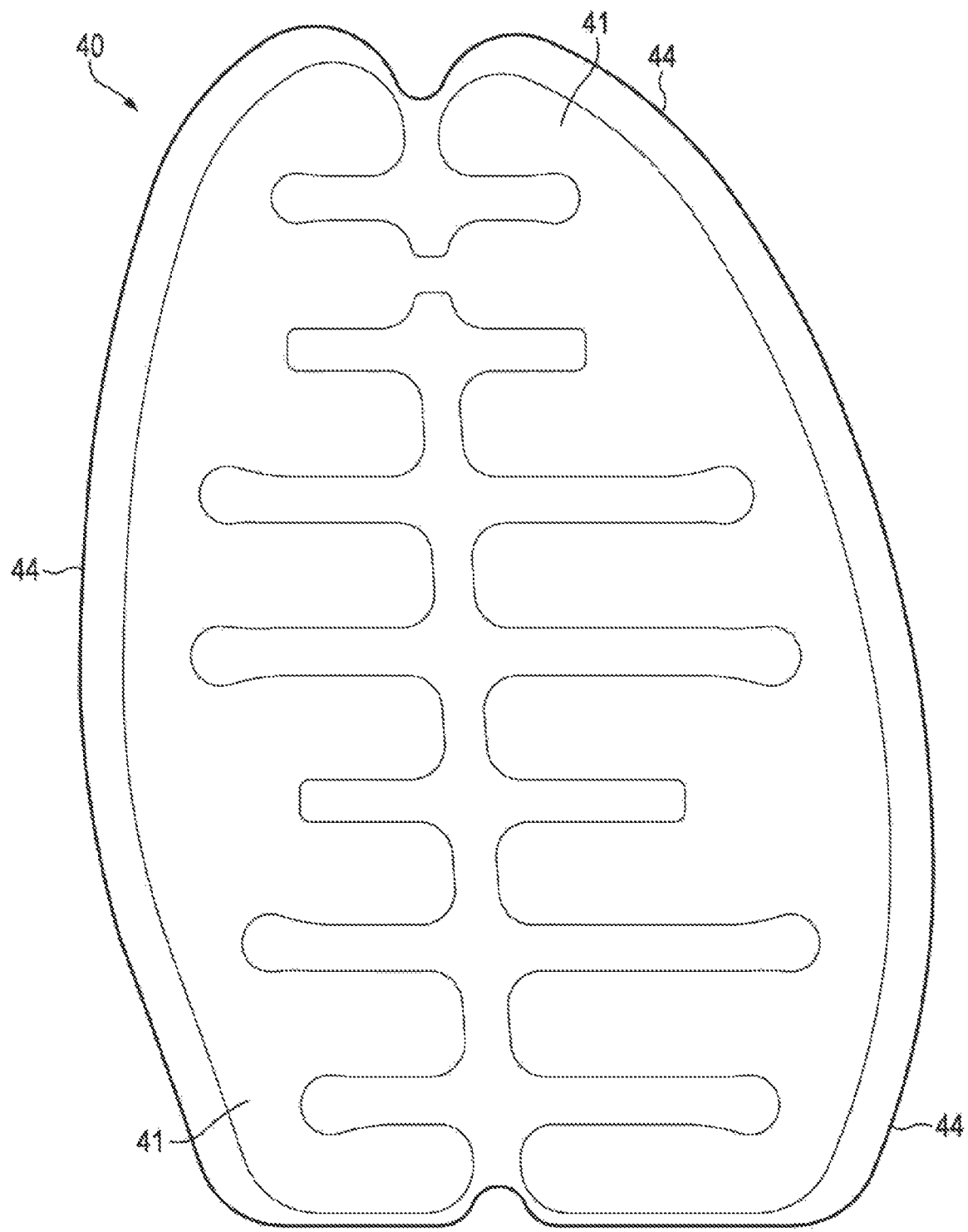

The configuration of forefoot component 40 discussed above provides one example of a suitable configuration for use in footwear 10 and other products. A variety of other configurations may also be utilized. For example, FIG. 10A depicts chambers 43a-43f as having D, K, U, O, H, and N-shaped configurations. By varying the shapes of chambers 43a-43f, the properties of each of chambers 43a-43f and different areas of forefoot component 40 may be varied. Referring to FIG. 10B, chambers 43a-43f are connected across the central area of forefoot component 40, which may decrease longitudinal flexibility in sole structure 30 and provide additional force attenuation. A similar configuration is depicted in FIG. 10C, wherein chambers 43b, 43c, 43e, and 43f are replaced with various tubes that extend across forefoot component 40. Although flange 44 may be absent or minimal between chambers 43a-43f, FIG. 10D depicts a configuration wherein flange 44 extends continuously along opposite sides of forefoot component 40. As a similar example, FIG. 10E depicts chambers 43a-43f as being interconnected along the peripheral area of forefoot component 40, also with flange 44 extending continuously along opposite sides of forefoot component 40.

Figure 11A:
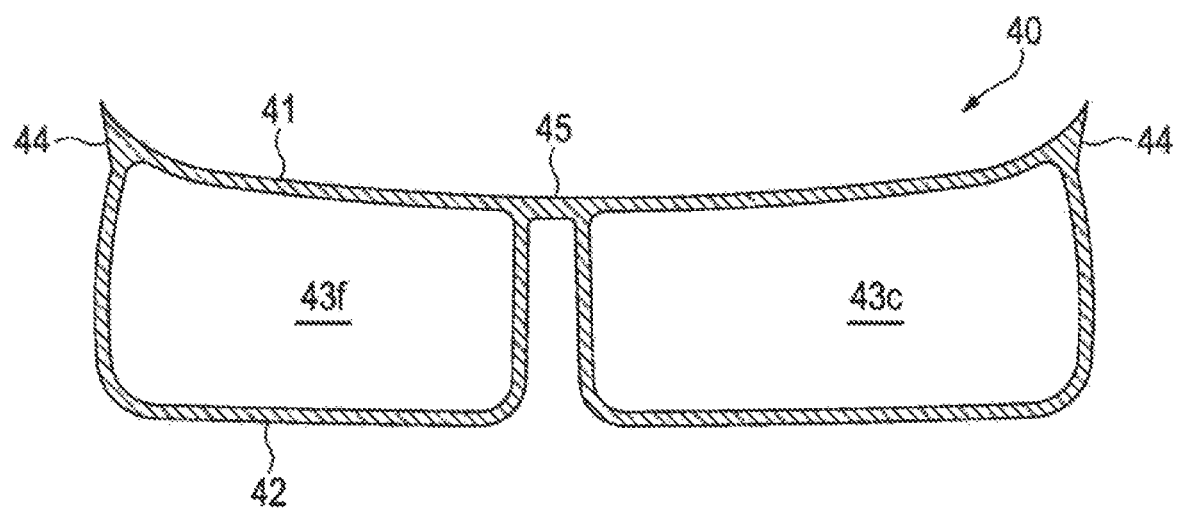
FIGS. 11A-11E are cross-sectional views corresponding with FIG. 9A and depicting further configurations of the forefoot component.
Figure 11B:
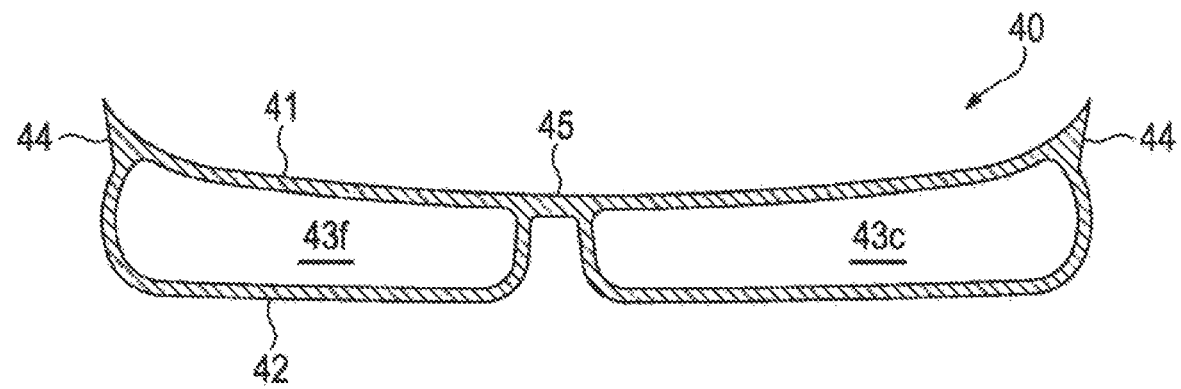
Figure 11C:
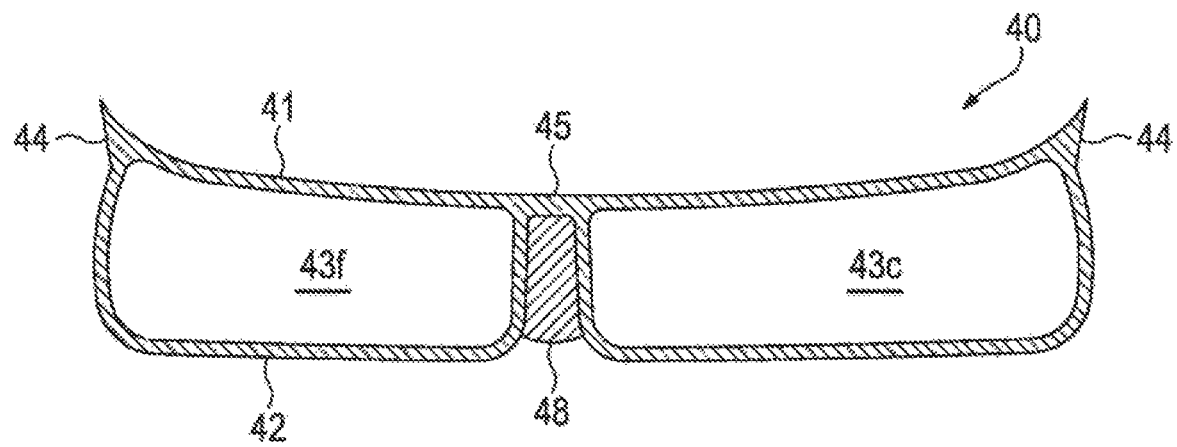
Figure 11D:
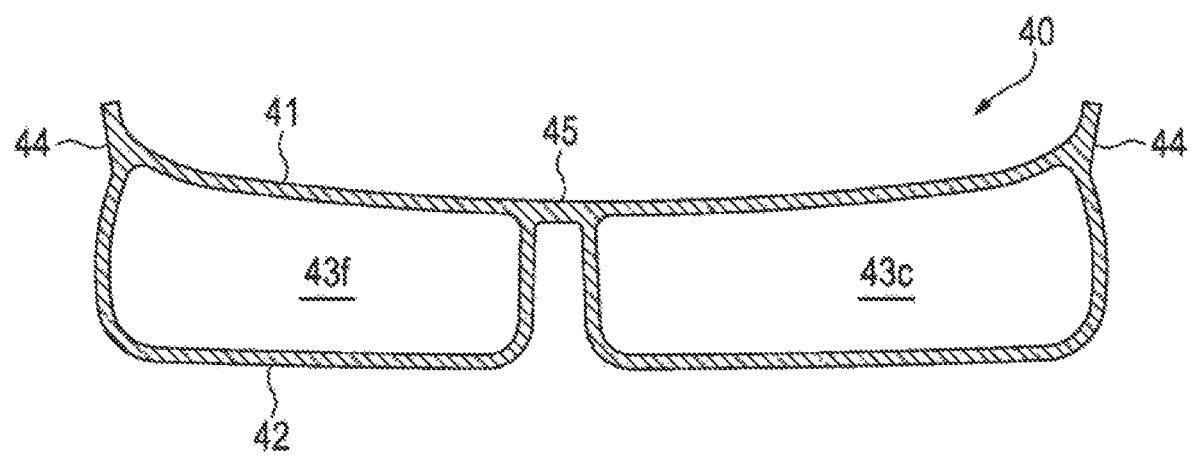
Figure 11E:
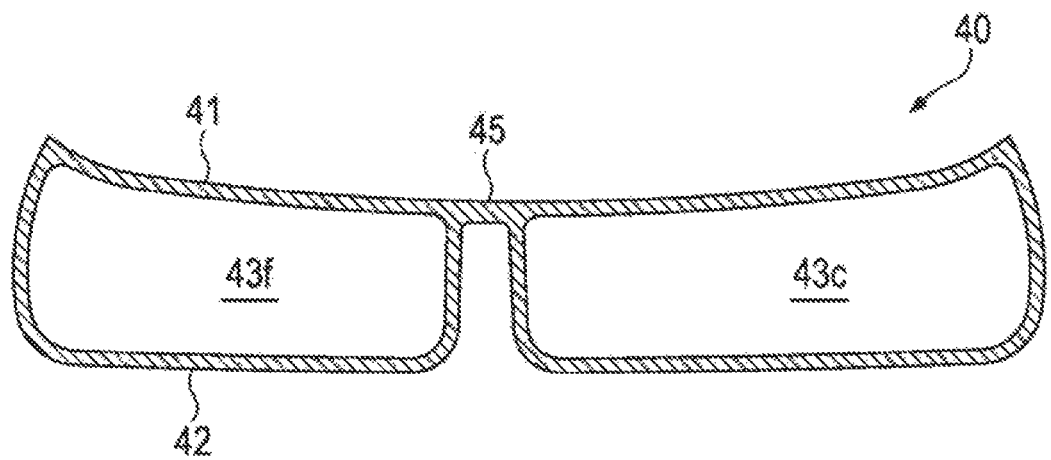
Figure 12:
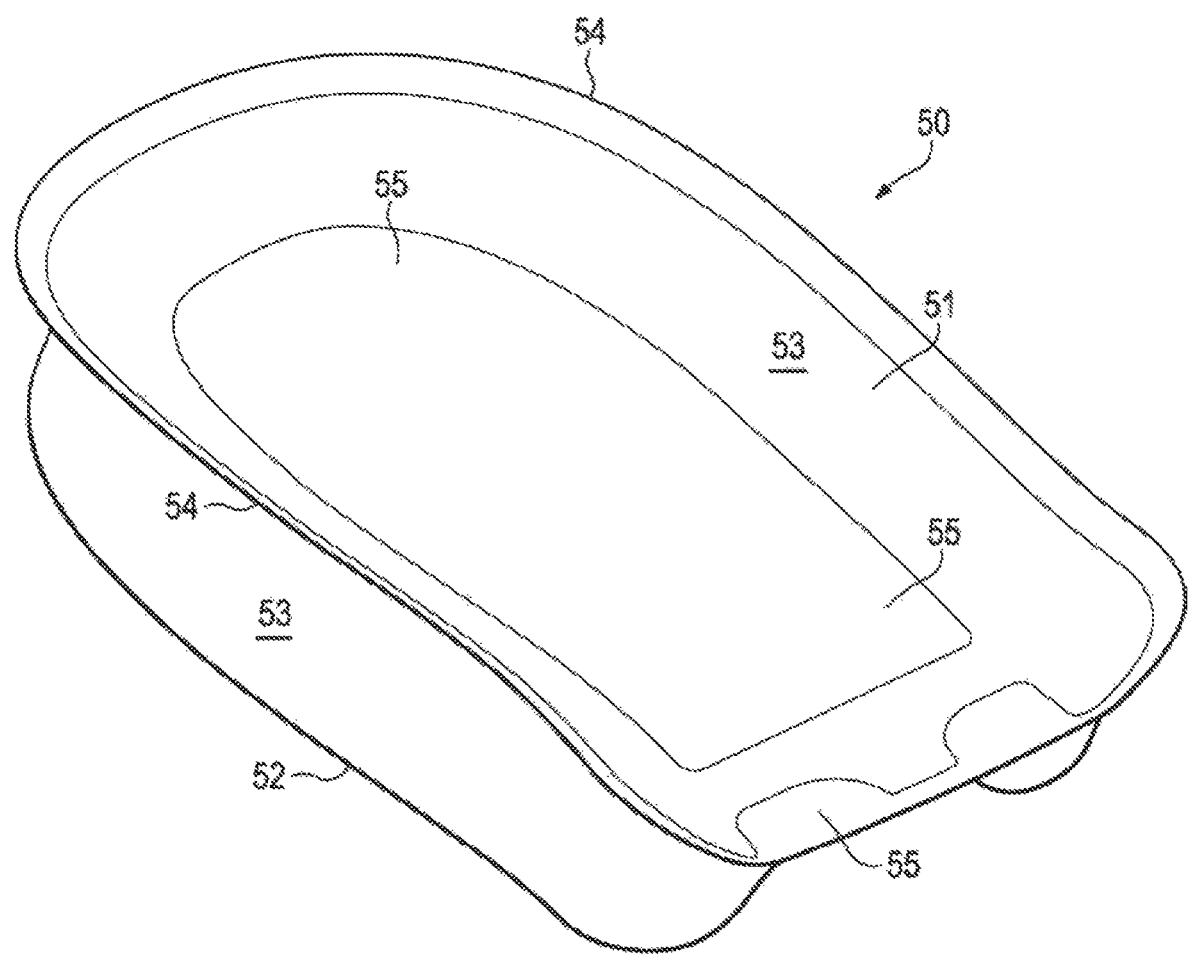
FIG. 12 is a perspective view of a heel component of the sole structure.
Figure 13:
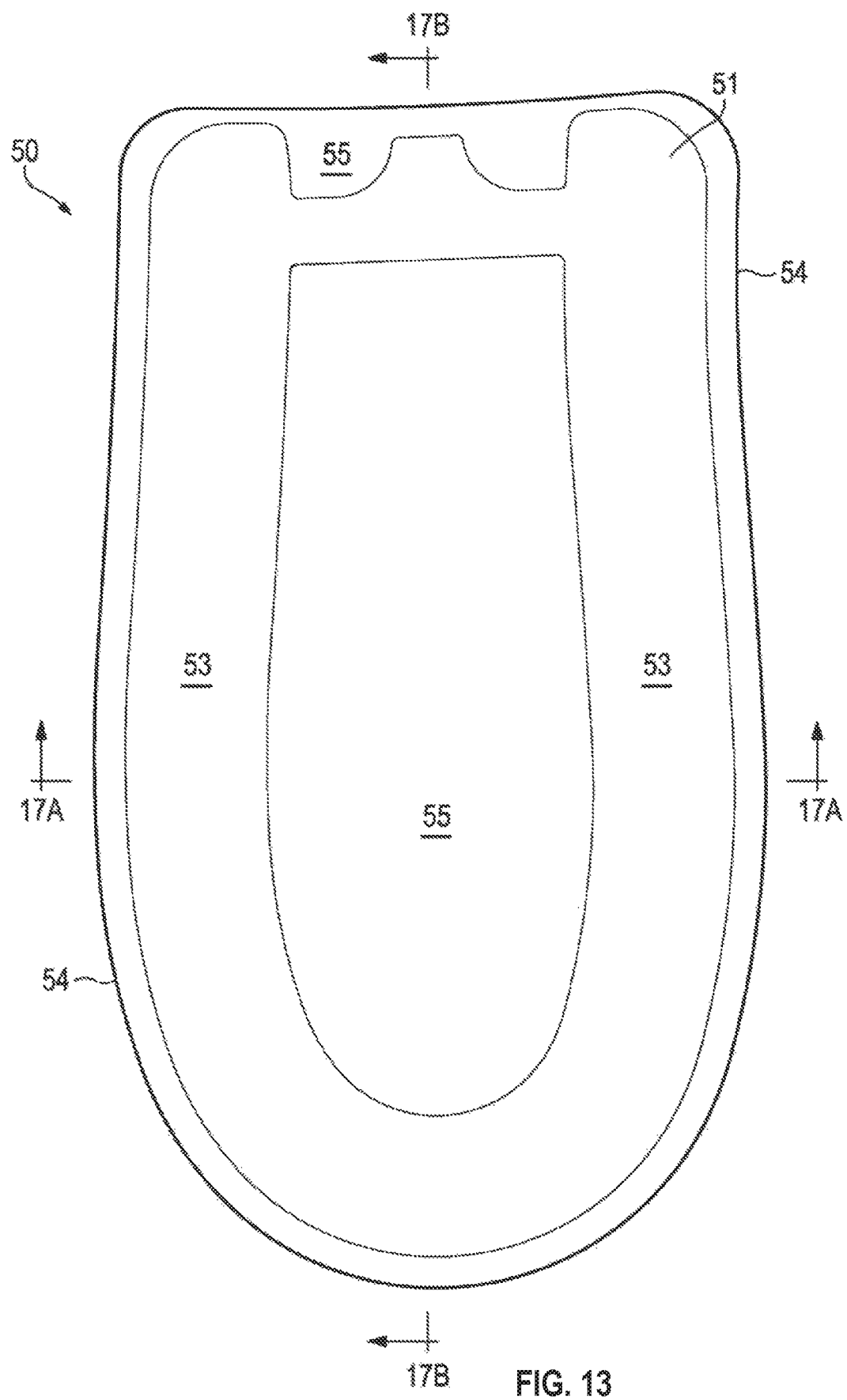
FIG. 13 is a top plan view of the heel component.
Figure 14:
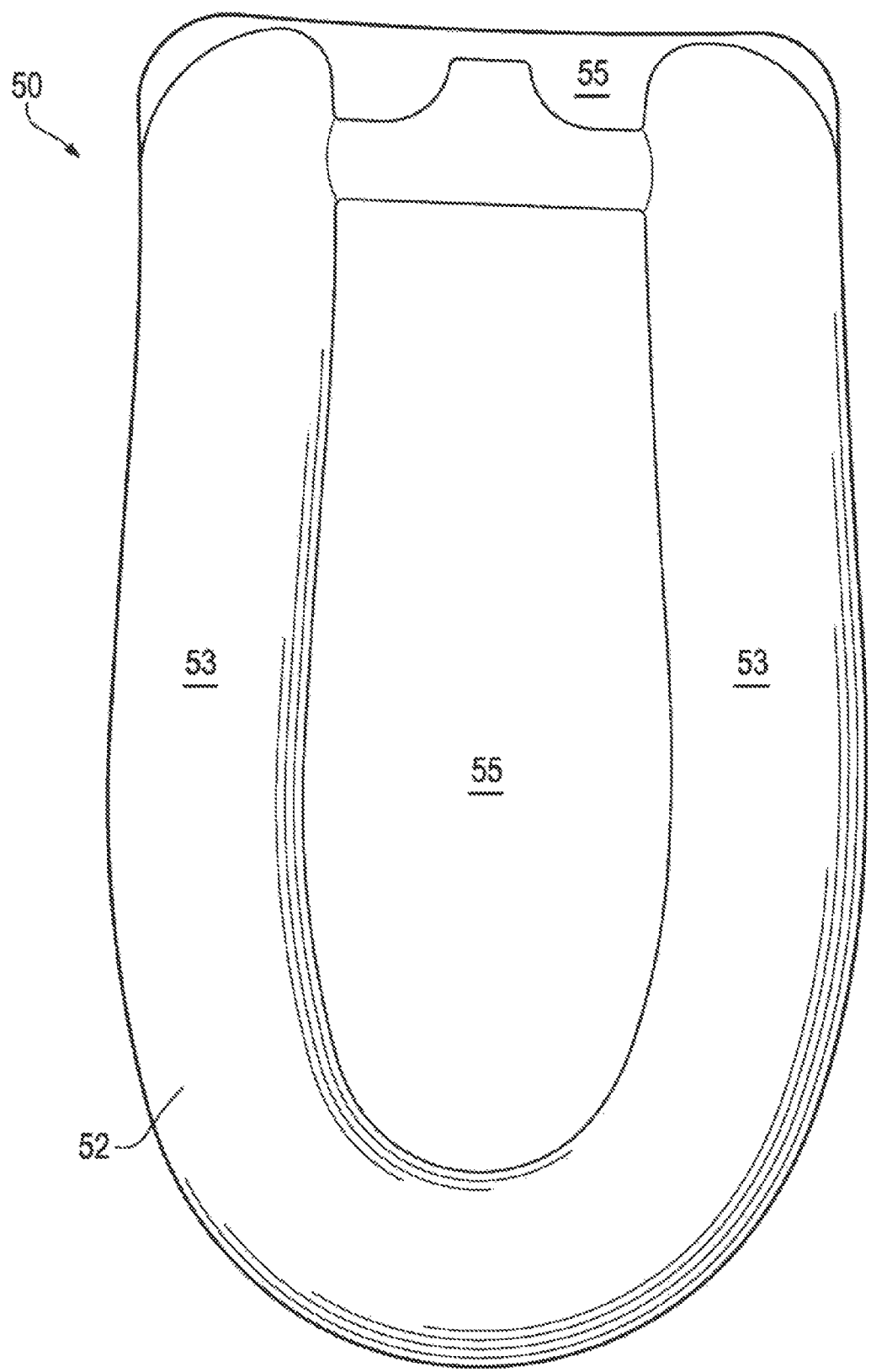
FIG. 14 is a bottom plan view of the heel component.

In addition to the configurations discussed above, various other aspects of forefoot component 40 may vary. Referring to FIG. 11A, chambers 43c and 43f are depicted as having greater height, whereas FIG. 11B depicts a lesser height. By varying the heights of chambers 43a-43f, the cushioning or force attenuation properties may be modified. Referring to FIG. 11C, a foam element 48 is located between chambers 43c and 43f and in contact with web area 45, which may decrease longitudinal flexibility in sole structure 30 and increase cushioning properties. Aspects relating to flange 44 may also vary. Referring to FIG. 11D, flange 44 has a non-tapered and squared configuration, which may add further stiffness. In FIG. 11E, the structure flange 44 is substantially absent from forefoot component 40.

Heel Component

Heel component 50 is depicted separate from footwear 10 in FIGS. 12-16 and is formed from a polymer material that defines a first or upper surface 51 and an opposite second or lower surface 52. Whereas upper surface 51 is secured to upper 20, different portions of lower surface 52 are either secured to outsole 60 or exposed and visible from an exterior surface of footwear 10. As with forefoot component 40, upper surface 51 and lower surface 52 are formed from polymer layers during a molding or thermoforming process. More particularly, upper surface 51 is formed from one polymer layer, and lower surface 52 is formed from another polymer layer. Any of the polymer materials noted above for forefoot component 40 may also be utilized for the polymer layers forming heel component 50.

Heel component 50 includes a single chamber 53, a flange 54, and a web area 55. Chamber 53 and flange 54 each have a generally U-shaped configuration that, when incorporated into footwear 10, extends (a) along lateral side 14, (b) around a rear portion of heel region 13, and (c) along medial side 15, thereby extending around a peripheral area of heel component 50. Like each of chambers 43a-43f, chamber 53 encloses or contains the fluid within heel component 50 and is formed from separated or spaced areas of the polymer layers forming surfaces 51 and 52. Flange 54 is formed from portions of the polymer layers that are molded and joined together and protrudes outward from chamber 53. Web area 55 extends through a central area of heel component 50 and between lateral and medial portions of chamber 53. Like flange 54, web area 55 is formed from portions of the polymer layers that are joined together. Although adhesive bonding may be utilized in joining the polymer layers in flange 54 and web area 55, thermal bonding may also join the polymer layers during the molding or thermoforming process.

Chamber 53 is the primary component of heel component 50 that encloses the fluid. In areas immediately adjacent to chamber 53, the polymer layers forming surfaces 51 and 52 are joined to each other to form a bond that seals the fluid within heel component 50. More particularly, flange 54 and web area 55 cooperatively bound or otherwise extend around chamber 53 and are formed from areas of the polymer layers that are bonded to each other, thereby sealing the fluid within chamber 53. In further configurations of footwear 10, chamber 53 may be subdivided into two or more subchambers that may be pressurized differently. In other configurations, heel component 50 may be a part of a fluid system that pumps fluid into chamber 53. In still further configurations, the medial and lateral portions may be connected through a central portion of web area 55.

Upper surface 51 has a generally concave configuration, as depicted in FIGS. 17A and 17B, that supports the foot when footwear 10 is worn. As such, the foot effectively rests within the U-shaped configurations of chamber 53 and flange 54. This configuration may provide stability to footwear 10 and ensure that the foot remains properly positioned relative to heel component 50 and other portions of sole structure 30.

Flange 54 forms a peripheral seam or bonded area that joins the polymer layers forming surfaces 51 and 52 and assists with sealing the fluid within heel component 50. In general, flange 54 has a height of at least five millimeters and extends in an outward direction from a remainder of heel component 50. More particularly, flange 54 extends in an upward direction from the peripheral area or an upper area of heel component 50. Whereas the area of flange 54 corresponding with first surface 51 faces toward and is secured to upper 20, the area of flange 54 corresponding with second surface 52 faces away from and forms a portion of an exterior surface of footwear 10. More simply, one surface of flange 54 is secured to upper 20, and the opposite surface of flange 54 faces away from upper 20. Given that flange 54 is a relatively thick and stiff portion of heel component 50, flange 54 may enhance the stability of footwear 10. As with flange 44, flange 54 may provide a defined lasting margin during steps of the manufacturing process that involve bonding upper 20 to heel component 50.

Referring to the cross-sections of FIGS. 17A and 17B, for example, flange 54 is depicted as having a tapered configuration, with the portions of flange 54 located adjacent to chamber 53 having greater thickness than the portions of flange 54 that are spaced from chamber 53. In effect, therefore, flange 54 has a tapered configuration with a first thickness adjacent to the void in chamber 53 and a second thickness spaced away from the void, the first thickness being greater than the second thickness. Moreover, the thickness of the portions of flange 54 located adjacent to the void (i.e., the first thickness) is greater than either of (a) the thickness of web area 45 in the central area of heel component 50 and (b) the sum of the thicknesses of the polymer layers forming surfaces 51 and 52. Although flange 54 is formed from the polymer layers forming surfaces 51 and 52 and web area 55, flange 54 has a greater thickness than both of the polymer layers combined. As noted above, flange 54 is a relatively thick and stiff portion of heel component 50. A portion of the stiffness may be due, therefore, to the greater thickness of flange 54 adjacent to chamber 53.

Web area 55 extends throughout a central area of heel component 50. In this position, web area 55 forms a bonded area that joins the polymer layers forming surfaces 51 and 52 and also assists with sealing the fluid within chamber 53. Whereas chamber 53 protrudes outward to form structures for receiving the fluid within heel component 50, web area 55 exhibits lesser thickness and may provide cushioning or force attenuation through deflecting downward, similar to a trampoline.

Figure 18A:
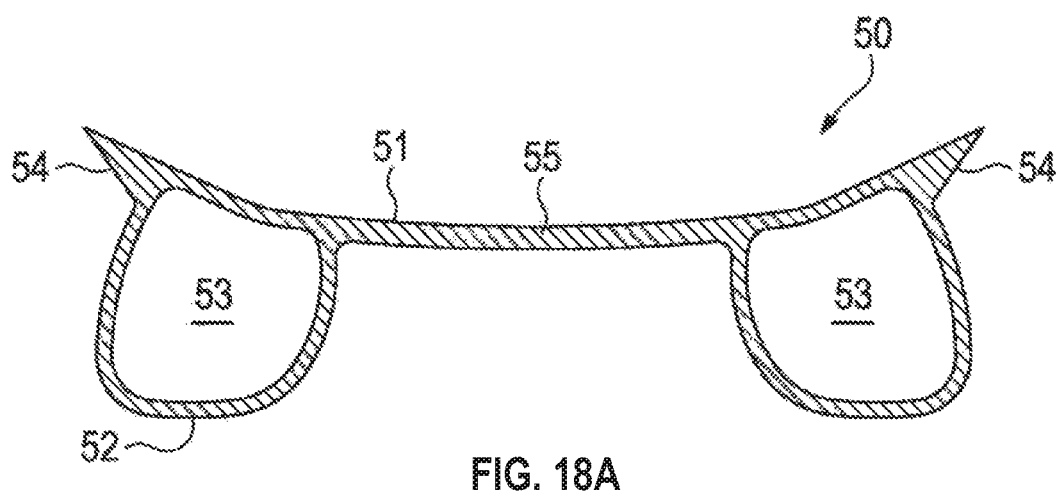
FIGS. 18A-18C are cross-sectional views corresponding with FIG. 17A and depicting further configurations of the heel component.
Figure 18B:
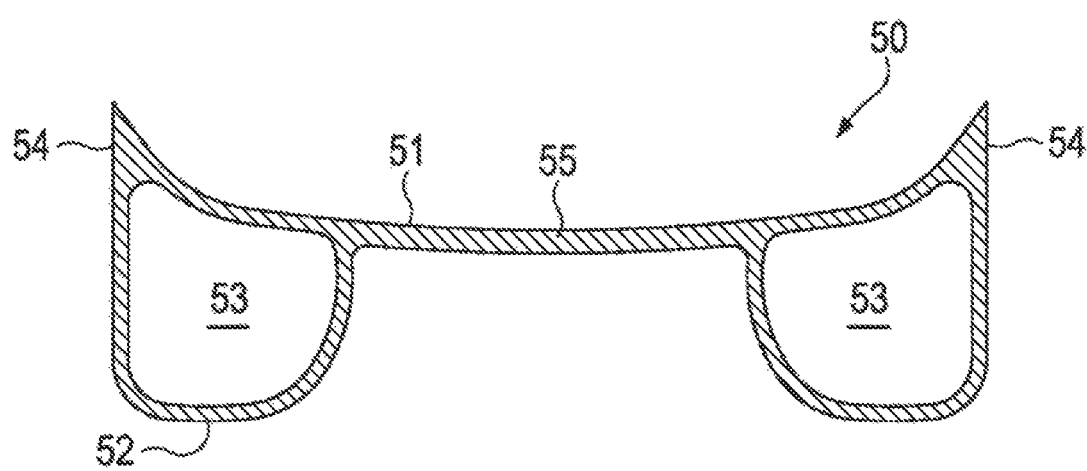
Figure 18C:
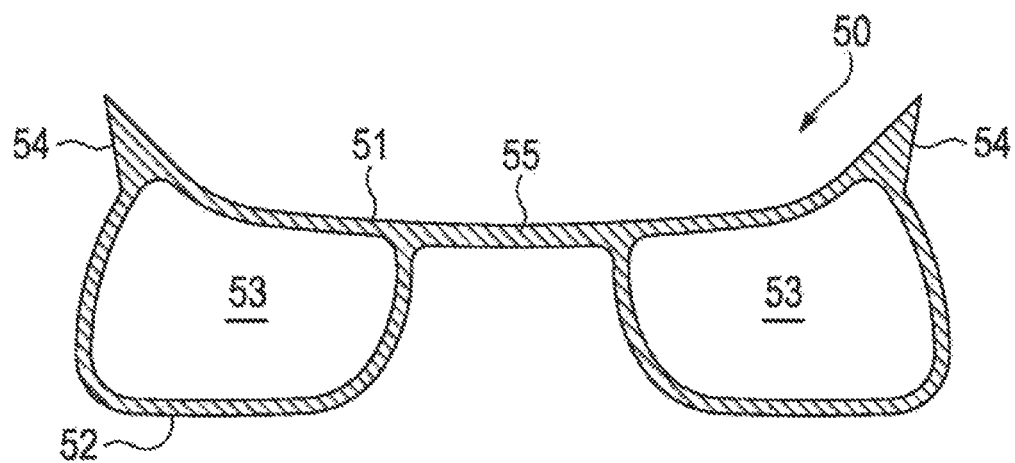

The configuration of heel component 50 discussed above provides one example of a suitable configuration for use in footwear 10 and other products. A variety of other configurations may also be utilized. For example, flange 54 angles outwardly in FIG. 18A, rather than having a vertical orientation. In this configuration, flange 54 may support edges of the foot, rather than extending along sides of the foot. Referring to FIG. 18B, chamber 53 bulges outward to a lesser degree, which locates flange 54 at the immediate periphery of heel component 50 and forms vertical sides for heel component 50. As another example, the width of chamber 53 is increased in FIG. 18C, which may modify the cushioning or force attenuation properties of heel component 50. In other configurations, flange 54 may have a squared aspect or be absent, similar to FIGS. 11D and 11E.

Although the area between opposite sides of chamber 53 and under web area 55 may be open, foam elements or other components may be located in this area. Referring to FIG. 19A, for example, a foam element 56 is located under and in contact with web area 55. Among other aspects, foam element 56 may affect the flexibility or force attenuation properties of heel component 50. Moreover, the shape and location of foam element 56 may also affect properties of heel component 50. Referring to FIG. 19B, foam element 56 has a tapered configuration, which may alter properties between forward and rearward areas of heel component 50. Similarly, foam element 56 is tapered and spaced from web area 55 in FIG. 19C. Accordingly, heel component 50 may vary in many aspects.

Manufacturing Process for Forefoot Component

Figure 20:
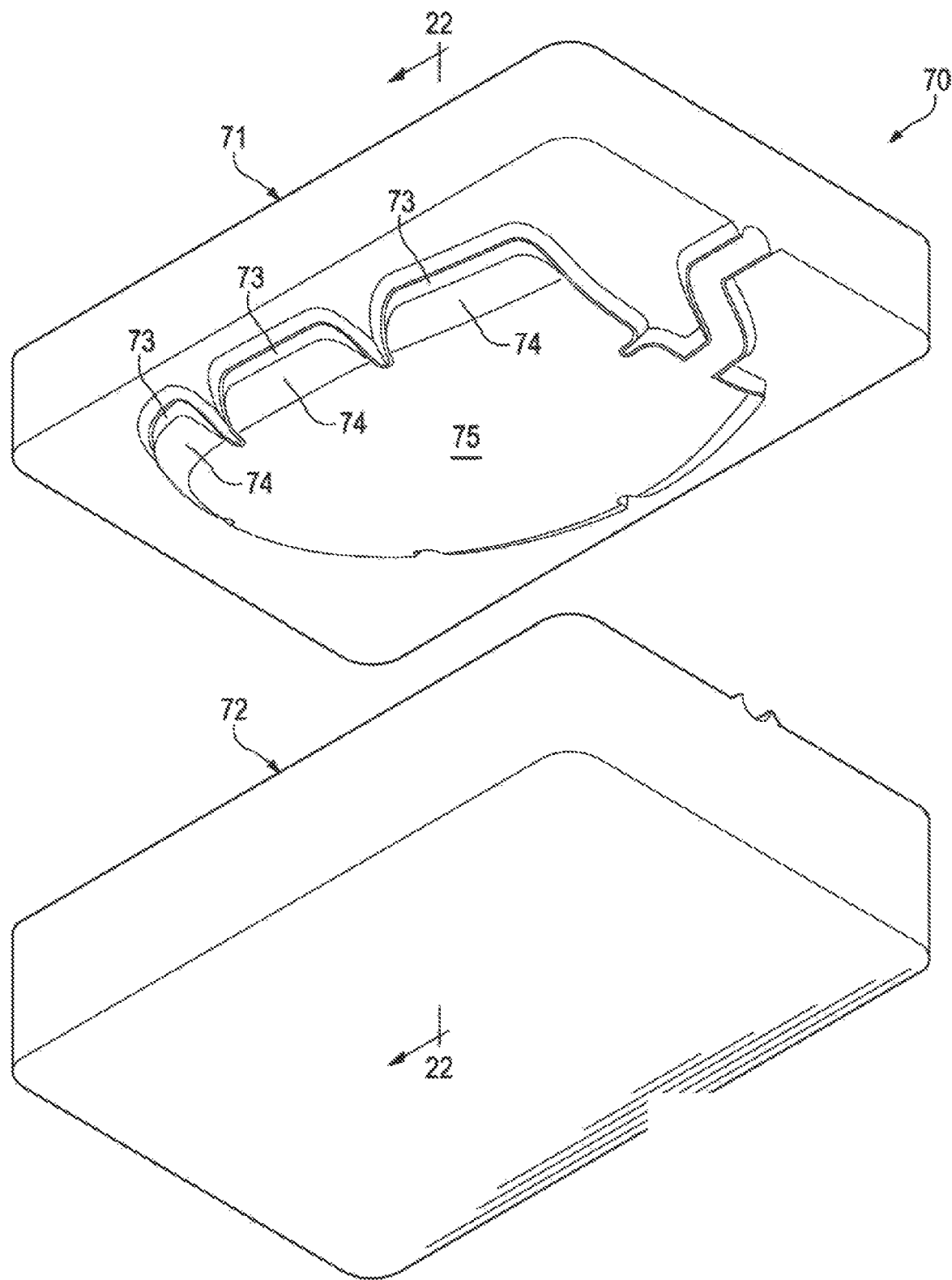
FIGS. 20 and 21 are perspective views of a forefoot component mold.
Figure 21:
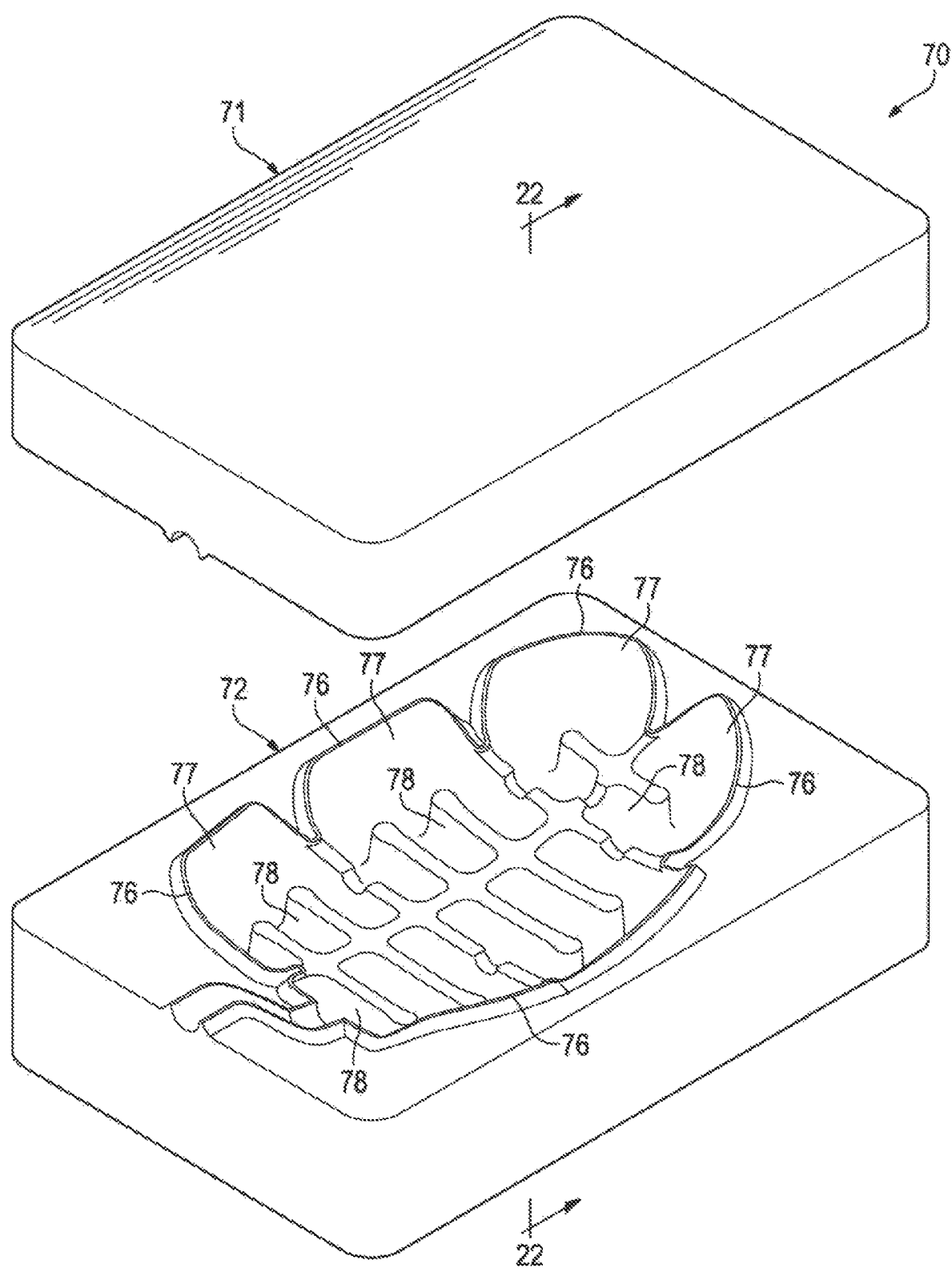

Although a variety of manufacturing processes may be utilized to form forefoot component 40, an example of a suitable process will now be discussed. With reference to FIGS. 20 and 21, a mold 70 that may be utilized in the manufacturing process is depicted as including a first mold portion 71 and a second mold portion 72. As discussed below in reference to FIGS. 22A-22E, mold 70 is utilized to form forefoot component 40 from a first polymer layer 81 and a second polymer layer 82, which are the polymer layers respectively forming first surface 41 and second surface 42. More particularly, mold 70 facilitates the manufacturing process by (a) shaping polymer layers 81 and 82 in areas corresponding with chambers 43a-43f, flange 44, and conduits 46 and (b) joining polymer layers 81 and 82 in areas corresponding with flange 44 and web area 45.

Figure 22A:
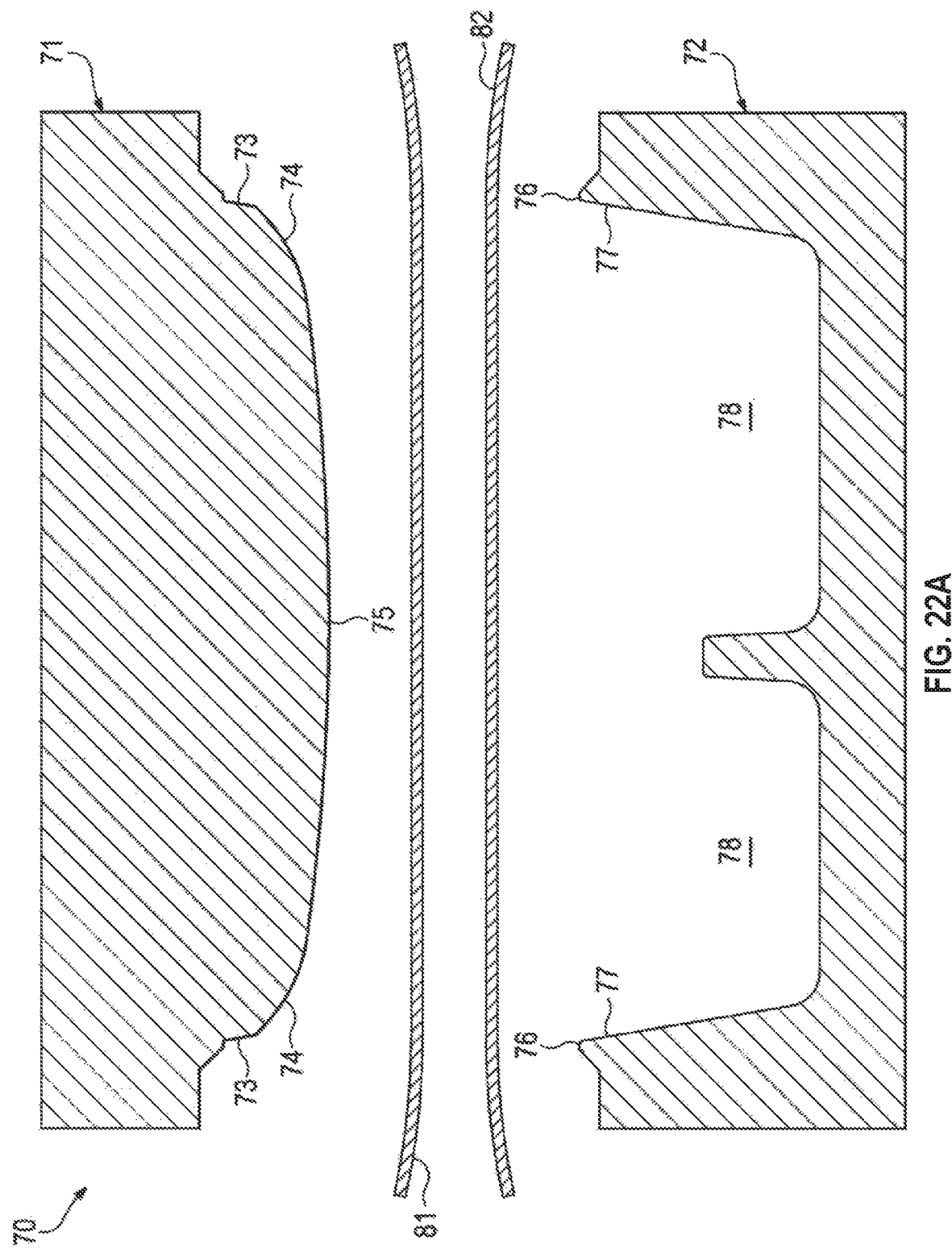
FIGS. 22A-22E are cross-sectional views depicting a manufacturing process for forming the forefoot component utilizing the forefoot component mold, as defined along a section line 22 in FIGS. 20 and 21.

Various surfaces or other areas of mold 70 will now be defined for use in discussion of the manufacturing process. Referring to FIGS. 20 and 22A, first mold portion 71 includes a pinch surface 73, a first seam-forming surface 74, and a compression surface 75. Surfaces 73 and 74 are angled relative to each other, with pinch surface 73 being more vertical than first seam-forming surface 74. Referring to FIGS. 21 and 22A, second mold portion 72 includes a pinch edge 76 and a second seam-forming surface 77. Whereas pinch edge 76 is a relatively sharp corner or angled area in second mold portion 72, second seam-forming surface 77 extends downward and is generally, although not necessarily, parallel to pinch surface 73. A void within mold 70 and between mold portions 71 and 72 has a shape of forefoot component 40, prior to pressurization, and forms various features of forefoot component 40. A portion of this void is identified as a depression 78 in second mold portion 72.

Each of polymer layers 81 and 82 are initially located between each of mold portions 71 and 72, which are in a spaced or open configuration, as depicted in FIG. 22A. In this position, first polymer layer 81 is positioned adjacent or closer to first mold portion 71, and second polymer layer 82 is positioned adjacent or closer to second mold portion 72. A shuttle frame or other device may be utilized to properly position polymer layers 81 and 82. As part of the manufacturing process, one or both of polymer layers 81 and 82 are heated to a temperature that facilitates shaping and bonding. As an example, various radiant heaters or other devices may be utilized to heat polymer layers 81 and 82, possibly prior to being located between mold portions 71 and 72. As another example, mold 70 may be heated such that contact between mold 70 and polymer layers 81 and 82 at a later portion of the manufacturing process raises the temperature to a level that facilitates shaping and bonding.

Figure 22B:
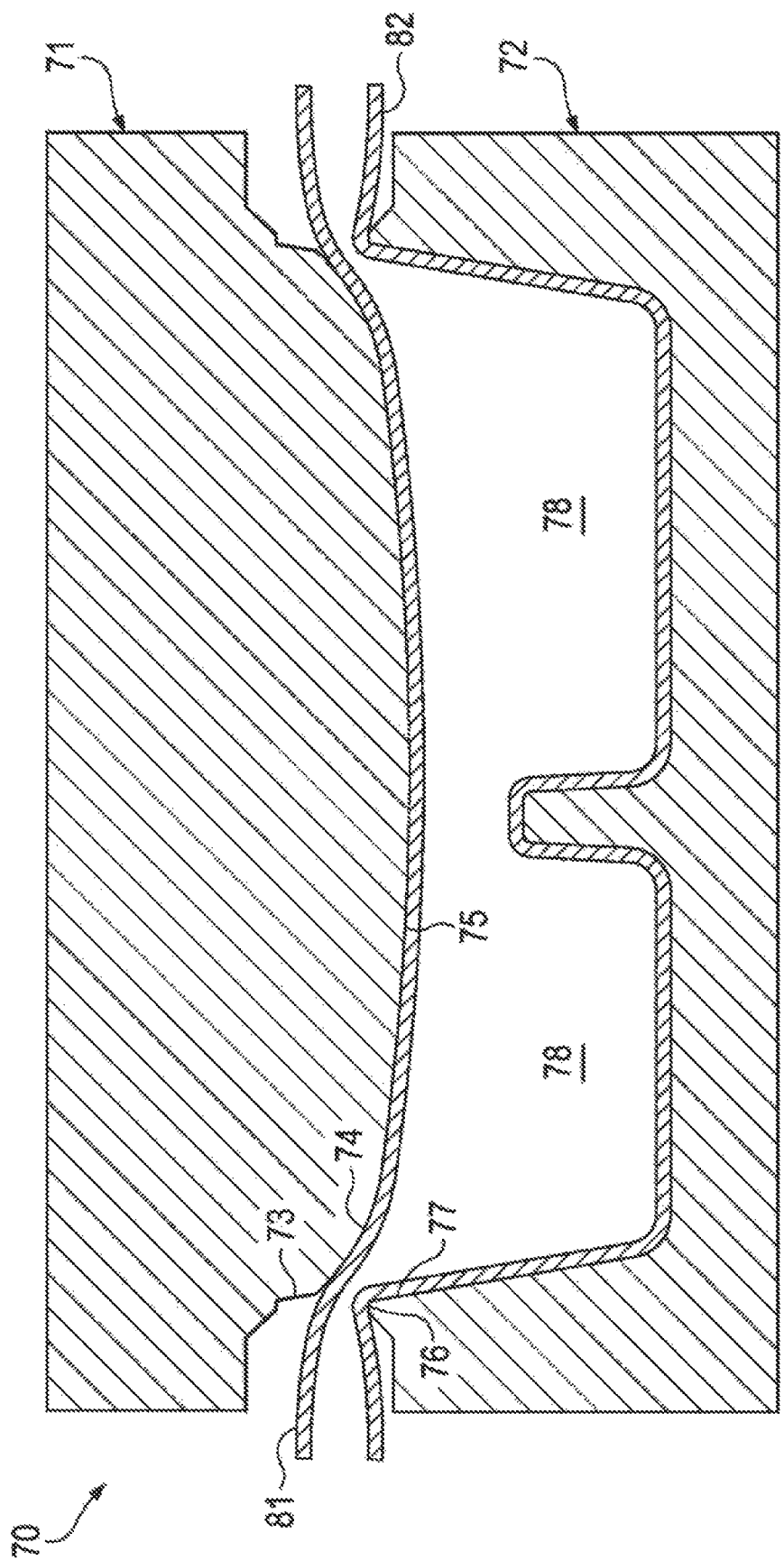

Once polymer layers 81 and 82 are properly positioned, mold portions 71 and 72 translate or otherwise move toward each other and begin to close upon polymer layers 81 and 82, as depicted in FIG. 22B. As mold portions 71 and 72 move toward each other, various techniques may be utilized to draw polymer layers 81 and 82 against surfaces of mold portions 71 and 72, thereby beginning the process of shaping polymer layers 81 and 82. For example, air may be partially evacuated from the areas between (a) first mold portion 71 and first polymer layer 81 and (b) second mold portion 72 and second polymer layer 82. More particularly, air may be withdrawn through various vacuum ports in mold portions 71 and 72. By removing air, polymer layers 81 and 82 are drawn into contact with the surfaces of mold portions 71 and 72. As another example, air may be injected into the area between polymer layers 81 and 82, thereby elevating the pressure between polymer layers 81 and 82. During a preparatory stage of this process, an injection needle may be located between polymer layers 81 and 82, and a gas may then be ejected from the injection needle such that polymer layers 81 and 82 engage the surfaces of mold 70. Each of these techniques may be used together or independently.

Figure 22C:
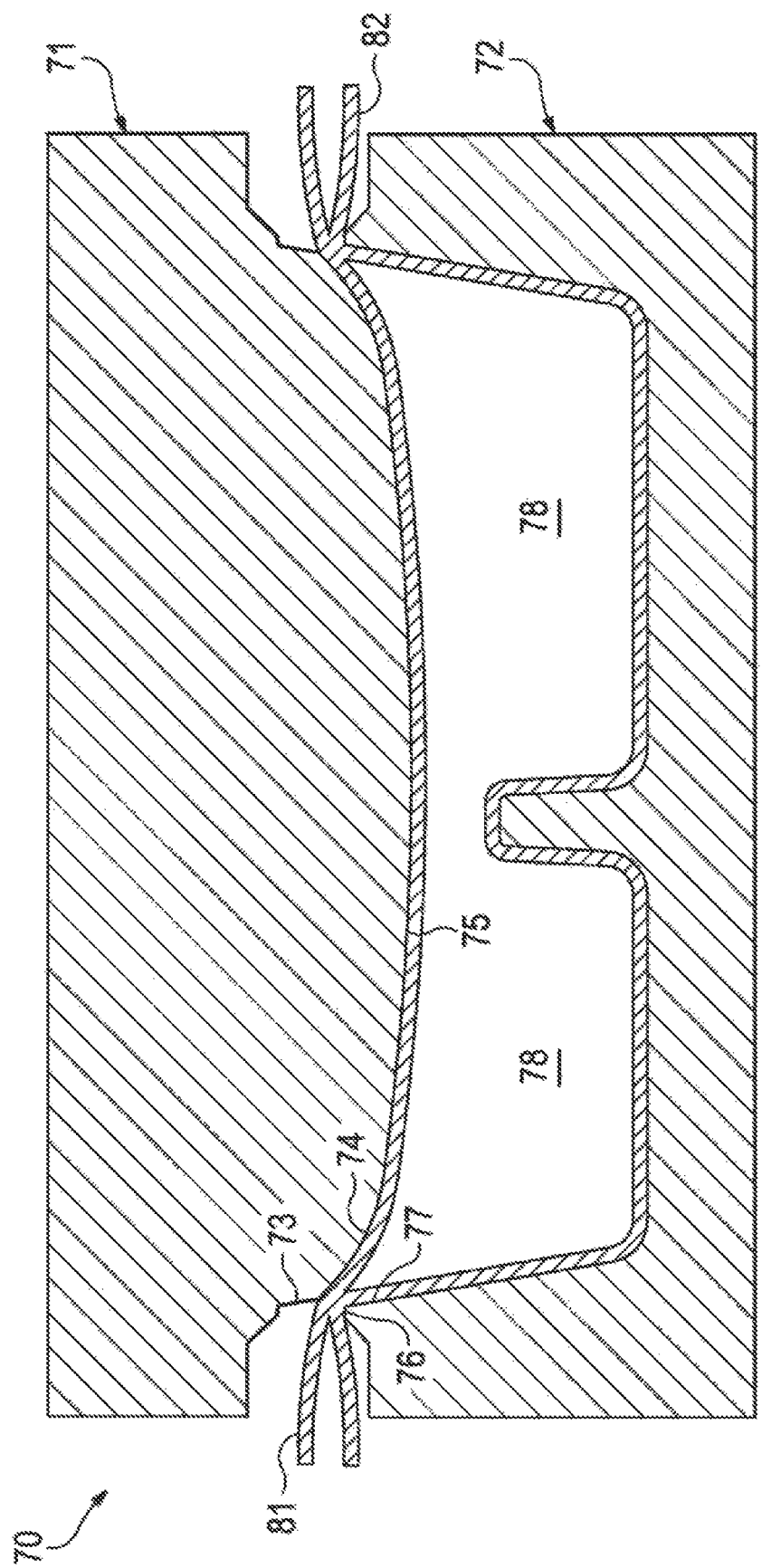

As mold portions 71 and 72 continue to move toward each other, polymer layers 81 and 82 are pinched between mold portions 71 and 72, as depicted in FIG. 22C. More particularly, polymer layers 81 and 82 are compressed between pinch surface 73 and pinch edge 76. In addition to beginning the process of separating excess portions of polymer layers 81 and 82 from portions that form forefoot component 40, the pinching of polymer layers 81 and 82 begins the process of bonding or joining layers 81 and 82 in the area of flange 44.

Figure 22D:
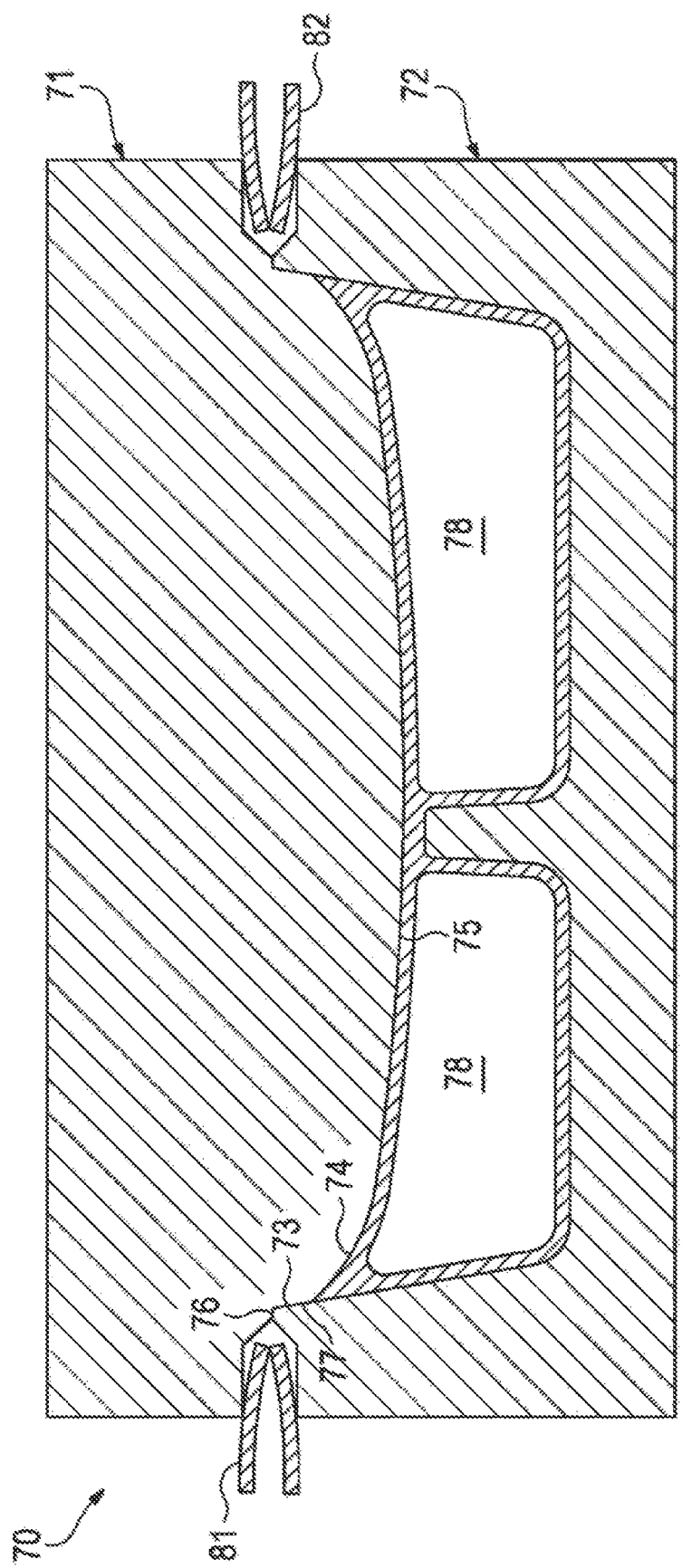

Following the pinching of polymer layers 81 and 82, mold portions 71 and 72 proceed with moving toward each other and into a closed configuration, as depicted in FIG. 22D. In the period between FIGS. 22C and 22D, pinch surface 73 contacts and slides against a portion of second seam-forming surface 77. The contact between pinch surface 73 and second seam-forming surface 77 effectively severs excess portions of polymer layers 81 and 82 from portions that form forefoot component 40. In addition, the sliding movement pushes portions of the material forming polymer layers 81 and 82 downward and further into depression 78. Moreover, the material forming polymer layers 81 and 82 compacts or otherwise collects in the area between seam-forming surfaces 74 and 77. Given that seam-forming surfaces 74 and 77 are angled relative to each other, the compacted polymer material forms a generally triangular or tapered structure, which results in flange 44. In addition to forming flange 44, polymer layers 81 and 82 are (a) shaped to form chambers 43a-43f and (b) compressed and joined to form web area 45.

At the stage of the process depicted in FIG. 22D, a void within mold 70, which is located between compression surface 75 and depression 78, effectively has the shape of forefoot component 40 prior to inflation or pressurization. Moreover, a peripheral portion of the void includes an area that forms flange 44 between seam-forming surfaces 74 and 77. The non-parallel configuration between seam-forming surfaces 74 and 77 results in a tapered space where the polymer material collects to form flange 44. A distance across the space between seam-forming surfaces 74 and 77 is greater adjacent to a portion of the void that forms chambers 43a-43f than in the area where seam-forming surfaces 74 and 77 meet, which is spaced from the portion of the void that forms chambers 43a-43f. Although the configuration of the tapered space between seam-forming surfaces 74 and 77 may vary, an angle formed between seam-forming surfaces 74 and 77 may be in a range of twenty and forty-five degrees.

As discussed above, the material forming polymer layers 81 and 82 compacts or otherwise collects in the area between seam-forming surfaces 74 and 77. This compaction effectively thickens one or both of polymer layers 81 and 82. That is, whereas polymer layers 81 and 82 have a first thickness at the stage depicted in FIG. 22A, one or both of polymer layers 81 and 82 within flange 44 may have a second, greater thickness at the stage depicted in FIG. 22D. The compaction that occurs as pinch surface 73 contacts and slides against a portion of second seam-forming surface 77 increases the thickness of the polymer material forming one or both of polymer layers 81 and 82.

Figure 22E:
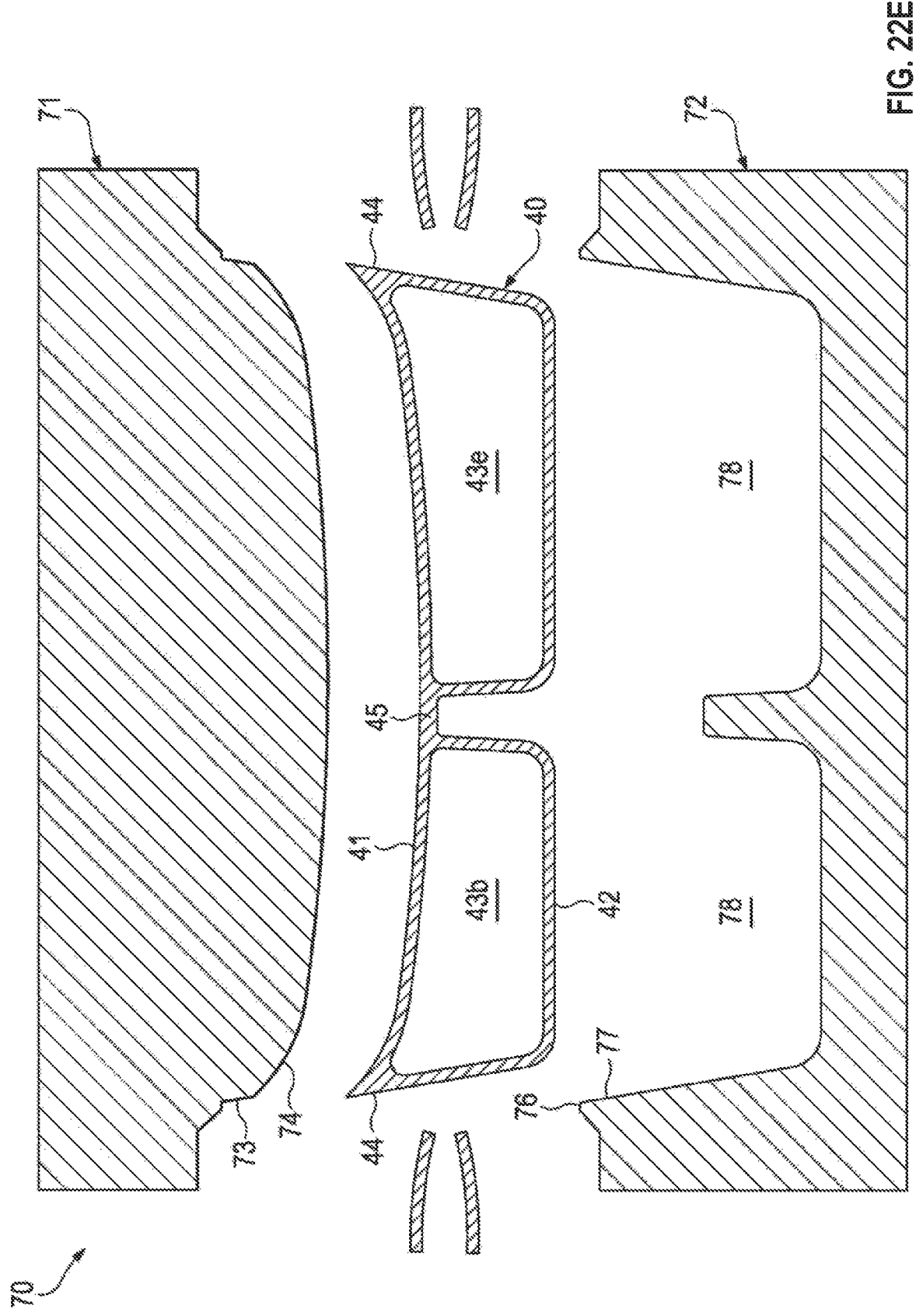

When forming forefoot component 40 is complete, mold 70 is opened and forefoot component 40 is removed and permitted to cool, as depicted in FIG. 22E. A fluid may then be injected into forefoot component 40 to pressurize chambers 43a-43f, thereby completing the manufacture of forefoot component 40. As a final step in the process, forefoot component 40 may be incorporated into sole structure 30 of footwear 10.

Manufacturing Process for Heel Component

Figure 23:
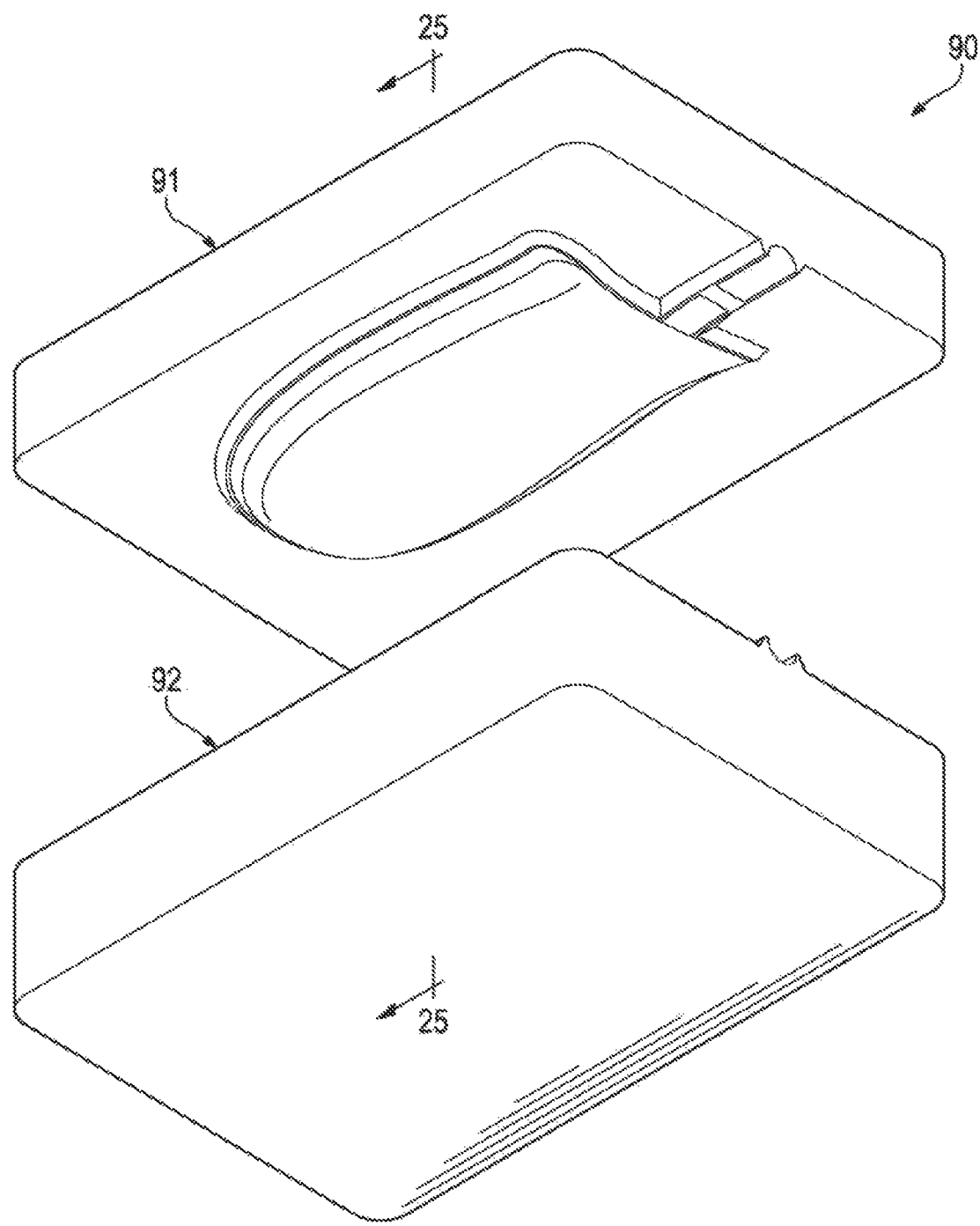
FIGS. 23 and 24 are perspective views of a heel component mold.
Figure 24:
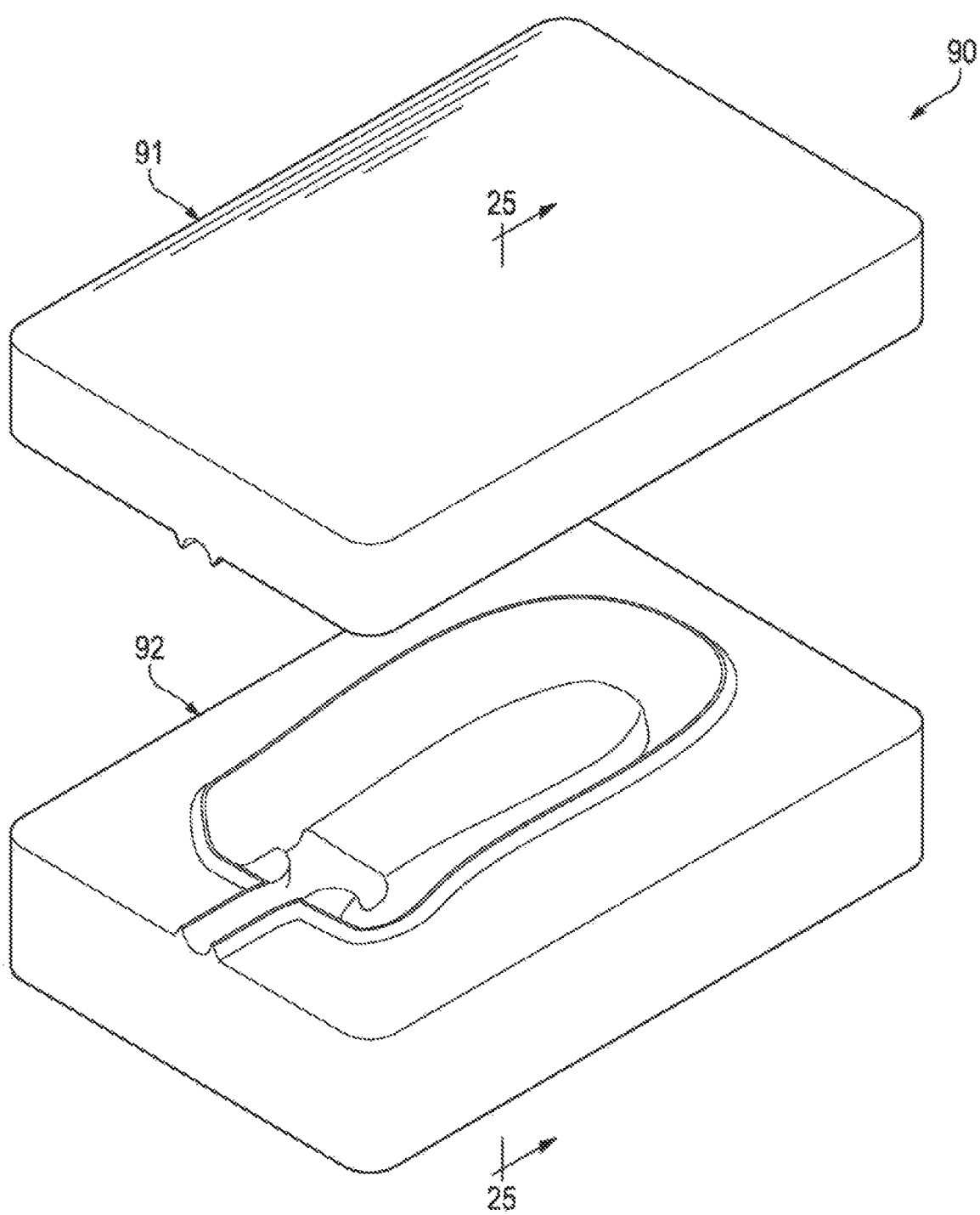

Although a variety of manufacturing processes may be utilized, heel component 50 may be formed through a process that is generally similar to the process discussed above for forefoot component 40. With reference to FIGS. 23 and 24, a mold 90 that may be utilized in the manufacturing process is depicted as including a first mold portion 91 and a second mold portion 92. As discussed below in reference to FIGS. 25A-25D, mold 90 is utilized to form heel component 50 from additional elements of first polymer layer 81 and second polymer layer 82, which are the polymer layers respectively forming first surface 51 and second surface 52. More particularly, mold 90 facilitates the manufacturing process by (a) shaping polymer layers 81 and 82 in areas corresponding with chamber 53 and flange 54 and (b) joining polymer layers 81 and 82 in areas corresponding with flange 54 and web area 55. In addition, mold 90 facilitates the bonding of outsole 60 to heel component 50.

Figure 25B:
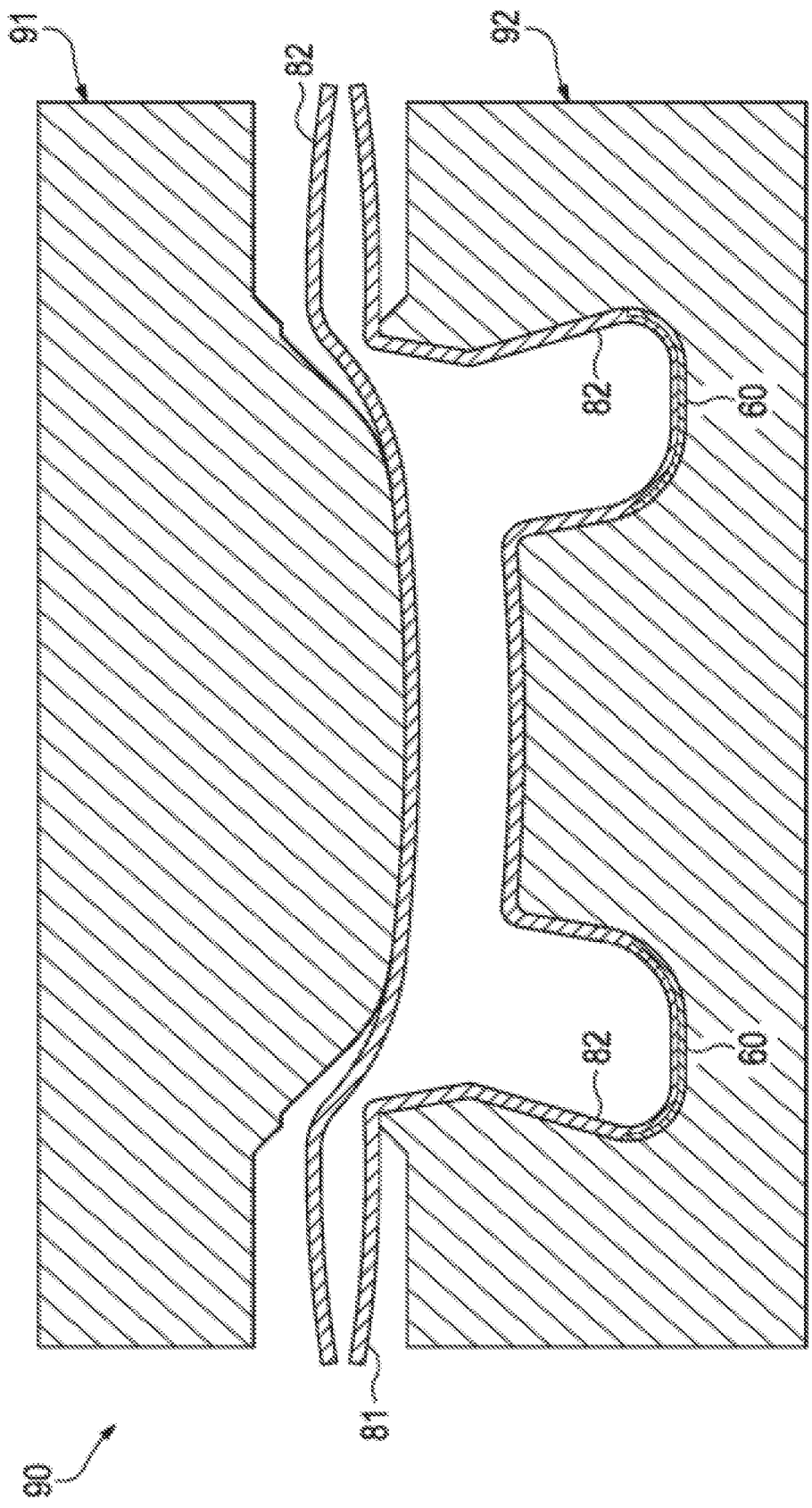

Each of polymer layers 81 and 82 are initially located between each of mold portions 91 and 92, as depicted in FIG. 25A. In addition, one or more elements that form outsole 60 are also located relative to mold 90. Once polymer layers 81 and 82 are properly positioned and the elements of outsole 60 are located within depressions in second mold portion 91, mold portions 91 and 92 translate or otherwise move toward each other and begin to close upon polymer layers 81 and 82, as depicted in FIG. 25B. As discussed above, air may be partially evacuated from the areas between (a) first mold portion 91 and first polymer layer 81 and (b) second mold portion 92 and second polymer layer 82. Additionally, air may be injected into the area between polymer layers 81 and 82. Using one or both of these techniques, polymer layers 81 and 82 are induced to engage the surfaces of mold 90. Additionally, polymer layers 81 and 82 also lay against outsole 60. In effect, therefore, polymer layers 81 and 82 are shaped against surfaces of mold 90 and outsole 60.

Figure 25C:
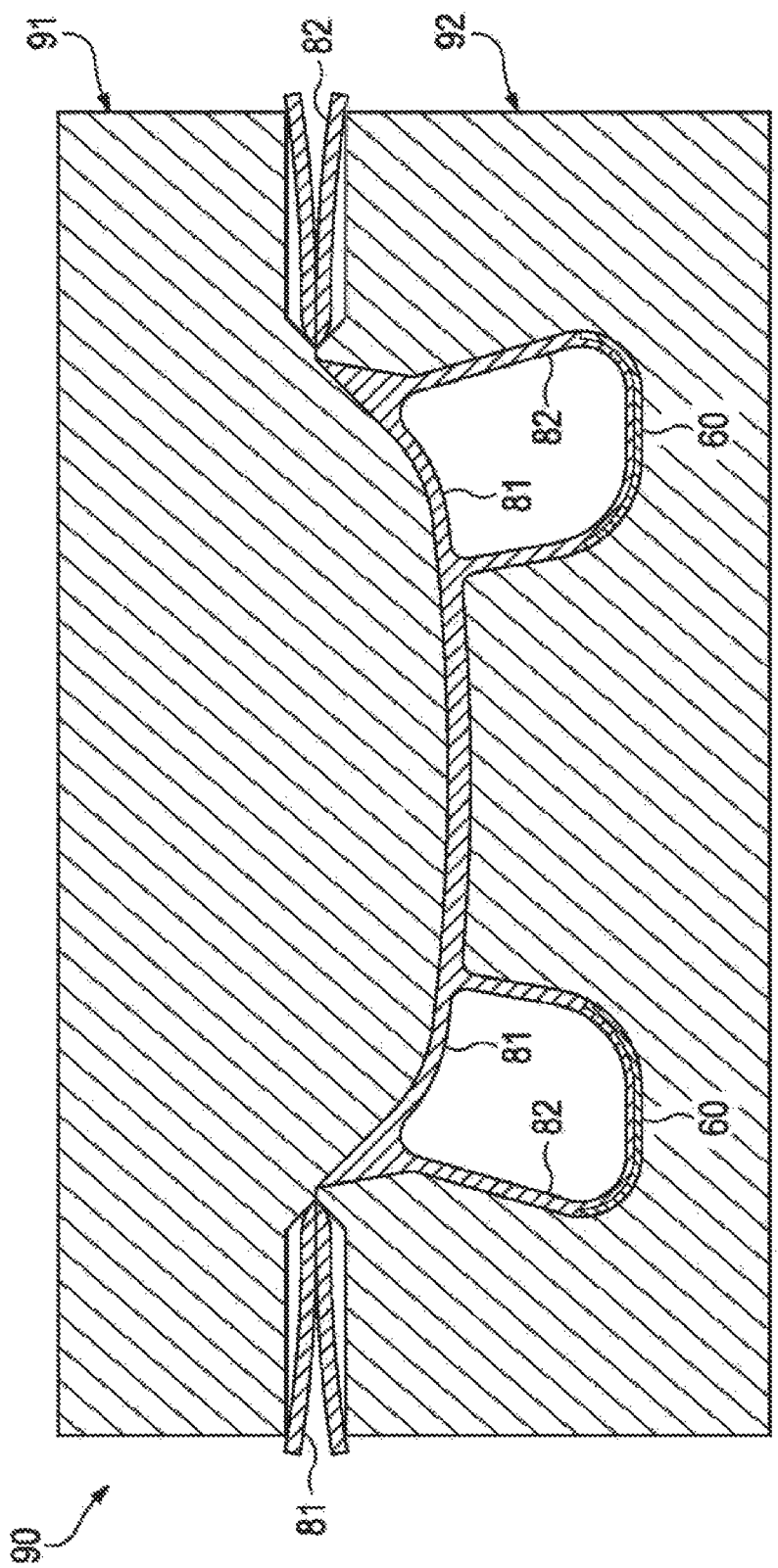

As mold portions 91 and 92 continue to move toward each other, polymer layers 81 and 82 are compressed between mold portions 91 and 92, as depicted in FIG. 25C. More particularly, polymer layers 81 and 82 are compressed to form flange 54 and web area 55. Polymer layer 82 also bonds with outsole 60. In some configurations, outsole 60 may be thermal bonded to heel component 50 during the manufacturing process. For example, when each of polymer layer 82 and outsole 60 are formed from similar or compatible polymer materials, or when outsole 60 is at least partially formed from the polymer material of chamber 53, heating of the components may induce thermal bonding between the components.

Figure 25D:
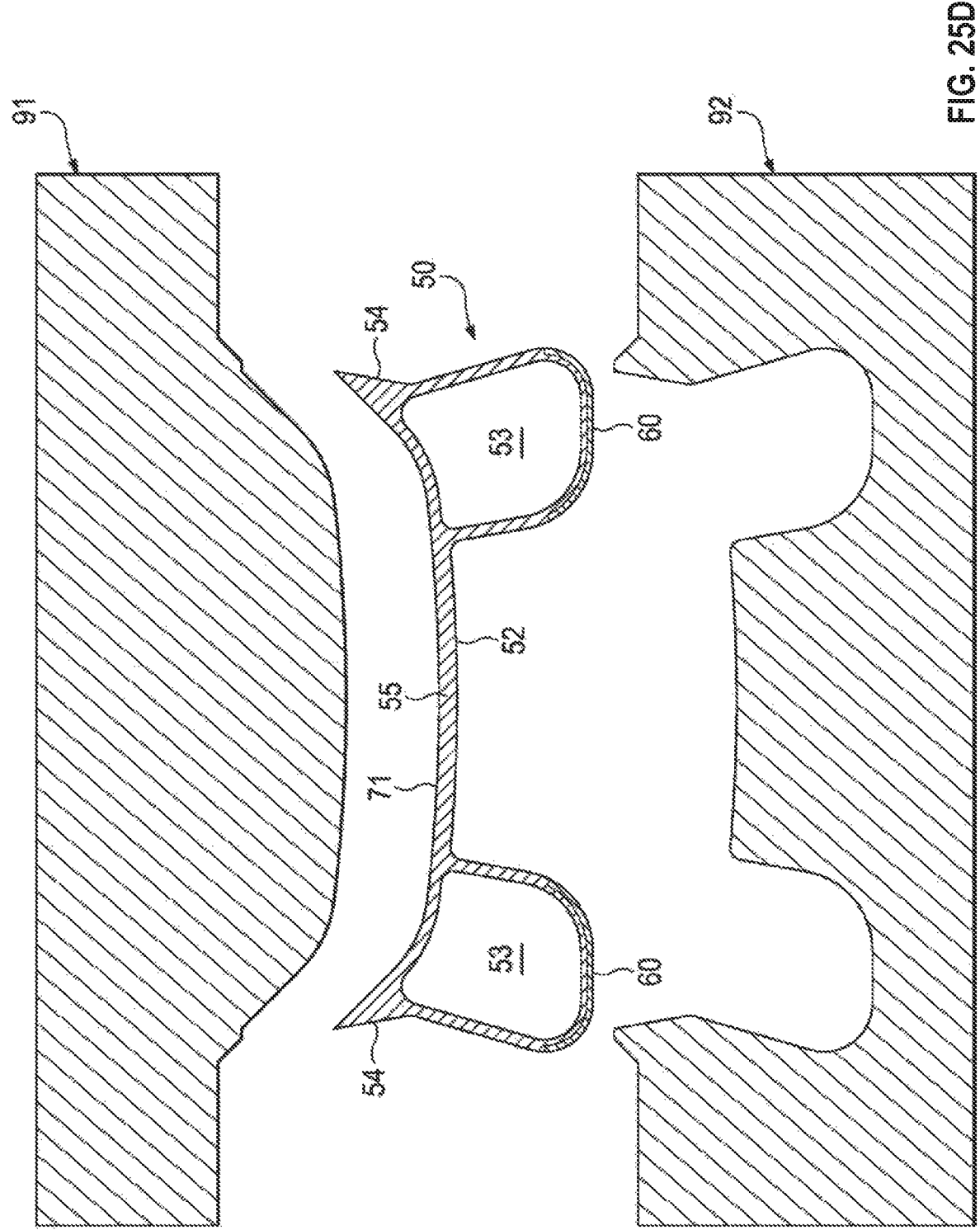

When forming heel component 50 is complete, mold 90 is opened and heel component 50 is removed and permitted to cool, as depicted in FIG. 25D. A fluid may then be injected into heel component 50 to pressurize chamber 53, thereby completing the manufacture of heel component 50. As a final step in the process, heel component 50 may be incorporated into sole structure 30 of footwear 10.

As polymer layers 81 and 82 are drawn into mold 90, particularly the larger depressions in second mold portion 91, polymer layers 81 and 82 stretch to conform with the contours of mold 90. When polymer layers 81 and 82 stretch, they also thin or otherwise decrease in thickness. Accordingly, the initial thicknesses of polymer layers 81 and 82 may be greater than the resulting thicknesses after the manufacturing process.

Figure 26A:
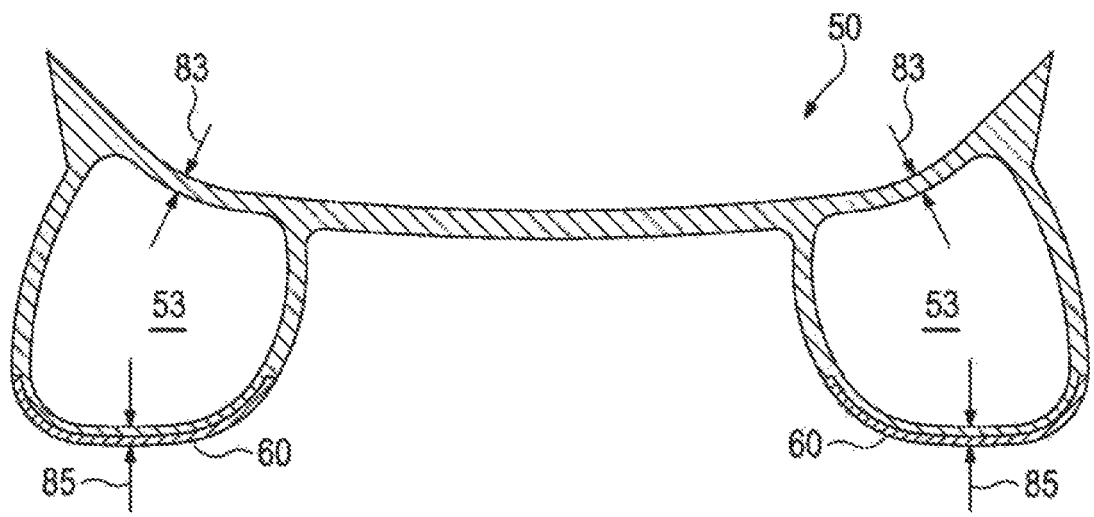
FIG. 26A is a cross-sectional view corresponding with FIG. 17A and depicting another configuration of the heel component.
Figure 26B:
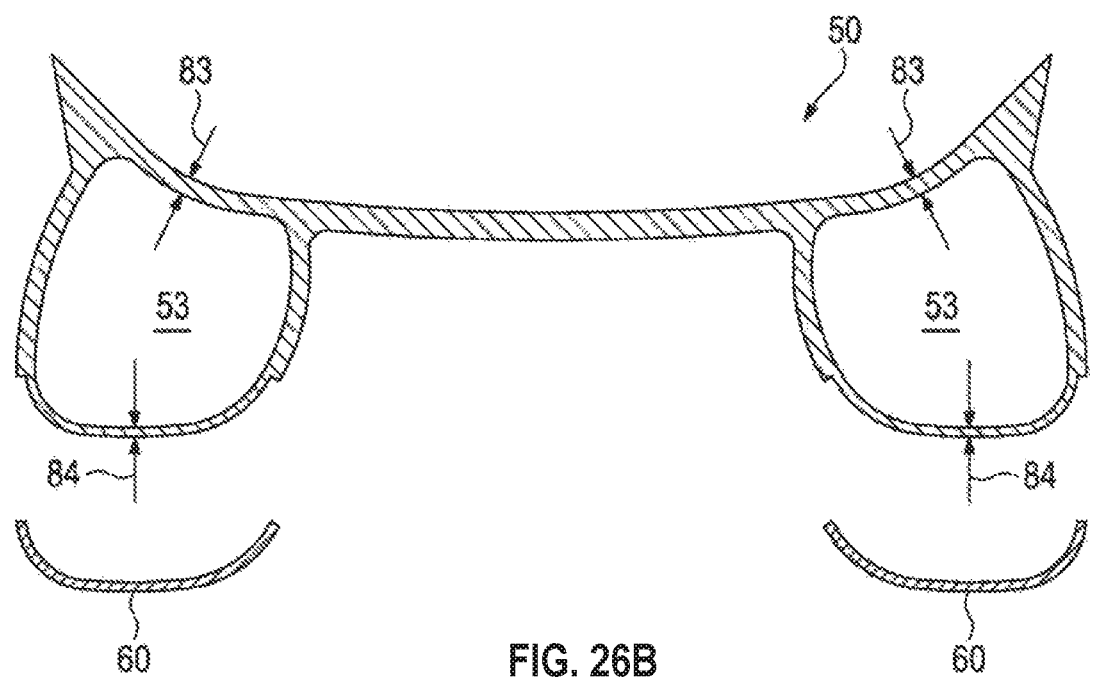
FIG. 26B is an exploded cross-sectional view of the configuration from FIG. 26A.

Referring to FIGS. 26A and 26B, various thickness dimensions 83, 84, and 85 are defined. Thickness dimension 83 is measured in an upper area of chamber 53 and between an exterior surface of chamber 53 and an interior surface of chamber 53, which defines the void. Thickness dimension 84 is measured in a lower area of chamber 53 and between the exterior and interior surfaces of chamber 53. Thickness dimension 85 is measured in the same place as thickness dimension 84 and between an outer surface of outsole 60 and the interior surface of chamber 53.

For footwear applications, as noted above, a polymer thickness of 0.75 millimeter (0.03 inch) and a fluid pressure of 138 kilopascals (20 pounds per square inch) provides a suitable degree of compliance, force attenuation, and other properties. Polymer thicknesses of less than 0.75 millimeter may rupture or otherwise fail prematurely or after repeated use. The manufacturing processes for many chambers are designed, therefore, to ensure that the polymer thickness remains at or above 0.75 millimeter. In the manufacturing process for heel component 50, however, the relatively deep depressions in second mold portion 92 may result in thinning of second polymer layer 82 that is below the 0.75 millimeter threshold. That is, second polymer layer 82 may thin to a degree that makes heel component susceptible to rupturing. The bonding of outsole 60 to heel component 50, however, effectively thickens and reinforces the lower area of heel component 50.

Given the above discussion, thickness dimension 83 may be approximately 0.75 millimeter and thickness dimension 84 may be less than 0.75 millimeter, and possibly less than 0.50 millimeter (0.02 inch) or more than fifty percent less than thickness dimension 83. The addition of outsole 60 increases the thickness in the lower area of heel component 50, and generally increases the thickness to more than 0.75 millimeter. As such, thickness dimension 83 may be (a) more than thickness dimension 84 and (b) less than thickness dimension 85. Moreover, designing heel component 50 such that thickness dimension 85 is greater than thickness dimension 83 ensures that outsole 60 may wear from contact with the ground.

In addition to providing a wear surface in footwear 10, outsole 60 may enhance various properties of sole structure 30. The thickness, flexibility, and stretch of outsole 60, for example, may be varied or selected to modify or otherwise tune the cushioning response, flexibility, compressibility, and other properties of sole structure 30. Ribs, apertures, or other features of outsole 60 may also affect the resulting properties of sole structure 30. Outsole 60 may also incorporate tread elements (e.g., protrusions, ridges) that imparts traction. Regarding aesthetics, outsole 60 may be colored, clear, or patterned to enhance the visual appeal of footwear 100. In some configurations, outsole 60 may be replaced by a plate or other structural element in the manufacturing process discussed above. In addition to modifying the properties of sole structure 30, a plate may have features that assist with securing an outsole or other element to heel component 50.

Figure 27:
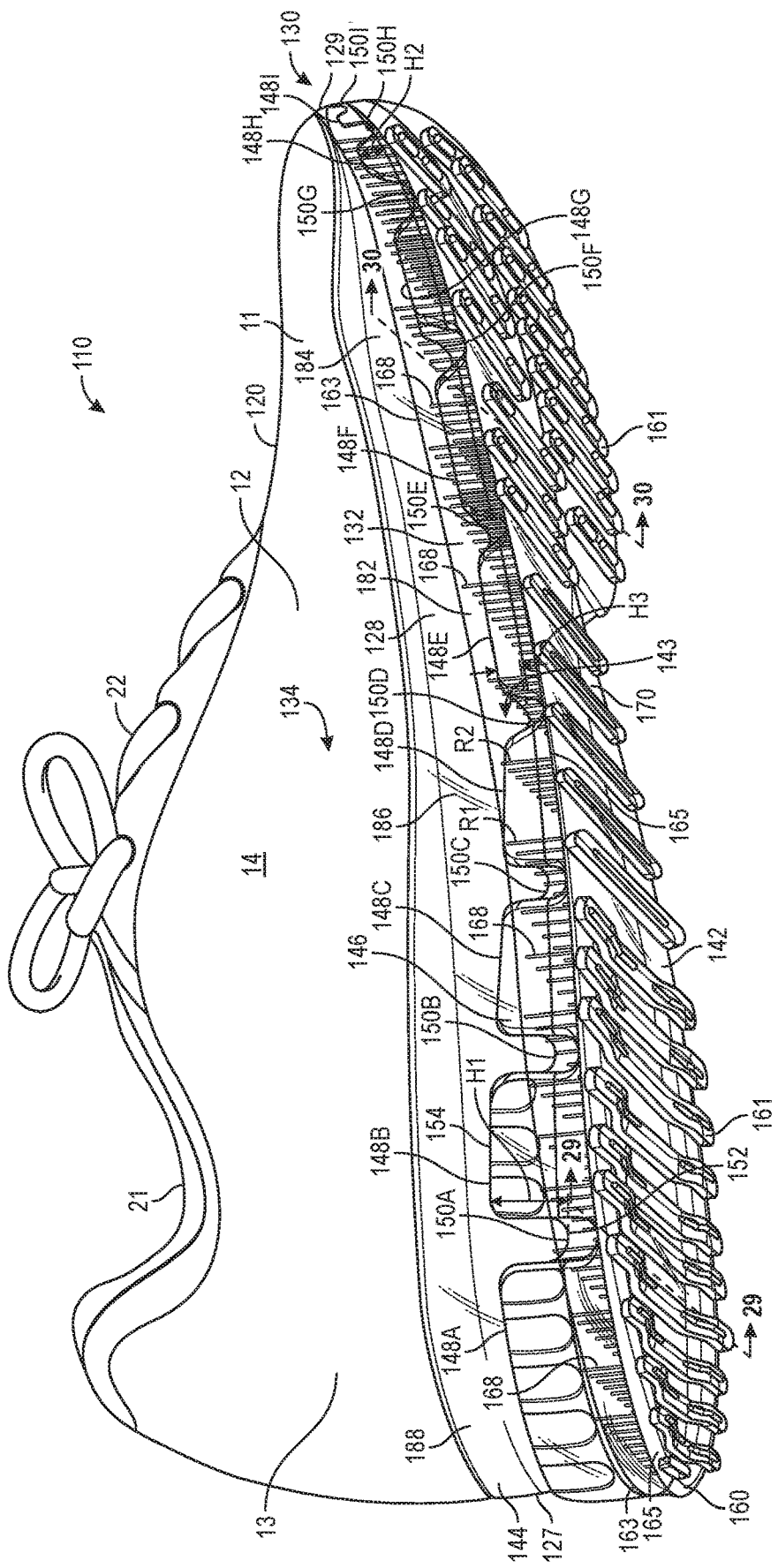
FIG. 27 is a schematic perspective illustration of another configuration of an article of footwear and showing a lateral side and a bottom.
Figure 28:
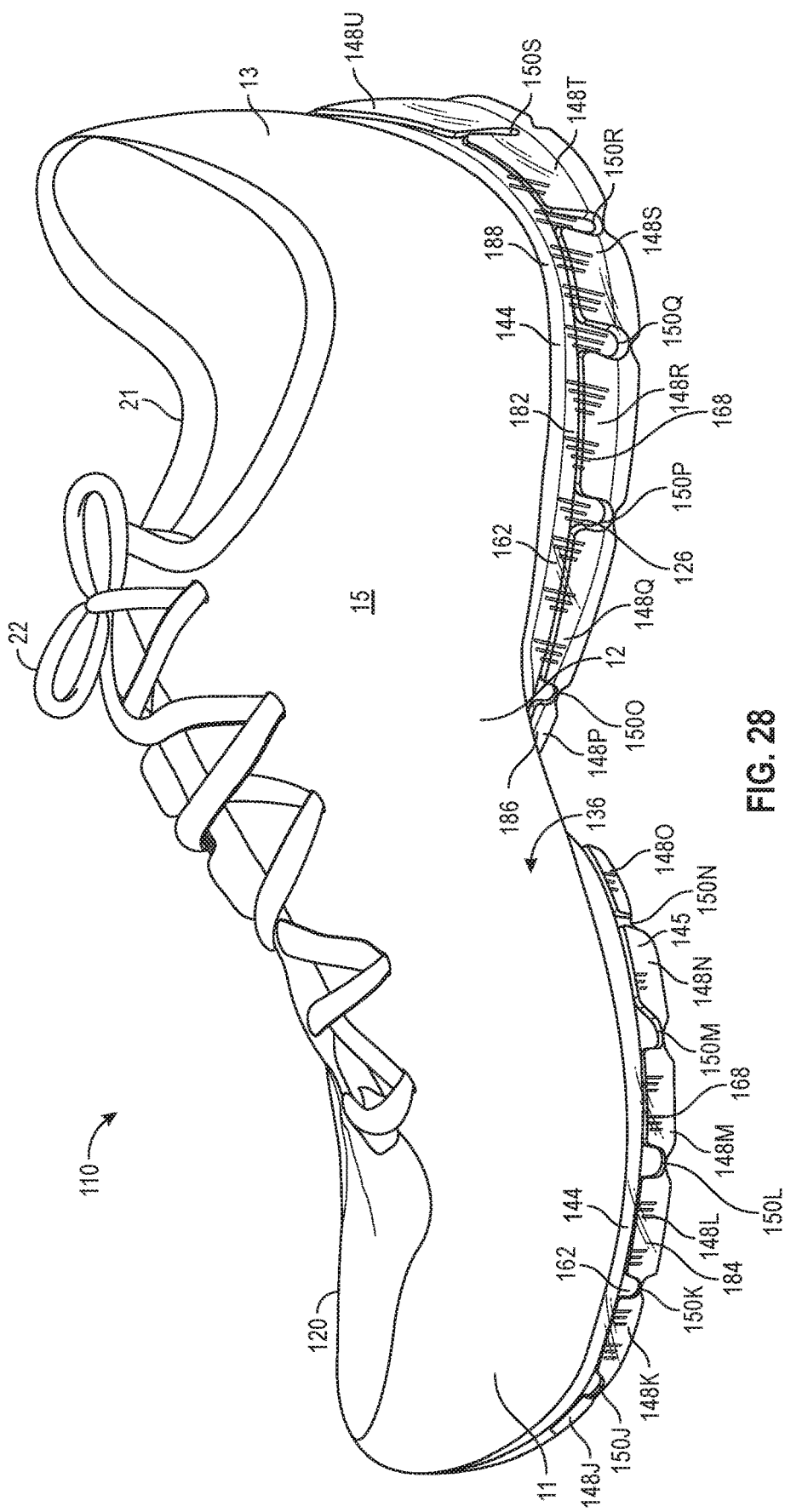
FIG. 28 is a schematic perspective illustration of the article of footwear of FIG. 27 and showing a medial side.
Figure 29:
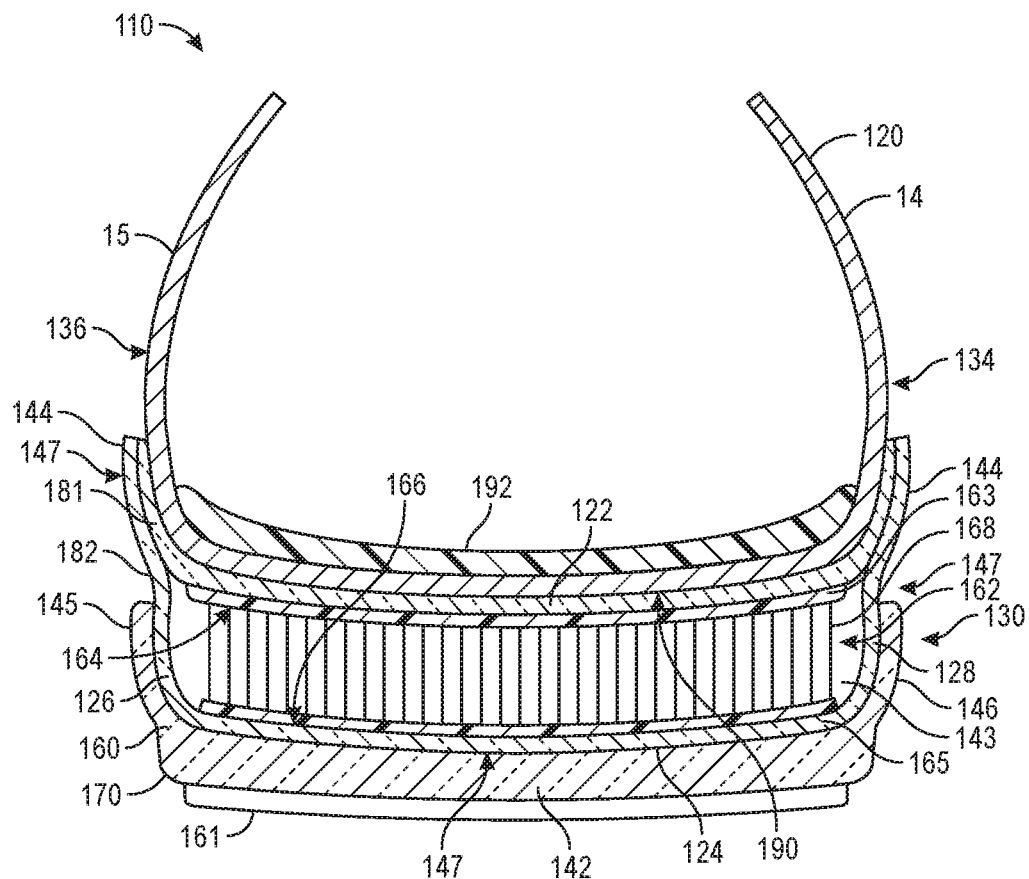
FIG. 29 is a schematic cross-sectional illustration of the article of footwear of FIG. 27 taken at lines 29-29 in FIG. 27.

FIG. 27 shows another configuration of an article of footwear 110. Features of the article of footwear 110 that are the same as those shown and described with respect to article of footwear 10 are indicated with like reference numbers. The article of footwear 110 has a sole structure 130 that includes a cushioning component 132 defining an enclosed, fluid-filled chamber 143. As best shown in FIG. 29, the sole structure 130 also includes a unitary outsole 160 bonded to a bottom wall 124 and to side walls 126, 128 of the cushioning component 132 such that the outsole 160 wraps substantially up the side walls 124, 126. The outsole 160 is also bonded to a rear wall 127 and a front wall 129 of the cushioning component 132, as indicated in FIG. 27. As shown in FIGS. 27-31, the outsole 160 includes integral tread portions 161 that can be injection molded integrally with a body portion 170 of the unitary outsole 160. Alternatively, the tread portions 161 can be positioned in a mold assembly adjacent the body portion 170 and can thermally bond to the body portion 170 during molding of the cushioning component 132. The tread portions 161 may have a variety of different shapes and patterns.

The cushioning component 132 may be formed from a polymer material, such as any of the polymer materials described with respect to the article of footwear 10. For example, in the embodiment of FIG. 27, the cushioning component 132 includes a first polymer sheet 181 and a second polymer sheet 182, which may also be referred to as an upper polymer sheet and a lower polymer sheet, respectively. The second polymer sheet 182 is bonded to the first polymer sheet 181 so that the first and second polymer sheets form a peripheral flange 144 and define the fluid-filled chamber 143. More specifically, with reference to FIG. 29, the first polymer sheet 181 forms a top wall 122 of the cushioning component 132. The second polymer sheet 182 forms a bottom wall 124, a medial side wall 126 and a lateral side wall 128 of the cushioning component 132.

The first and second polymer sheets 181, 182 may be molded by thermoforming, as described herein, so that the peripheral flange 144 is nearer the top wall 122 than the bottom wall 124 as shown in FIG. 29. This allows the flange 144 of the cushioning component 132 to bond to and cup the upper 120 by extending along lateral and medial surfaces 134, 136 of the upper 120 as shown in FIGS. 27-30 and further discussed herein. In the embodiment shown, the cushioning component 132 includes a forefoot portion 184, a midfoot portion 186, and a heel portion 188 corresponding with the forefoot portion 11, the midfoot portion 12, and the heel portion 13 of the article of footwear 110, and the chamber 143 formed by the cushioning component 132 extends under the upper 120 at the forefoot portion 11, the midfoot portion 12, and the heel portion 13 of the article of footwear 110. The cushioning component 132 may thus be referred to as a full length cushioning component.

In one embodiment, the first and second polymer sheets 181, 182 are multi-layer polymer sheets including thermoplastic polyurethane layers alternating with barrier layers that comprise a copolymer of ethylene and vinyl alcohol (EVOH) impermeable to fluid contained in the chamber 143. The fluid may be air, nitrogen, or another gas used to inflate the chamber 143.

Figure 30:
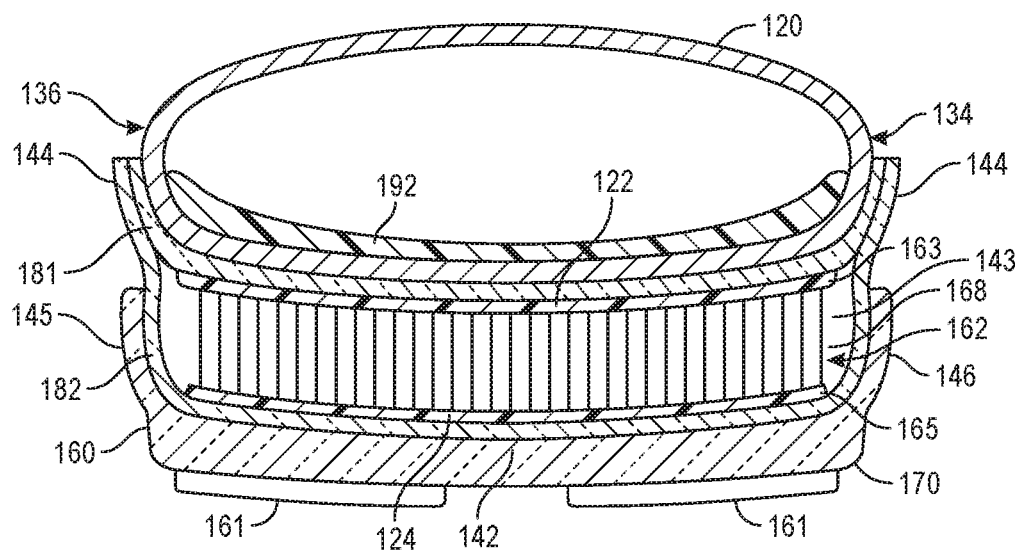
FIG. 30 is a schematic cross-sectional illustration of the article of footwear of FIG. 27 taken at lines 30-30 in FIG. 27.

As best shown in FIGS. 29 and 30, the cushioning component 132 may include a tether element 162 within the chamber 143. The tether element 162 includes a first plate 163 bonded to an inner surface 164 of the top wall 122. The tether element 162 further includes a second plate 165 bonded to an inner surface 166 of the bottom wall 124. The plates 163, 165 may be a thermoplastic material that thermally bonds to the first and second polymer sheets 181, 182 during thermoforming of the polymer sheets 181, 182, as discussed with respect to FIG. 32. As shown in FIG. 27 the plates 163, 165 extend through the entire cushioning component 132, in the forefoot portion 184, the midfoot portion 186, and the heel portion 188. In other embodiments, the plates 163, 165 may extend in only one or only two of the forefoot portion 184, the midfoot portion 186, and the heel portion 188, or multiple tether elements can be secured to the first and second polymer sheets 181, 182 within the chamber 143.

The cushioning component 132 also includes a plurality of tethers 168 secured to the first plate 163 and to the second plate 165 and extending in the fluid-filled chamber 143 between the first plate 163 and the second plate 165. The tethers 168 are placed in tension by fluid in the chamber 143, and, because they are secured to the plates 163, 165, act to control the shape of the cushioning component 132 when the chamber 143 is filled with pressurized fluid. The tethers 168 may be any of a variety of different configurations including single strands of textile tensile members secured at each end to plates 163, 165, or repeatedly passing through one or both plates 163, 165. Various configurations of tethers are shown and described in U.S. Pat. No. 8,479,412, which is hereby incorporated by reference in its entirety.

Multiple rows of tethers 168 are present and extend across a width of the plates 163, 165 between the lateral side 14 and the medial side 15 of the article of footwear 110. FIG. 27 shows multiple rows of tethers 168 extending laterally and positioned in the forefoot region 11, the midfoot region 12, and the heel region 13. Each tether 168 shown in the cross-section of FIG. 29 is in one row, and each tether 168 shown in the cross-section of FIG. 29 is in a different row than the row shown in FIG. 29.

The outsole 160 has a bottom portion 142, a medial side portion 145, and a lateral side portion 146. As shown in FIG. 27, the bottom portion 142 is bonded to an outer surface 147 of the second polymer sheet 182 at the bottom wall 124 of the cushioning component 132. The bottom portion 142 of the outsole 160 is coextensive with the bottom wall 124 of the cushioning component 132. The medial side portion 145 of the outsole 160 is bonded to the outer surface 147 of the second polymer sheet 182 at the medial side wall 126 of the cushioning component 132, and the lateral side portion 146 of the outsole 160 is bonded to the outer surface 147 of the second polymer sheet 182 at the lateral side wall 128 of the cushioning component 132.

One or both of the side portions 145, 146 of the outsole 160 may include one or more peaks and one or more valleys. For example, at least one of the lateral side portion 146 and the medial side portion 145 may form at least one peak disposed between the midfoot portion 186 and the heel portion 188, and at least one valley disposed rearward of the at least one peak. In the embodiment shown, the peaks may be referred to as spaced fingers and the valleys may be referred to as notches defined by the spaced fingers. In particular, a peak that has a height greater than its width may be referred to as a finger, and a valley that has a depth greater than its width may be referred to as a notch. For example, with reference to FIG. 27, the lateral side portion 146 includes a plurality of spaced peaks 148A, 148B, 148C, 148D, 148E, 148F, 148G, 148H, 148I and valleys 150A, 150B, 150C, 150D, 150E, 150F, 150G, 150H, 150I between adjacent ones of the peaks 148A, 148B, 148C, 148D, 148E, 148F, 148G, 148H, 148I. Similarly, FIG. 28 shows that the medial side portion 145 of the outsole 160 includes a plurality of spaced peaks 148J, 148K, 148L, 148M, 148N, 148O, 148P, 148Q, 148R, 148S, 148T, and 148U and valleys 150J, 150K, 150L, 150M, 150N, 150O, 150P, 150Q, 150R, and 150S between adjacent ones of the peaks 148J, 148K, 148L, 148M, 148N, 148O, 148P, 148Q, 148R, 148S, 148T, and 148U. Additional peaks and valleys may be included between peaks 148O and 148P at a portion of the outsole 160 covered by the upper 120 in the view of FIG. 28.

FIGS. 27 and 28 show that the peaks 148A, 148B, 148C, 148D, 148E, 148F, 148G, 148H, 148I, 148J, 148K, 148L, 148M, 148N, 148O, 148P, 148Q, 148R, 148S, 148T, and 148U are at least partially aligned with the tether element 162. The peaks 148A, 148B, 148C, 148D, 148E, 148F, 148G, 148H, 148I, 148J, 148K, 148L, 148M, 148N, 148O, 148P, 148Q, 148R, 148S, 148T, and 148U are positioned along the forefoot portion 184, the midfoot portion 186 and the heel portion 188 of the cushioning component 132, and the tether element 162 extends in each of these portions. At least some of the peaks 148A, 148B, 148C, 148D, 148E, 148F, 148G, 148H, 148I, 148J, 148K, 148L, 148M, 148N, 148O, 148P, 148Q, 148R, 148S, 148T, and 148U are also aligned with one or more rows of the tethers 168. A peak is aligned with a row of tethers 168 when it is positioned laterally adjacent the row. For example, FIG. 27 shows peak 148D laterally aligned with two different rows R1, R2 of the tethers 168. The valleys 150C, 150D, on the other hand, may be aligned with spaces between the rows of tethers 168. The positioning of the peaks and the valleys relative to the rows of tethers 168 can provide support to and flexibility of the cushioning component 132, respectively. There may be fewer or more peaks and valleys than shown in the embodiment of FIGS. 27 and 28, and the peaks and valleys may have different shapes than shown. For example, the peaks may be wider than shown, each extending further forward and rearward along the medial or lateral side portion 145 or 146. In some embodiments, there may be only one peak. The single peak may be positioned at or rearward of the midfoot portion 186, and a valley may be rearward of the single peak.

The spaced peaks 148A, 148B, 148C, 148D, 148E, 148F, 148G, 148H, 148I, 148J, 148K, 148L, 148M, 148N, 148O, 148P, 148Q, 148R, 148S, 148T, and 148U are configured to vary in height. In the embodiment shown in FIG. 27, a first one of the peaks 148B is at the heel portion 188 and has a first height H1. The height of each peak may be measured from a baseline at a lowest extent of an adjacent valley, to an upper edge of the peak 148B. For example, as shown in FIG. 27, the height H1 of peak 148B is from the baseline 152 at the lowest extent of valley 150A to the upper edge 154. A second one of the peaks 148H is at the forefoot portion 184 and has a second height H2 less than the first height H1. Generally, peaks in the heel portion 188 have a greater height than peaks in the forefoot portion. The peaks in the midfoot portion 186 have heights less than the heights of the peaks in the heel portion. Optionally, the peaks in the midfoot portion 186 can have a height less than the height of the peaks in the forefoot portion 184. For example, a third one of the peaks 148E is at the midfoot portion 186 and has a third height H3 less than the second height H2.

In the embodiment of FIGS. 27-30 the entire outsole 160 is substantially transparent, and may be a substantially transparent thermoplastic polyurethane material. The polymer sheets 181, 182 can also be substantially transparent. This allows the tethers 168 to be viewed through the outsole 160 and the second sheet 182. The tethers 168 can be viewed through both the peaks and the valleys. Those skilled in the art will readily understand a variety of methods to determine transparency of an object, such as by a test of luminous transmittance and haze. For example, the luminous transmittance and haze of the cushioning component 132 and of the outsole 160 can be determined according to American Society for Testing and Materials (ASTM) Standard D1003-00, Standard Test Method for Haze and Luminous Transmittance of Transparent Plastics.

Figure 31:
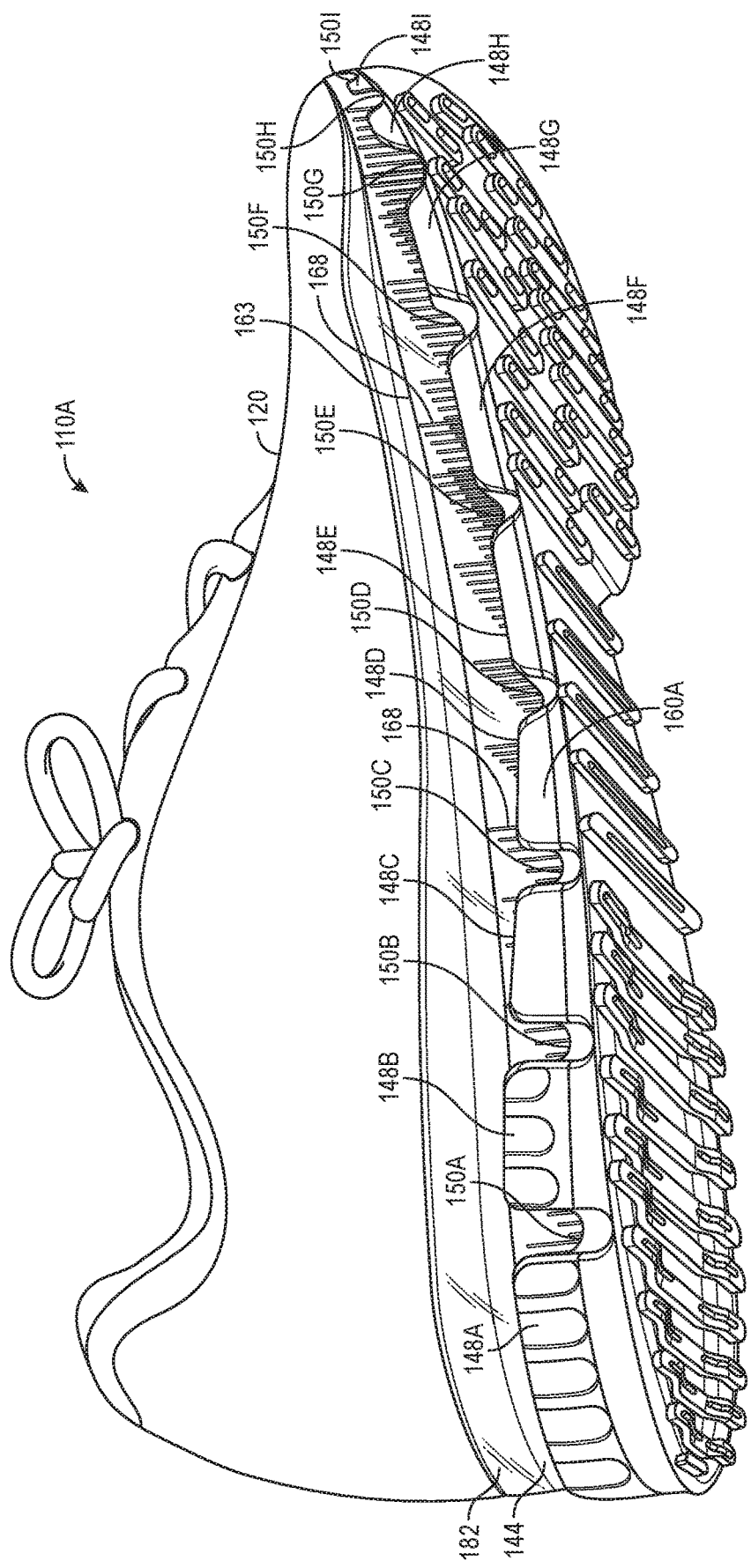
FIG. 31 is a schematic perspective illustration of another configuration of an article of footwear.

FIG. 31 shows an alternative embodiment of an article of footwear 110A alike in all aspects to the article of footwear 110, except that an outsole 160A is used that is not substantially transparent. For example, the outsole 160A can be an opaque material, such as a durable rubber material. In such an embodiment, the tethers 168 can be viewed through the second sheet 182 at the valleys of the outsole 160A, but not through the peaks of the outsole 160A, as illustrated with respect to peaks 148A-148I and valleys 150A-150I.

With reference to FIG. 29, the cushioning component 132 is secured to the upper 120 so that a bottom surface 190 of the upper 120 is secured to and supported on the top wall 122 of the cushioning component 132, and the peripheral flange 144 is bonded to the lateral surface 134 and the medial surface 136 of the upper 120. In an embodiment in which an additional footwear component, such as additional midsole layer, is positioned between the cushioning component 132 and the upper 120, the flange 144 could bond to and cup the additional footwear component in addition to or instead of the upper 120, depending upon how far upward the flange 144 extends.

Figure 32:
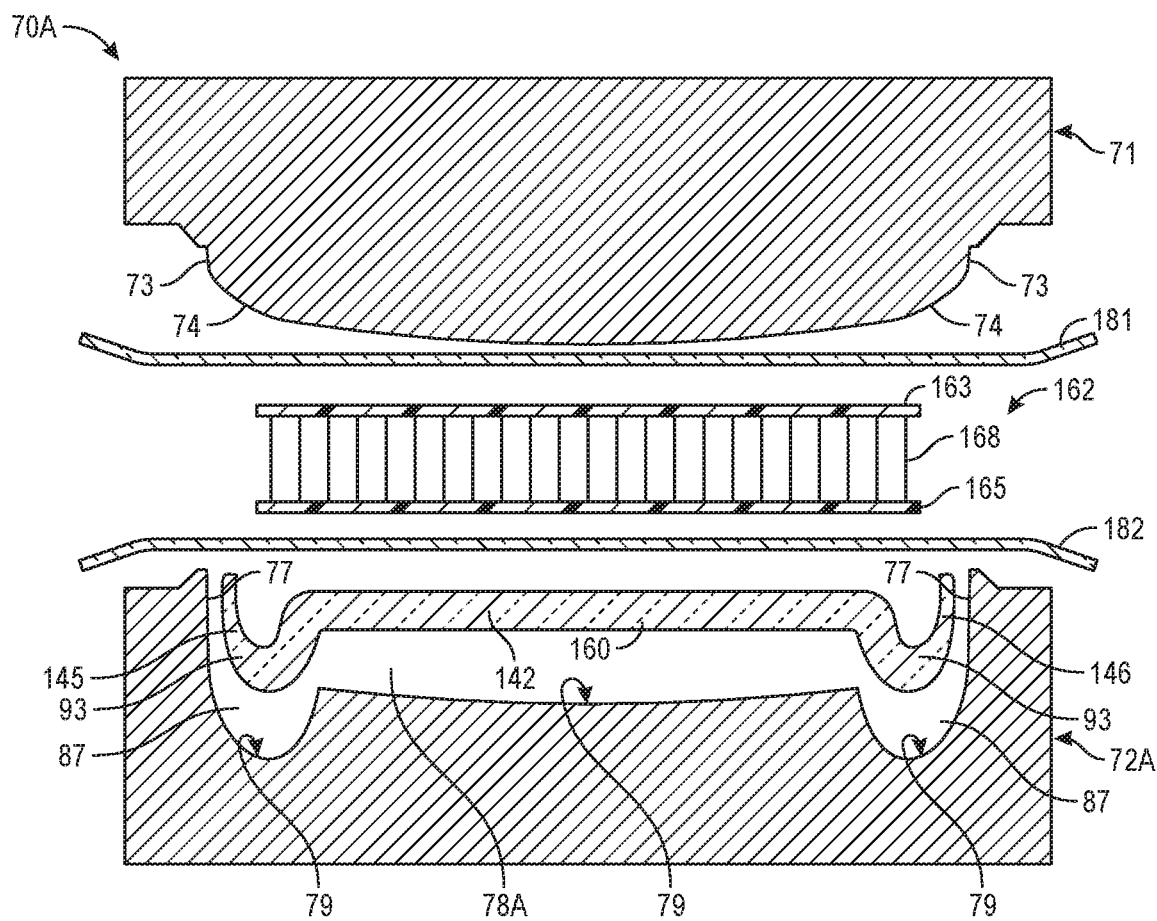
FIG. 32 is a schematic illustration in exploded cross-sectional view of a sole structure of the article of footwear of FIG. 27 and a mold assembly for a manufacturing process.

FIG. 32 shows a mold assembly 70A that can be used to manufacture the cushioning component 132. Features of the mold assembly 70A that are the same as those described with respect to mold 70 are indicated with like reference numbers. The mold assembly 70A is substantially identical to the mold 70 of FIG. 22A except that a second mold portion 72A is used that has an inner surface 79 shaped with relatively deep side grooves or depressions 87, also referred to as accumulator portions, and a shallower central depression 78A. The outsole 160 is preformed in the shape shown in FIG. 32 that generally corresponds to the inner surface 79, with protrusions 93 at the intersection of the bottom portion 142 and the side portions 145, 146. The preformed shape of the outsole 160 with the protrusions 93 and the inner surface 79 of the mold portion 72A shown in FIG. 32 enables the plates 163, 165 to be compressed against and thermally bond to the first and second polymer sheets 181, 182 when the mold assembly 70A is closed, at the same time that the sheets 181, 182 are compressed and thermally bond to one another at the flange 144. After thermoforming, upon inflation of the fluid-filled chamber 43, the internal pressure causes the protrusions 93 to generally flatten out relative to the bottom portion 142, as shown in FIG. 29.

A method of manufacturing the article of footwear 110 or 110A using the mold 70A includes disposing first and second polymer sheets 181, 182 in a mold assembly 70A, and disposing a preformed unitary outsole, such as outsole 160 or 160A in the mold assembly 70A adjacent the second polymer sheet 182. The method may also include disposing the tether element 162 in the mold assembly 70A between the first and second polymer sheets 181, 182. The tether element 162 can be formed and inflated prior to placement in the mold assembly 70A, placing the tethers 168 in tension. The outsole 160 or 160A is disposed so that the second polymer sheet 182 is between the tether element 162 and the outsole 160 or 160A. The outsole 160 or 160A may be preformed by injection molding or otherwise prior to placement in the mold assembly 70A. Disposing the preformed unitary outsole 160 adjacent the second polymer sheet 182 may include aligning the peaks 148A, 148B, 148C, 148D, 148E, 148F, 148G, 148H, 148I, 148J, 148K, 148L, 148M, 148N, 148O, 148P, 148Q, 148R, 148S, 148T, and 148U with the tether element 162, such as with the rows of tethers 168, as discussed with respect to FIG. 27.

The first and second polymer sheets 181 and 182 may be preheated prior to placement in the mold assembly 70A to aid in formability of the sheets to the mold surfaces. The mold assembly 70A is closed. Heat and pressure are applied to thermoform the sheet 181 to the surface of the mold portion 71. Vacuum forming may be used to draw the sheet 181 against the mold portion 71, and to draw the sheet 182 against the outsole 160, and against the portions of the surface of the mold portion 72A where the flange 144 is formed.

The components within the mold assembly 70A thermally bond to one another during the thermoforming process. More specifically, the first and second polymer sheets 181, 182 thermally bond to one another at the flange 144 to form the cushioning component 132 with the chamber 143 containing the tether element 162. The tether element 162 thermally bonds to inner surfaces 164, 166 of the first and second polymer sheets 181, 182, respectively. The first plate 163 thermally bonds to the top wall 122 of the first polymer sheet 181, and the second plate 165 thermally bonds to the bottom wall 124 of the second polymer sheet 182. Additionally, the bottom portion 170 of the outsole 160 thermally bonds to the outer surface 147 of the bottom wall 124 of the second polymer sheet 182. The medial side portion 145 of the outsole 160 thermally bonds to the medial side wall 126 of the second polymer sheet 182. The lateral side portion 146 of the outsole 160 thermally bonds to the lateral side wall 128 of the second polymer sheet 182.

After the cushioning component 132 is formed with the outsole 160 thermally bonded thereto, the cushioning component 132 is removed from the mold assembly 70A, and the peripheral flange 144 is secured to the side surfaces 134, 136 of an additional footwear component, such as the upper 120. The peripheral flange 144 is also secured to the surface of the upper 120 at the rear of the heel portion 13 and at the front of the forefoot portion 11 as is evident in FIG. 27. The flange 144 thus cups the entire periphery of the upper 120 and the first polymer sheet 181 extends across the entire bottom surface 190 of the upper 120. An insole 192 can be secured in the upper 120.

Figure 33:
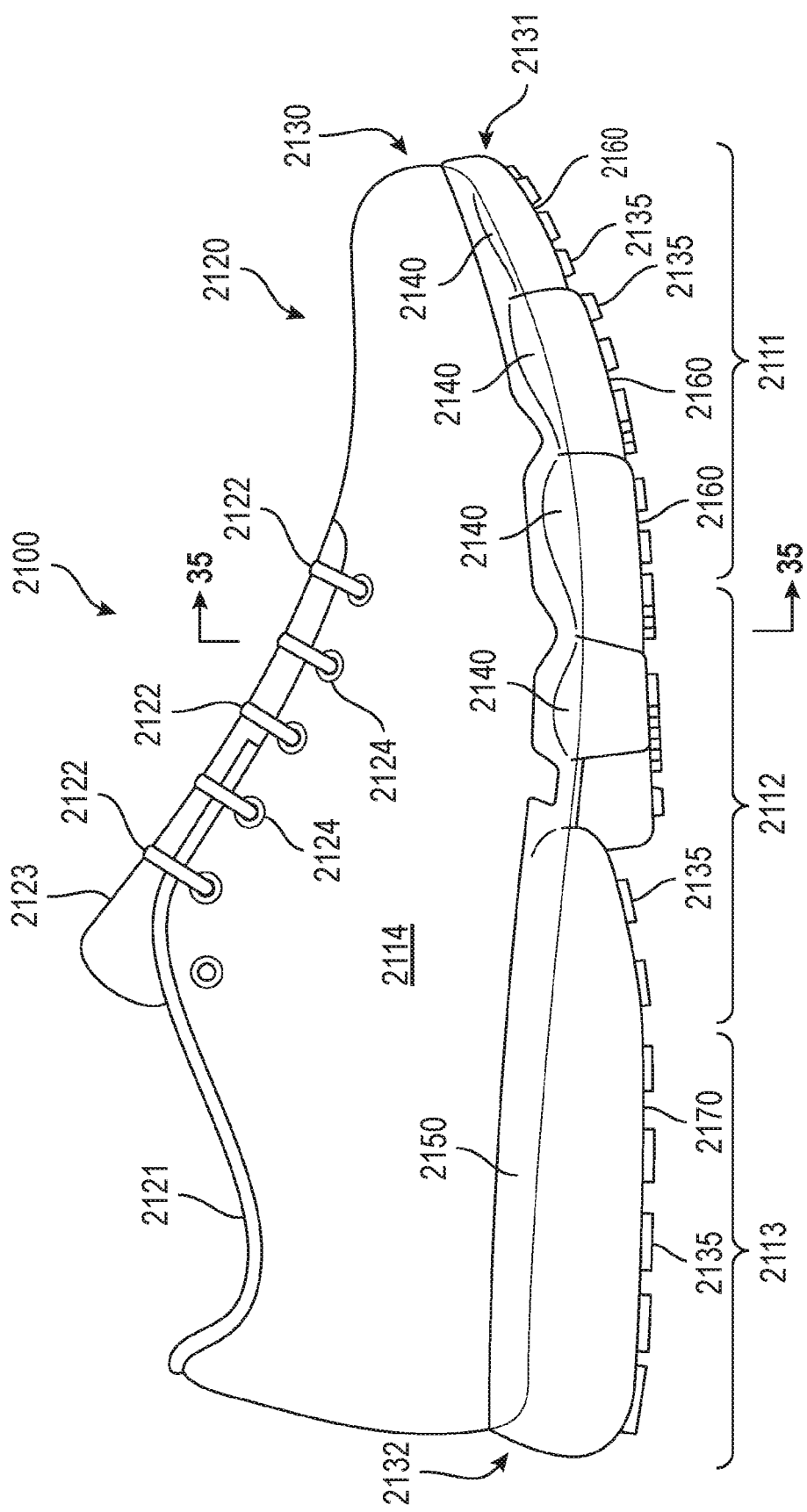
FIG. 33 is a schematic illustration in a lateral side elevational view of an embodiment of an article of footwear.
Figure 34:
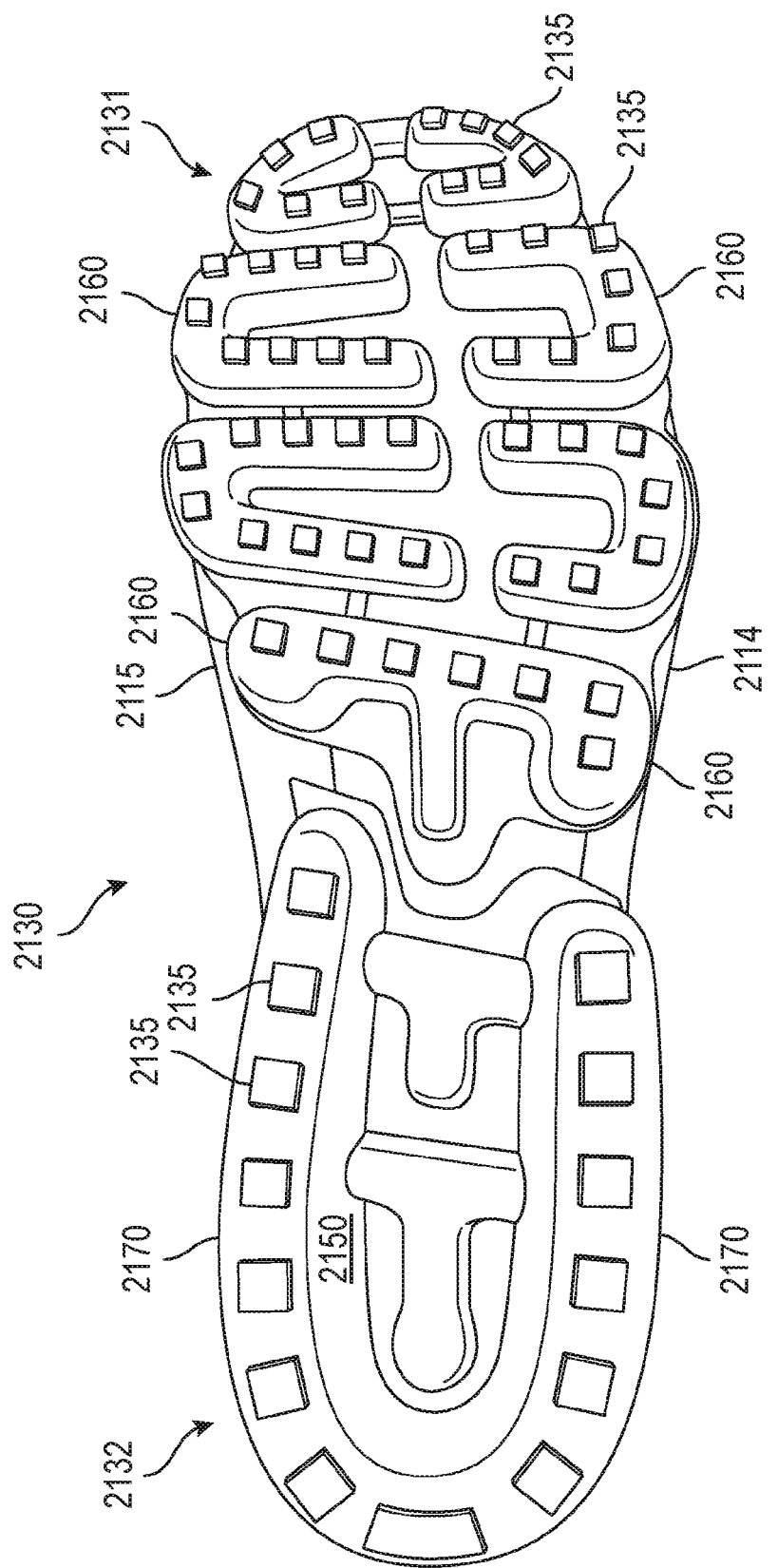
FIG. 34 is a schematic illustration in bottom view of the article of footwear of FIG. 33.

An article of footwear 2100 is depicted in FIG. 33 and FIG. 34 as including an upper 2120 and a sole structure 2130. Upper 2120 provides a comfortable and secure covering for a foot of a wearer. As such, the foot may be located within upper 2120 to effectively secure the foot within article of footwear 2100 or otherwise unite the foot and article of footwear 2100. Sole structure 2130 is secured to a lower area of upper 2120 and extends between the foot and the ground to attenuate ground reaction forces (i.e., cushion the foot), provide traction, enhance stability, and influence the motions of the foot, for example. In effect, sole structure 2130 is located under the foot and supports the foot.

For reference purposes, footwear 2100 may be divided into three general regions: a forefoot region 2111, a midfoot region 2112, and a heel region 2113. Forefoot region 2111 generally includes portions of article of footwear 2100 corresponding with toes of the foot and the joints connecting the metatarsals with the phalanges. Midfoot region 2112 generally includes portions of footwear 2100 corresponding with an arch area of the foot. Heel region 2113 generally corresponds with rear portions of the foot, including the calcaneus bone. Article of footwear 2100 also includes a lateral side 2114 and a medial side 2115, which correspond with opposite sides of article of footwear 2100 and extend through each of forefoot region 2111, midfoot region 2112, and heel region 2113. More particularly, lateral side 2114 corresponds with an outside area of the foot (i.e. the surface that faces away from the other foot), and medial side 2115 corresponds with an inside area of the foot (i.e., the surface that faces toward the other foot). Forefoot regions 2111, midfoot region 2112, heel region 2113, lateral side 2114, and medial side 2115 are not intended to demarcate precise areas of footwear 2100. Rather, forefoot region 2111, midfoot region 2112, heel region 2113, lateral side 2114, and medial side 2115 are intended to represent general areas of footwear 2100 to aid in the following discussion. The characterizations of forefoot region 2111, midfoot region 2112, heel region 2113, lateral side 2114, and medial side 2115 may be applied to article of footwear 2100, and also may be applied to upper 2120, sole structure 2130, forefoot structure 2131, heel structure 2132, and individual elements thereof.

Upper 2120 is depicted as having a substantially conventional configuration. A majority of upper 2120 incorporates various material elements (e.g., textiles, foam, leather, and synthetic leather) that are stitched or adhesively bonded together to form an interior void for securely and comfortably receiving a foot. The material elements may be selected and located in upper 2120 to selectively impart properties of durability, air-permeability, wear-resistance, flexibility, and comfort, for example. The void in upper 2120 is shaped to accommodate the foot. When the foot is located within the void, upper 2120 extends along a lateral side of the foot, along a medial side of the foot, over the foot, around the heel, and under the foot. An ankle opening 2121 in heel region 2113 provides the foot with access to the void. A lace 2122 extends over a tongue 2123 and through various lace apertures 2124 or other lace-receiving elements in upper 2120. Lace 2122 and the adjustability provided by tongue 2123 may be utilized in a conventional manner to modify the dimensions of ankle opening 2121 and the interior void, thereby securing the foot within the interior void and facilitating entry and removal of the foot from the interior void.

Further configurations of upper 2120 may also include one or more of (a) a toe guard positioned in forefoot region 2111 and formed of a wear-resistant material, (b) a heel counter located in heel region 2113 for enhancing stability, and (c) logos, trademarks, and placards with care instructions and material information. Given that various aspects of the present discussion primarily relate to sole structure 2130, upper 2120 may exhibit the general configuration discussed above or the general configuration of practically any other conventional or non-conventional upper. Accordingly, the structure of upper 2120 may vary significantly within the scope of the present disclosure.

Sole Structure

The primary elements of sole structure 2130 are a forefoot sole structure 2131 including a forefoot component 2140 and a forefoot outsole 2160, and a heel sole structure including a heel component 2150 and a heel outsole 2170. In some embodiments, each of forefoot component 2140 and heel component 2150 may be directly secured to a lower area of upper 2120. Forefoot component 2140 and heel component 2150 may be referred to herein as barriers, and are formed from a polymer material that encloses a fluid, which may be a gas, liquid, or gel. During walking and running, for example, forefoot component 2140 and heel component 2150 may compress between the foot and the ground, thereby attenuating ground reaction forces. That is, forefoot component 2140 and heel component 2150 are inflated and generally pressurized with the fluid to cushion the foot.

In some configurations, sole structure 2130 may include a foam layer, for example, that extends between upper 2120 and one or both of forefoot component 2140 and heel component 2150, or a foam element may be located within indentations in the lower areas of forefoot component 2140 and heel component 2150. In other configurations, forefoot sole structure 2131 may incorporate plates, moderators, lasting elements, or motion control members that further attenuate forces, enhance stability, or influence the motions of the foot. Heel sole structure 2132 also may include such members to further attenuate forces, enhance stability, or influence the motions of the foot.

In addition to providing a wear surface in article of footwear 2100, forefoot outsole 2160 and heel outsole 2170 may enhance various properties and characteristics of sole structure 2130. Properties and characteristics of the outsoles, such as the thickness, flexibility, the properties and characteristics of the material used to make the outsole, and stretch, may be varied or selected to modify or otherwise tune the cushioning response, compressibility, flexibility, and other properties and characteristics of sole structure 2130. Reinforcement of the outsole (for example, inclusion of structural elements, such as ribs), apertures, the height of the overlap, the number and location of the edges that overlap, or other features of an outsole all may be used to tune the responses of the sole structure. An outsole also may incorporate tread elements, such as protrusions, ridges, or ground-engaging lugs or sections, that impart traction. In some embodiments, an outsole may be replaced by a plate or other structural element. A plate may have features that assist with securing an outsole or other element to heel component 2150.

In particular, overlap of a portion of an outsole away from the ground-engaging portion and up the edge of a forefoot component or a heel component may be used to tune the elastic response and cushioning response of the resultant sole structure. An edge of a forefoot component or a heel component may also be referred to herein as a sidewall, side wall, or wall. With the guidance provided herein, these and other properties and characteristics of the outsole may be considered by the user in combination with the properties and characteristics of the fluid-filled components of the components to adjust the responses of a sole structure.

Sole structure 2130 may be translucent or transparent, and may be colored or patterned for aesthetic appeal.

Forefoot outsole 2160 is secured to lower areas of forefoot component 2140. In some embodiments, forefoot sole structure 2131 may extend into midfoot region 2112. The forefoot outsole 2160 also may be secured to lower areas of forefoot component 2140 in midfoot region 2112. Heel outsole 2170 is secured to lower areas of heel component 2150. Both heel component 2150 and heel outsole 2170 may extend into midfoot region 2112. Forefoot outsole 2160 and heel outsole 2170 may be formed from a wear-resistant material. The wear-resistant material may be transparent or translucent to provide a visually appealing effect. The wear-resistant material may be textured on the ground-engaging portions to impart traction. In some embodiments, the wear-resistant material may have ground-engaging lugs or portions 2135, as illustrated in FIG. 33 and FIG. 34.

Figure 35:
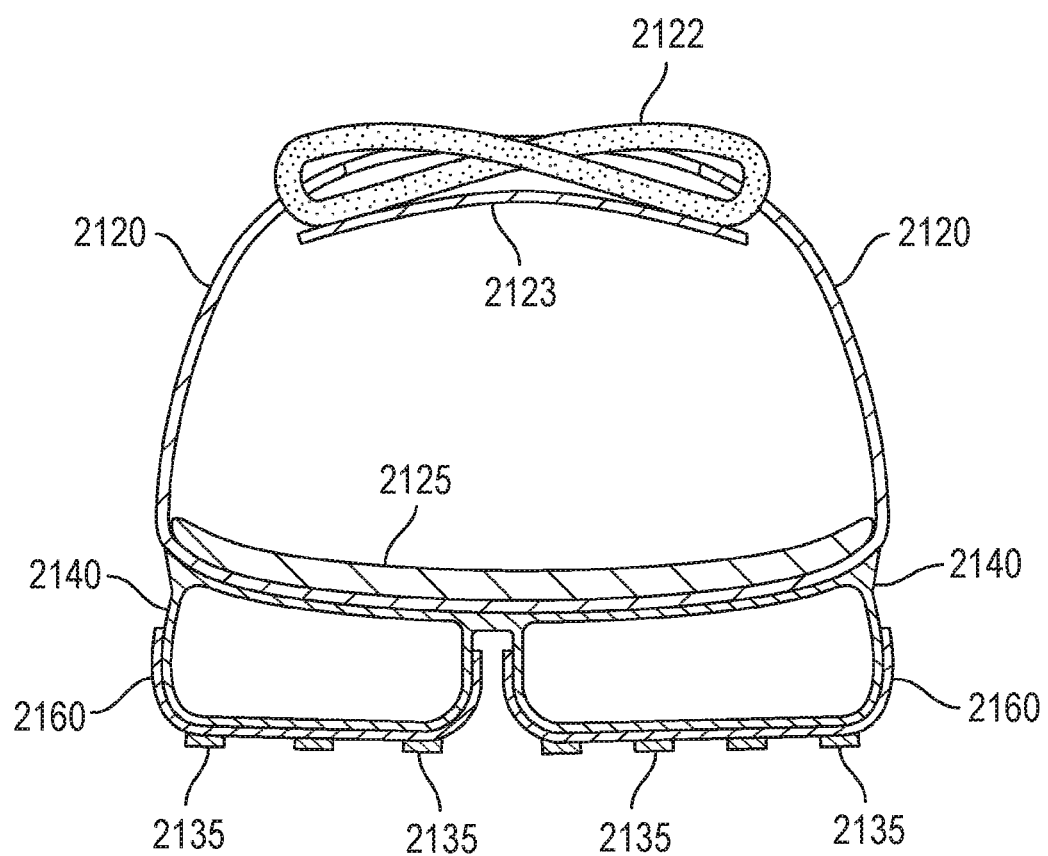
FIG. 35 is a cross-sectional view of the article of footwear of FIG. 34.

FIG. 35 illustrates a cross-sectional view of article of footwear 2100 at section line 35-35 of FIG. 33 with forefoot sole structure 2131, including forefoot component 2140 and forefoot outsole 2160 with ground-engaging lugs 2135. As depicted in FIG. 35, upper 2120 also includes a sock-liner 2125 that is located within the void and positioned to extend under a lower surface of the foot to enhance the comfort of article of footwear 2100.

Figure 36:
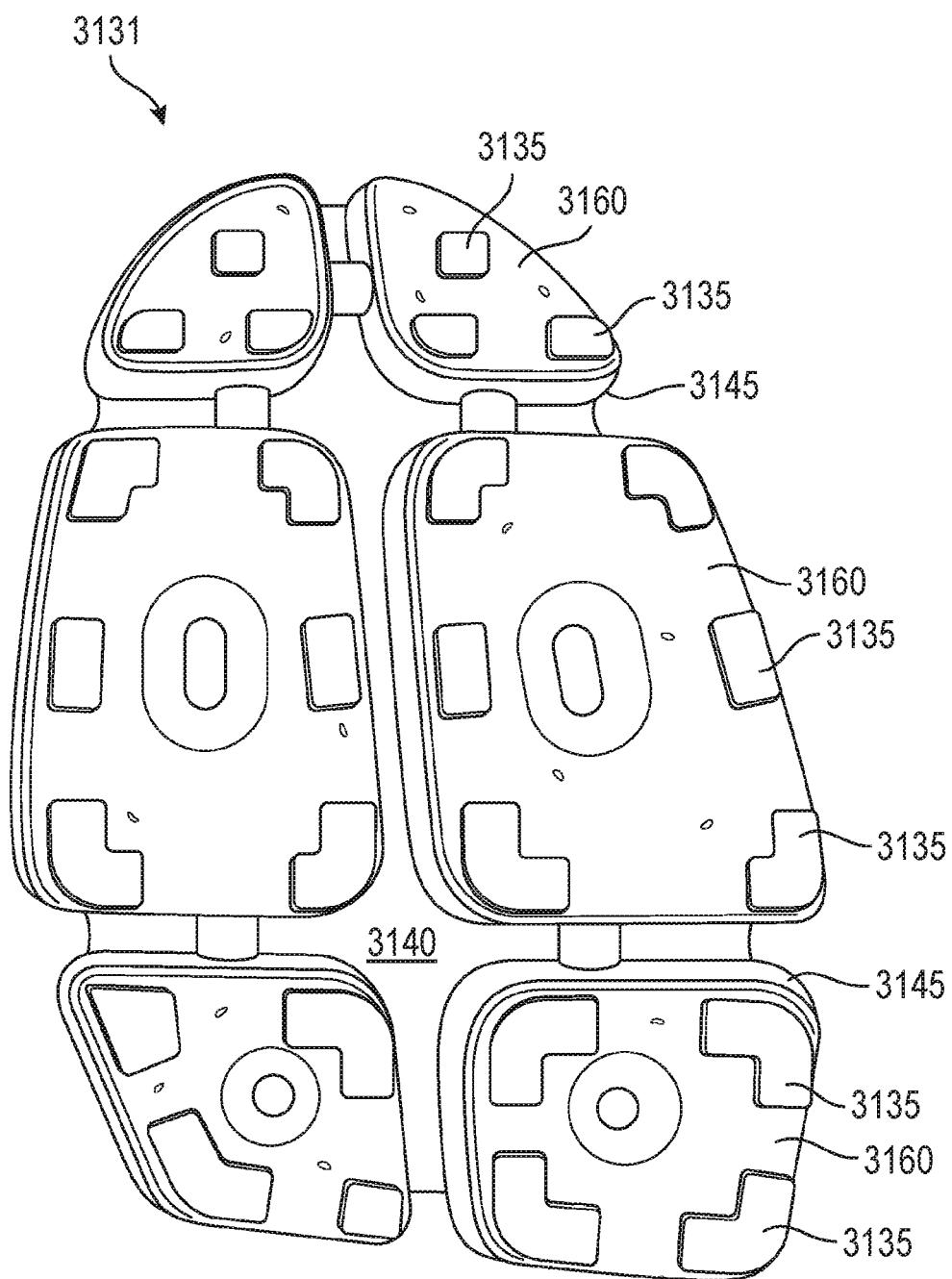
FIG. 36 is a schematic illustration in bottom view of a forefoot sole structure of an article of footwear.

FIG. 36 illustrates a bottom view of another embodiment of forefoot sole structure 3131 including forefoot component 3140 and forefoot outsole 3160 with ground-engaging lugs 3135 associated therewith. Forefoot component 3140 can be directly secured to a lower area of upper 2120 of FIG. 35 and is formed from a polymer material that encloses a fluid, which may be a gas, liquid, or gel. Forefoot component 3140 may extend into midfoot region 2112. Forefoot component 3140 may compress between the foot and the ground, thereby attenuating ground reaction forces. Fluid-filled chambers 3145 of forefoot component 3140 may be inflated and generally pressurized with a fluid to cushion the foot.

Forefoot outsole 3160, which also may extend into midfoot region 2112, is secured to lower areas of forefoot component 3140. Forefoot outsole 3160 may include individual portions that cover individual lower areas of fluid-filled chambers 3145 of forefoot component 3140. Forefoot outsole 3160 may be formed from wear-resistant material and, in come embodiments, may include ground-engaging portions or lugs 3135. Forefoot outsole 3160 may be transparent or translucent, and, in some embodiments, may be textured to improve traction.

Forefoot component 2140 and heel component 2150 are formed from a polymer material that defines an upper surface, a lower surface, and an edge. Forefoot component 2140 may include a plurality of forefoot component fluid-filled chambers 2145 and heel component 2150 may include a plurality of fluid-filled chambers 2155, each of which may be in fluid communication with at least one other chamber of the component. Upper surface 2141 of forefoot component 2140 is facing downward so that the forefoot component lower surface 2142 and forefoot component edge 2143 of each forefoot component fluid-filled chamber 2145 are clearly visible in FIG. 38. Similarly, upper surface 3141 of forefoot component 3140 is facing downward so that the forefoot component lower surface 3142 and forefoot component edge 3143 of each forefoot component fluid-filled chamber 3145 are clearly visible in FIG. 40. Heel component fluid-filled chamber 2155, heel component upper surface 151, heel component lower surface 2152, and heel component edge 2153 of heel component 2150 are illustrated in FIG. 39.

Figure 37:
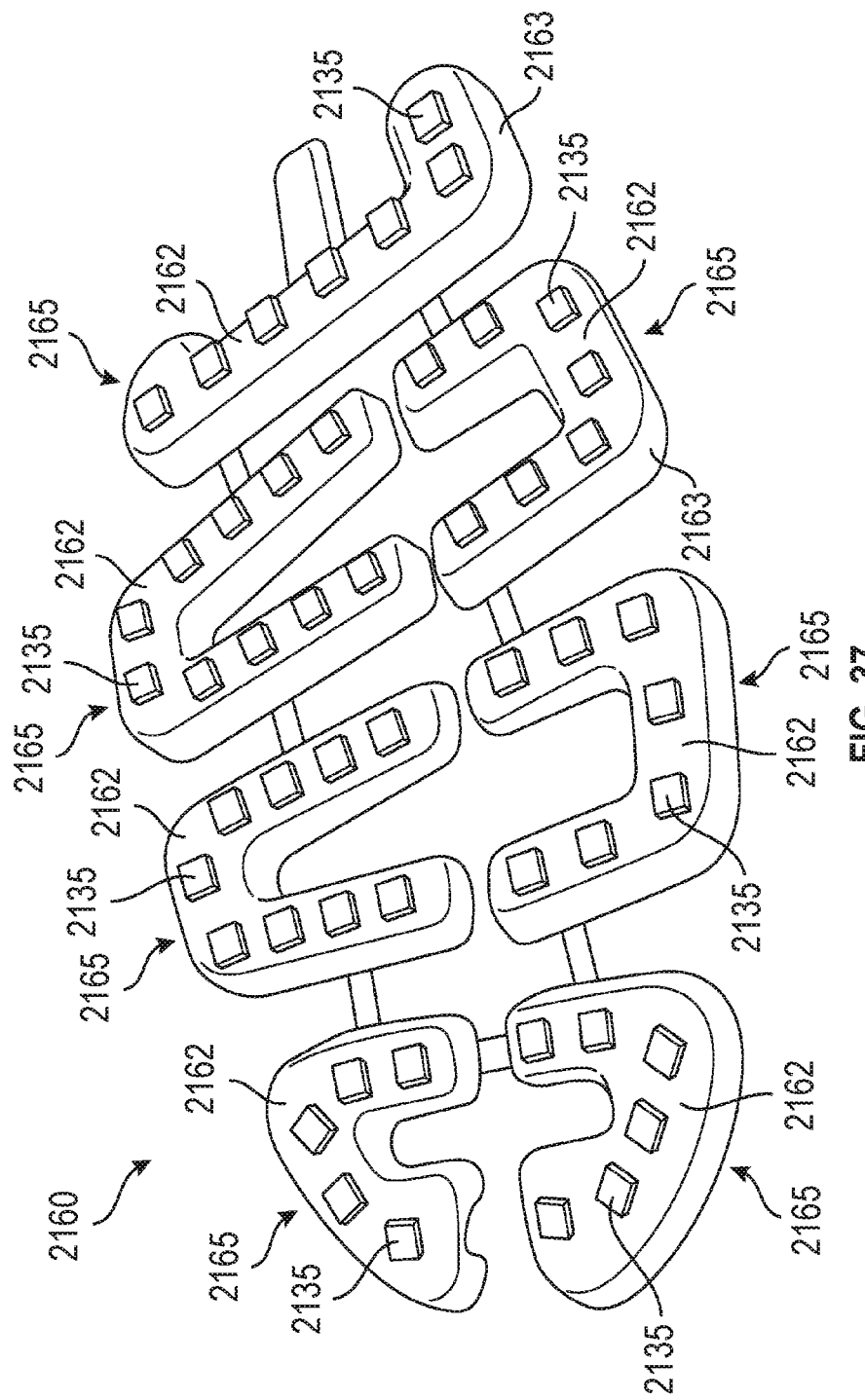
FIG. 37 is a schematic illustration in bottom perspective view of a forefoot outsole of FIG. 34.

FIG. 37 illustrates an exemplary bottom surface of forefoot outsole 2160. Forefoot outsole 2160 includes forefoot outsole compartments 2165 having ground-engaging lugs 2135 on forefoot outsole outer lower surface 2162. Forefoot outsole compartments 2165 also include forefoot outsole outside edge 2163.

Figure 38:
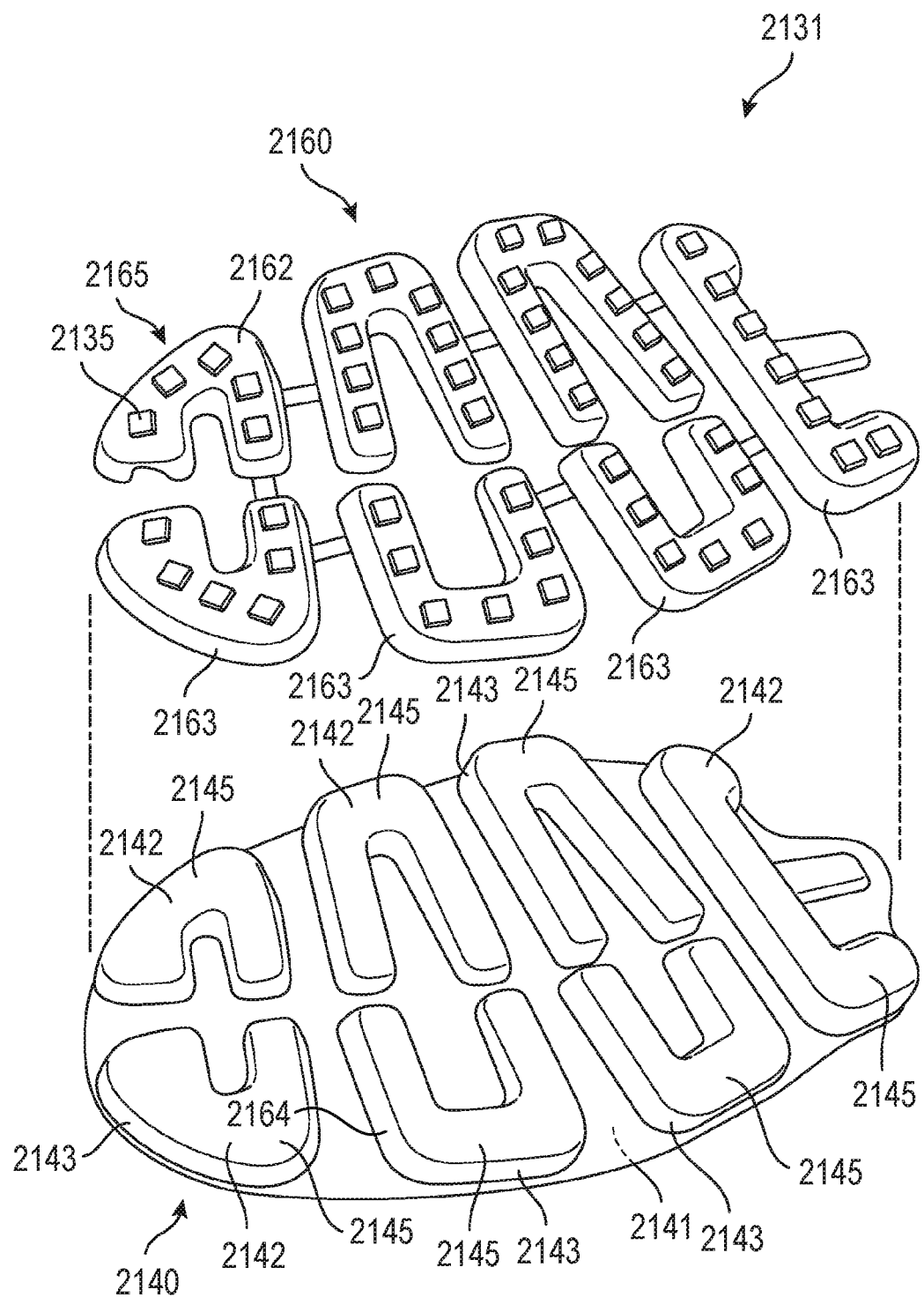
FIG. 38 is a schematic illustration in an exploded view illustrating a relationship between a forefoot outsole and a forefoot component that form a forefoot sole structure of FIG. 34.

The relationship between an embodiment of forefoot component 2140 and an embodiment of forefoot outsole 2160 is illustrated in FIG. 38. In this embodiment, each forefoot component fluid-filled chamber 2145 corresponds with a similarly-sized, congruently-shaped forefoot outsole compartment 2165. In this embodiment, each forefoot outsole compartment 2165 is aligned with and sufficiently large to accommodate a similarly-sized, congruently-shaped forefoot component fluid-filled chamber 2145. In some embodiments, a forefoot component fluid-filled chamber 2145 may combine with a forefoot outsole compartment 2165 in a snug relationship. Forefoot outsole 2160 then may be associated with forefoot component 2140 by inserting forefoot component fluid-filled chambers 2145 into the corresponding forefoot outsole compartments 2165. In some embodiments, a forefoot outsole compartment 2165 is bonded to a forefoot component fluid-filled chamber 2145. In some embodiments, forefoot component 2140 is co-molded with forefoot outsole 2160. In some embodiments, forefoot outsole 2160 is co-extensive with or overlaps at least a part of forefoot component lower surface 2142 or of inside surface 2164. In some embodiments, forefoot component edge 3143 is co-extensive with or overlaps at least a part of forefoot component lower surface 3142 or sole inside surface 3164. In some embodiments, forefoot outsole compartments 2165 surround forefoot component fluid-filled chambers 2145.

Figure 39:
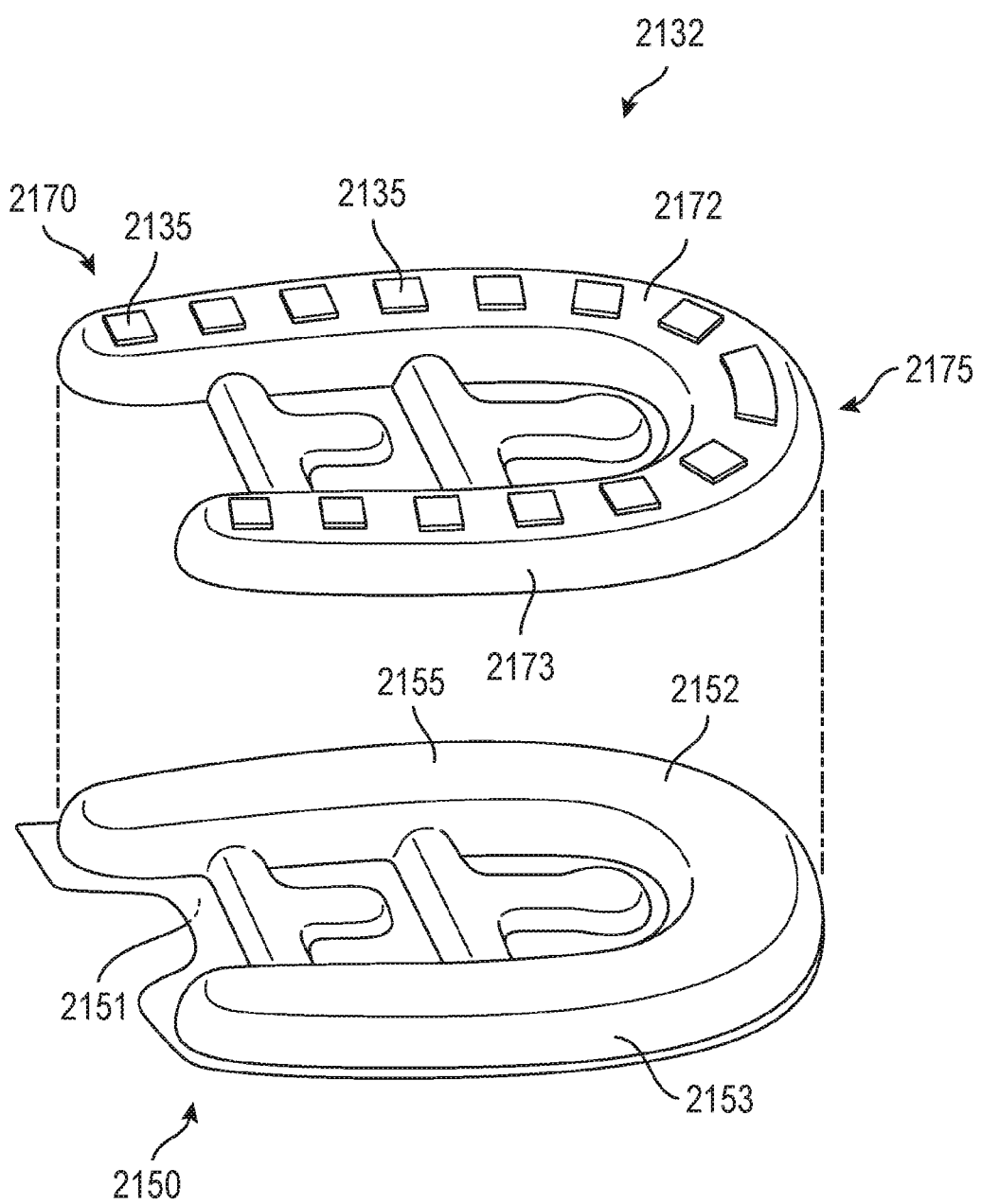
FIG. 39 is a schematic illustration in an exploded view illustrating a relationship between a heel outsole and a heel component that form a heel sole structure of FIG. 34.

FIG. 39 depicts a relationship between an embodiment of heel component 2150 and an embodiment of heel outsole 2170. In this embodiment, a heel component fluid-filled chamber 2155 corresponds with a heel outsole compartment 2175. In the embodiment illustrated in FIG. 39, the single heel outsole compartment 2175 may be associated with a similarly-sized, congruently-shaped heel component fluid-filled chamber 2155. In another embodiment, heel component 2150 may comprise plural fluid-filled chambers 2155 and heel outsole 2170 may comprise plural heel outsole compartments 2175. In these embodiments, each heel outsole 2170 fits onto similarly-sized, congruently-shaped heel component 2150 by ensuring that each heel outsole compartment 2175 is aligned with and sufficiently large enough to accommodate each heel component fluid-filled chamber 2155. In some embodiments, a heel component fluid-filled chamber 2155 may combine with a heel outsole compartment 2175 in a snug relationship. Heel outsole 2170 then may be associated with heel component 2150 by inserting heel component fluid-filled chambers 2155 into the corresponding heel outsole compartments 2175. In some embodiments, a heel outsole compartment 2175 is bonded to a heel component fluid-filled chamber 2155. In some embodiments, heel component 2150 is co-molded with heel outsole 2170. In some embodiments, heel outsole compartment 2175 surrounds heel component fluid-filled chamber 2155. In some embodiments, the heel outsole 2170 is co-extensive with or at least partly overlaps at least a part of heel component edge 2153.

Figure 40:
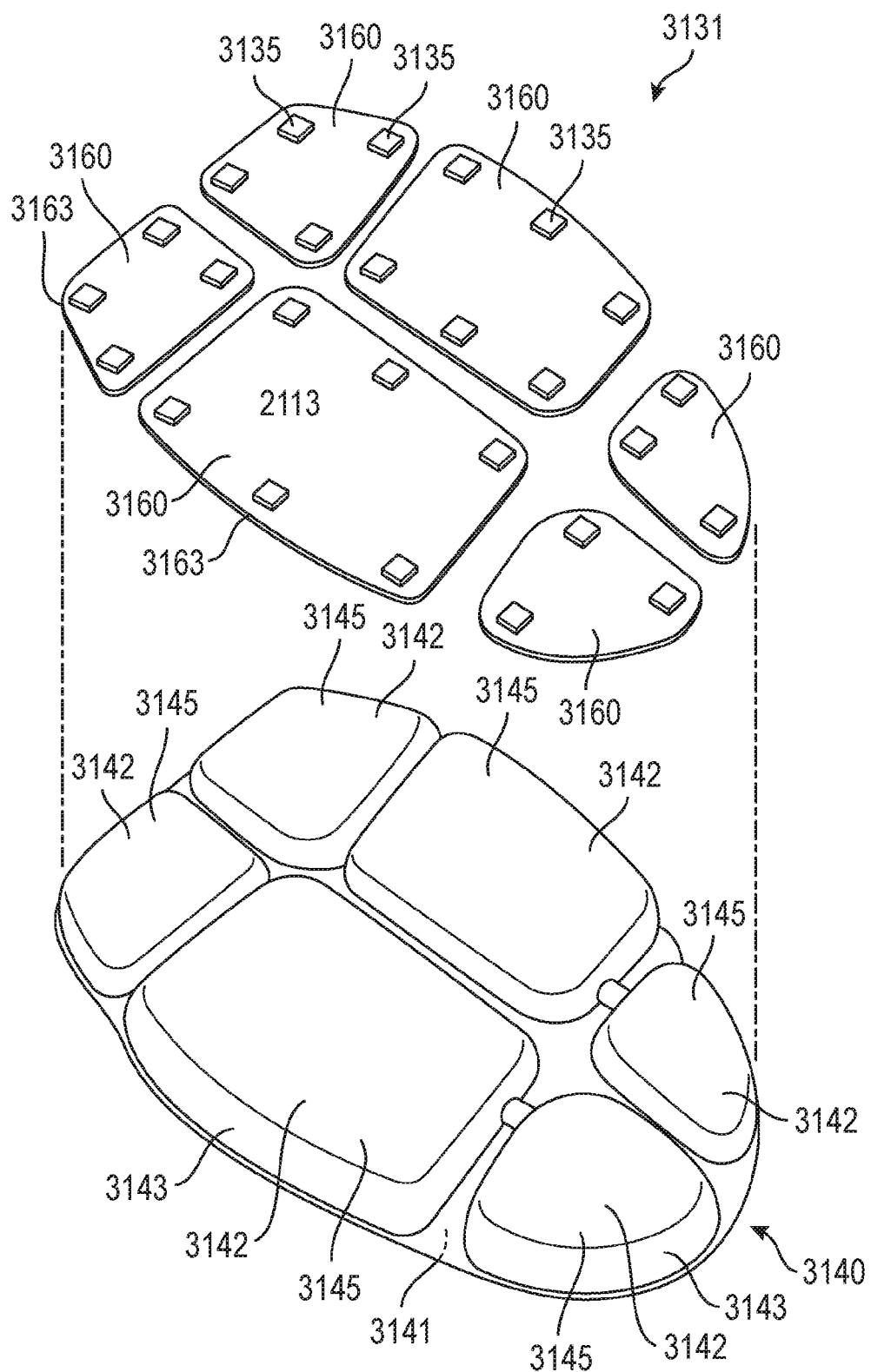
FIG. 40 is a schematic illustration in an exploded view illustrating a relationship between a forefoot outsole and a forefoot component that form a forefoot sole structure of FIG. 36.

FIG. 40 illustrates a relationship between forefoot component 3140 and forefoot outsole 3160 in forefoot sole structure 3131. Each of forefoot component fluid-filled chambers 3145 has a section or compartment of forefoot outsole 3160 associated therewith. Each forefoot outsole section of forefoot outsole 3160 may wrap around the corner between forefoot component fluid-filled chamber lower surface 3142 and forefoot component fluid-filled chamber edge 3143 of one of the forefoot component fluid-filled chambers 3145 of forefoot component 3140. Lugs 3135 may be attached to or formed on the lower surface of forefoot outsole 3160.

Forefoot sole structure 3131 includes forefoot component 3140 having forefoot component fluid-filled chambers 3145 formed from a polymer material that defines forefoot component upper surface 3141, forefoot component lower surface 3142, and forefoot component edge 3143. Forefoot component upper surface 3141 is facing downward in FIG. 40.

FIG. 40 also illustrates the relationship between an embodiment of forefoot outsole 3160 and forefoot component 3140. As illustrated in FIG. 40, forefoot outsole 3160 includes forefoot outsole outer lower surface 3162 having ground-engaging lugs 3135 thereon. Forefoot outsole 3160 further includes forefoot outsole compartment edges 3163 that extend over at least part of forefoot component edge 3143.

Method for Manufacture

An outsole may be attached to a corresponding component in any suitable manner. In some embodiments, the outsole and component are adhered by adhesion as part of a co-molding process. In some embodiments, the outsole and corresponding component are adhered by partial melting as part of a co-molding process.

Forefoot component 2140 and heel component 2150 may be formed from any suitable polymeric material. Forefoot component 2140 and heel component 2150 may be formed of a single layer of material or multiple layers, and may be thermoformed or otherwise shaped. Examples of polymeric materials that may be utilized for forefoot component or a heel component include any of polyurethane, urethane, polyester, polyester polyurethane, polyether, polyether polyurethane, latex, polycaprolactone, polyoxypropylene, polycarbonate macroglycol, and blends thereof. These and other polymeric materials, and an exemplary embodiment of forefoot component and heel component, and of a method for manufacturing them, may be found in U.S. Pat. No. 9,420,848, issued Aug. 23, 2016 to Campos II et al., and entitled ARTICLE OF FOOTWEAR INCORPORATING A CHAMBER SYSTEM AND METHODS FOR MANUFACTURING THE CHAMBER SYSTEM, the entirety of which is hereby incorporated by reference.

In a co-molding process, an outsole first may be formed in any suitable manner. An outsole typically may be formed from any durable material. Typically, outsole material is tough, durable, resistant to abrasion and wear, flexible, and skid-resistant. In some embodiments, polyurethane materials sufficiently durable for ground contact may be used. Suitable thermoplastic polyurethane elastomer materials include Bayer Texin® 285, available from Bayer. Elastollan® SP9339, Elastollan® SP9324, and Elastollan® C70S, available from BASF, also are suitable. Polyurethane and other polymers that may not be sufficiently durable for direct ground contact may be used to form part of an outsole in some embodiments. In such embodiments, a rubber outsole may be adhered or cemented onto that part of the outsole. In some embodiments, the entire outsole may be rubber. In embodiments, the outsole material is transparent or translucent. In embodiments, ground-engaging lugs may be integrally formed as part of an outsole, or may be separately formed and adhered to the outsole. The outsole may have a textured ground-engaging surface to improve traction.

An outsole then is placed in a mold that accommodates the outsole in an appropriate relationship with the corresponding component to be co-molded therewith. In some embodiments, adhesive may be applied to the appropriate surfaces of the outsole, the component, or both. The component then may be co-molded with the corresponding outsole to form a forefoot sole structure or a heel sole structure.

Figure 41:
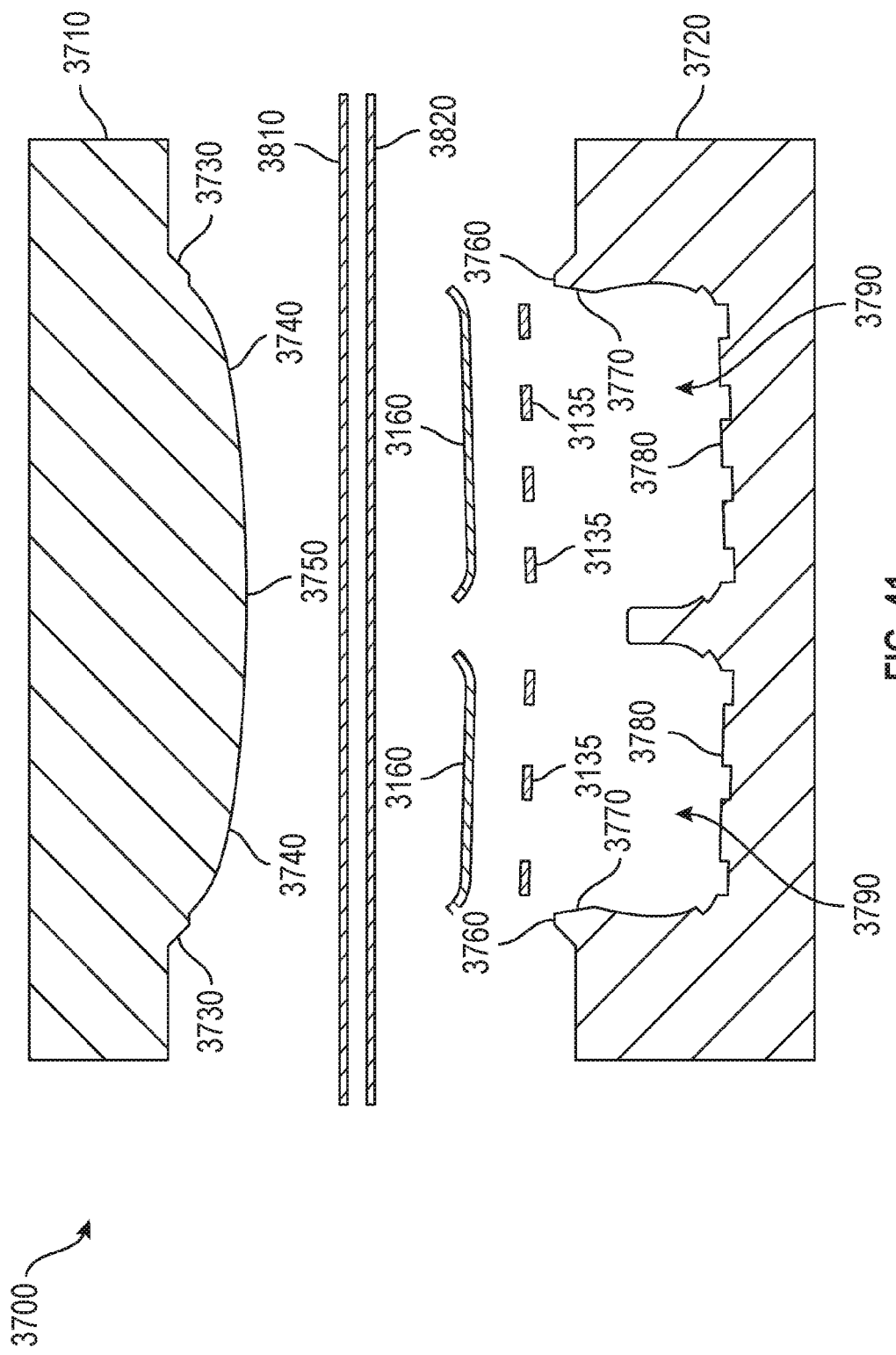
FIG. 41 is a schematic illustration in a cross-sectional view of an open mold illustrating a relationship of the parts for forming a forefoot sole structure of FIG. 36 in the mold.
Figure 42:
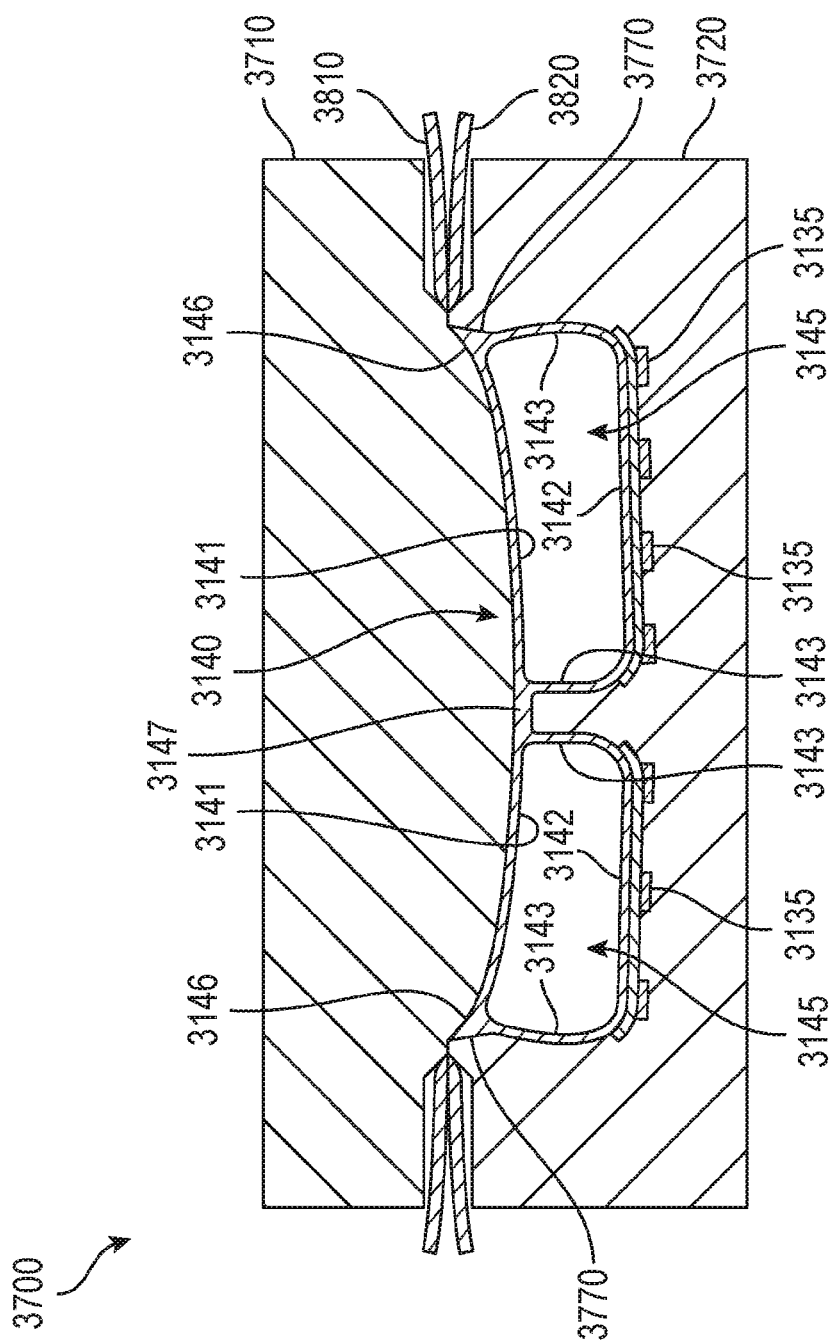
FIG. 42 is a schematic illustration in a cross-sectional view of a closed mold illustrating a forefoot sole structure of FIG. 36 formed in the mold.

FIG. 41 and FIG. 42 depict a mold for co-molding forefoot component 3140 with forefoot outsole 3160 with ground-engaging lugs 3135 thereon to form forefoot sole structure 3131. In some embodiments, forefoot outsole 3160 wraps at least a portion of forefoot component edge 3143 on forefoot component fluid-filled chamber 3145. This forefoot outsole compartment 3165 of forefoot outsole compartment edge 3163 that wraps at least a portion of forefoot component edge 3143 may be used to tune the cushioning response of the forefoot sole structure 3131, as described herein. The wrapping portion of forefoot outsole compartment edge 3163 may provide additional strength and resistance to flexure at the sidewall or edge of forefoot component fluid-filled chamber 3145. In some embodiments, forefoot outsole compartment edge 3163 wraps a short distance up fluid-filled chamber edge 3143. In other embodiments, forefoot outsole compartment edge 3163 wraps further up fluid-filled chamber edge 3143 to provide additional stiffness and better protect fluid-filled chamber edge 3143 from damage or wear. Forefoot sole structure 2131 is an embodiment of a forefoot sole structure having forefoot outsole 2160 wrapping a significant portion of forefoot component fluid-filled chamber 2145.

FIG. 41 and FIG. 42 are cross-sectional depictions of mold 3700 for forefoot component 3140. As shown in FIG. 41 and FIG. 42, forefoot component 3140 is co-molded with forefoot outsole 3160 present in the mold. Adhesive also may be present on appropriate portions of forefoot component 3140, particularly forefoot component fluid-filled chamber edges 3143 and forefoot component fluid-filled chamber lower surface 3142, or to chamber-engaging surfaces of forefoot outsole 3160 that will be in contact with forefoot component 3140.

A variety of manufacturing processes may be utilized to form forefoot sole structure 3131. In some embodiments, mold 3700 that may be utilized in the manufacturing process is depicted as including a first mold portion 3710 and a second mold portion 3720. Mold 3700 is utilized to form forefoot component 3140 from a first polymer layer 3810 and a second polymer layer 3820, which are the polymer layers forming forefoot component upper surface 3141 and forefoot component lower surface 3142, respectively. More particularly, mold 3700 facilitates the manufacturing process by (a) shaping first polymer layer 3810 and second polymer layer 3820 in areas corresponding with forefoot component fluid-filled chambers 3143, forefoot component flange 3146, and conduits between chambers, and (b) joining first polymer layer 3810 and second polymer layer 3820 in areas corresponding with forefoot component flange 3146 and forefoot component web area 3147.

Various surfaces or other areas of mold 3700 will now be defined for use in discussion of the manufacturing process. Referring now to FIG. 41 and FIG. 42, first mold portion 3710 includes a pinch surface 3730, a first seam-forming surface 3740, and a compression surface 3750. Pinch surfaces 3730 and first seam-forming surface 3740 are angled relative to each other, with pinch surface 3730 being more vertical than first seam-forming surface 3740. Second mold portion 3720 includes a pinch edge 3760 and a second seam-forming surface 3770. Whereas pinch edge 3760 is a relatively sharp corner or angled area in second mold portion 3720, second seam-forming surface 3770 extends downward and is generally, although not necessarily, parallel to pinch surface 3730. A void volume 3790 within mold 3700 and between mold portions 3710 and 3720 has a shape of forefoot component 3140, prior to pressurization, and forms various features of forefoot component 3140. A portion of this void volume 3790 is identified as a depression 3780 in second mold portion 3720.

Each of first polymer layer 3810 and second polymer layer 3820 are initially located between each of first mold portion 3710 and second mold portion 3720, which are in a spaced or open configuration, as depicted in FIG. 41 and FIG. 42. In this position, first polymer layer 3810 is positioned adjacent or closer to first mold portion 3710, and second polymer layer 3820 is positioned adjacent or closer to second mold portion 3720. A shuttle frame or other device may be utilized to properly position first polymer layer 3810 and second polymer layer 3820. As part of the manufacturing process, one or both of first polymer layer 3810 and second polymer layer 3820 are heated to a temperature that facilitates shaping and bonding. As an example, various radiant heaters or other devices may be utilized to heat first polymer layer 3810 and second polymer layer 3820, possibly prior to being located between first mold portion 3710 and second mold portion 3720. As another example, mold 3700 may be heated such that contact between mold 3700 and first polymer layer 3810 and second polymer layer 3820 at a later portion of the manufacturing process raises the temperature to a level that facilitates shaping and bonding.

Once first polymer layer 3810 and second polymer layer 3820 are properly positioned, first mold portion 3710 and second mold portion 3720 translate or otherwise move toward each other and begin to close upon first polymer layer 3810 and second polymer layer 3820. As first mold portion 3710 and second mold portion 3720 move toward each other, various techniques may be utilized to draw first polymer layer 3810 and second polymer layer 3820 against surfaces of first mold portion 3710 and second mold portion 3720, thereby beginning the process of shaping first polymer layer 3810 and second polymer layer 3820. For example, air may be partially evacuated from the areas between (a) first mold portion 3710 and first polymer layer 3810 and (b) second mold portion 3720 and second polymer layer 3820. More particularly, air may be withdrawn through various vacuum ports in first mold portion 3710 and second mold portion 3720. By removing air, first polymer layer 3810 is drawn into contact with the surfaces of first mold portion 3710 and second polymer layer 3820 is drawn into contact with the surfaces of second mold portion 3720. As another example, air may be injected into the area between first polymer layer 3810 and second polymer layer 3820, thereby elevating the pressure between first polymer layer 3810 and second polymer layer 3820. During a preparatory stage of this process, an injection needle may be located between first polymer layer 3810 and second polymer layer 3820, and a gas, liquid, or gel, for example, then may be ejected from the injection needle such that first polymer layer 3810 and second polymer layer 3820 engage the surfaces of mold 3700. Each of these techniques may be used together or independently.

As first mold portion 3710 and second mold portion 3720 continue to move toward each other, first polymer layer 3810 and second polymer layer 3820 are pinched between first mold portion 3710 and second mold portion 3720. More particularly, first polymer layer 3810 and second polymer layer 3820 are compressed between pinch surface 3730 and pinch edge 3760. In addition to beginning the process of separating excess portions of first polymer layer 3810 and second polymer layer 3820 from portions that form forefoot component 3140, the pinching of first polymer layer 3810 and second polymer layer 3820 begins the process of bonding or joining first polymer layer 3810 and second polymer layer 3820 in the area of forefoot component flange 3146.

Following the pinching of first polymer layer 3810 and second polymer layer 3820, first mold portion 3710 and second mold portion 3720 proceed with moving toward each other and into a closed configuration, as depicted in FIG. 42. As the mold closes, pinch surface 3730 contacts and slides against a portion of second seam-forming surface 3770. The contact between pinch surface 3730 and second seam-forming surface 3770 effectively severs excess portions of first polymer layer 3810 and second polymer layer 3820 from portions that form forefoot component 3140. In addition, the sliding movement pushes portions of the material forming first polymer layer 3810 and second polymer layer 3820 downward and further into depression 3780. Moreover, the material forming first polymer layer 3810 and second polymer layer 3820 compacts or otherwise collects in the area between first seam-forming surfaces 3740 and second seam forming surface 3770. Given that first seam-forming surface 3740 and second seam-forming surface 3770 are angled relative to each other, the compacted polymer material forms a generally triangular or tapered structure, which results in forefoot component flange 3146. In addition to forming forefoot component flange 3146, first polymer layer 3810 and second polymer layer 3820 are (a) shaped to form forefoot component fluid-filled chambers 3145 and (b) compressed and joined to form web area 3147.

At the stage of the process depicted in FIG. 42, a void volume 3790, which is located between compression surface 3750 and depression 3780 within mold 3700, effectively has the shape of forefoot component 3140 prior to inflation or pressurization. Moreover, a peripheral portion of the void includes an area that forms forefoot component flange 3146 between first seam-forming surface 3740 and second seam-forming surface 3770. The non-parallel configuration between first seam-forming surface 3740 and second seam-forming surface 3770 results in a tapered space where the polymer material collects to form forefoot component flange 3146. A distance across the space between first seam-forming surface 3740 and second seam-forming surface 3770 is greater adjacent to a portion of the void volume 3790 that forms fluid-filled components 3145 than in the area where first seam-forming surface 3740 and second seam-forming surface 3770 meet, which is spaced from the portion of the void that forms forefoot component fluid-filled chambers 3145. Although the configuration of the tapered space between first seam-forming surface 3740 and second seam-forming surface 3770 may vary, an angle formed between first seam-forming surface 3740 and second seam-forming surface 3770 may be in a range of between twenty degrees and forty-five degrees.

As described above, the material forming first polymer layer 3810 and second polymer layer 3820 compacts or otherwise collects in the area between first seam-forming surface 3740 and second seam-forming surface 3770. This compaction effectively thickens one or both of first polymer layer 3810 and second polymer layer 3820. That is, whereas first polymer layer 3810 and second polymer layer 3820 have a first thickness at the stage depicted in FIG. 42, one or both of first polymer layer 3810 and second polymer layer 3820 within flange 3146 may have a second, greater thickness at the stage depicted in FIG. 42. The compaction that occurs as pinch surface 3730 contacts and slides against a portion of second seam-forming surface 3770 increases the thickness of the polymer material forming one or both of first polymer layer 3810 and second polymer layer 3820.

When forming forefoot component 3140 is complete, mold 3700 is opened and forefoot structure 3131 is removed and permitted to cool. A fluid then may be injected into forefoot component 3140 to pressurize forefoot component fluid-filled chambers 3145, thereby completing the manufacture of forefoot sole structure 3131. As a final step in the process, forefoot sole structure 3131 may be incorporated into a sole structure of article of footwear 2100.

FIGS. 40-42 illustrate an embodiment having relatively small overlap of forefoot outsole 3160 on forefoot component edges 3143 of forefoot component fluid-filled chambers 3145. FIGS. 40-42 also illustrate an embodiment in which forefoot component edges 3143 of fluid-filled chambers 3145 of forefoot component 3140 form a forefoot sole structure 3131 having a continuous, smooth shape from forefoot component upper surface 3141 to forefoot component lower surface 3142.

Figure 43:
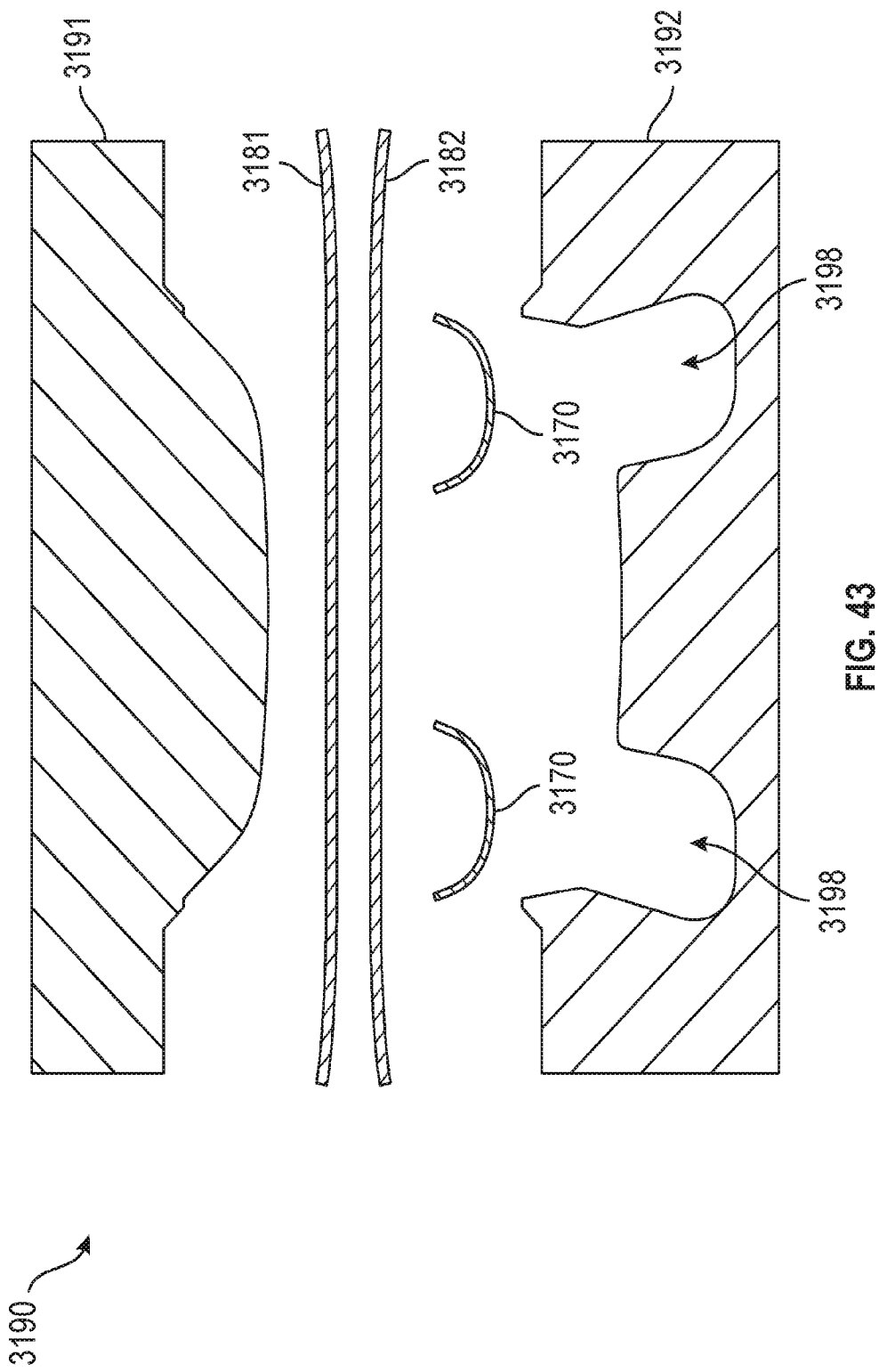
FIG. 43 is a schematic illustration in a cross-sectional view of an open mold illustrating the relationship of the parts for forming a heel sole structure like that of FIG. 33 in the mold.
Figure 44:
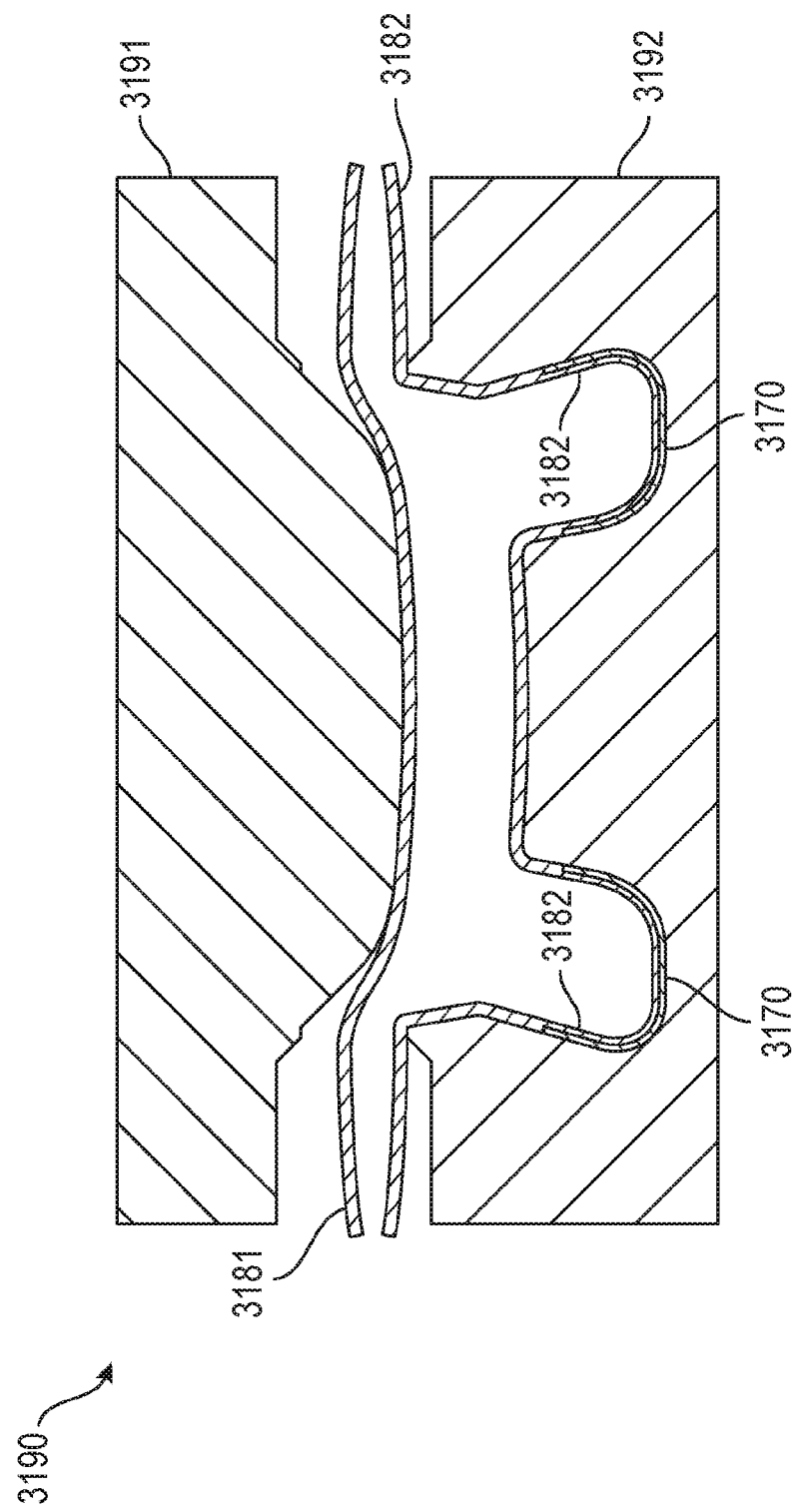
FIG. 44 is a schematic illustration in cross-sectional view of a partially-formed heel sole structure of FIG. 43 in a partially-open mold.

FIG. 43 and FIG. 44 illustrate a mold for a heel component wherein heel outsole 3170 is placed in a mold portion in an area that is not formed to accommodate the outsole. Then, the heel component 3150 is co-molded with and encompasses heel outsole 3170. This technique yields a heel sole structure 3132 having heel component edges flush with heel outsole edges.

Although a variety of manufacturing processes may be utilized, heel sole structure 3132 may be formed through a process that is generally similar to the process discussed above for forefoot component 3140 and forefoot sole structure 3131. Mold 3190 that may be utilized in the manufacturing process is depicted as including a first mold portion 3191 and a second mold portion 3192. Mold 3190 is utilized to form heel component 3150 from additional elements of first polymer layer 3181 and second polymer layer 3182, which are the polymer layers forming, respectively, heel component upper surface and heel component lower surface. More particularly, mold 3190 facilitates the manufacturing process by (a) shaping first polymer layer 3181 and second polymer layer 3182 in areas corresponding with heel component fluid-filled chamber 3155 and heel component flange 3156 and (b) joining first polymer layer 3181 and second polymer layer 3182 in areas corresponding with heel component flange 3156 and heel component web area 3157. In addition, mold 3190 facilitates the bonding of heel outsole 3170 to heel component 3150.

Each of first polymer layer 3181 and second polymer layer 3182 is initially located between each of first mold portion 3191 and second mold portion 3192, as depicted in FIG. 43. In addition, one or more elements that form outsole 3170 are also located relative to mold 3190. Once first polymer layer 3181 and second polymer layer 3182 are properly positioned and the elements of outsole 3170 are located within void volume 3198 in second mold portion 3192, first mold portion 3191 and second mold portion 3192 translate or otherwise move toward each other and begin to close upon first polymer layer 3181 and second polymer layer 3182, as depicted in FIG. 44. As discussed above, air may be partially evacuated from the areas between (a) first mold portion 3191 and first polymer layer 3181 and (b) second mold portion 3192 and second polymer layer 3182. Additionally, fluid may be injected into the area between first polymer layer 3181 and second polymer layer 3182.

Fluid may be selected from the group consisting of air, liquid, gel, and blends thereof. Using one or both of these techniques, first polymer layer 3181 and second polymer layer 3182 are induced to engage the surfaces of mold 3190. Additionally, first polymer layer 3181 and second polymer layer 3182 also lay against heel outsole 3170. In effect, therefore, first polymer layer 3181 and second polymer layer 3182 are shaped against surfaces of mold 3190 and outsole 3170, as shown in FIG. 44.

Figure 45:
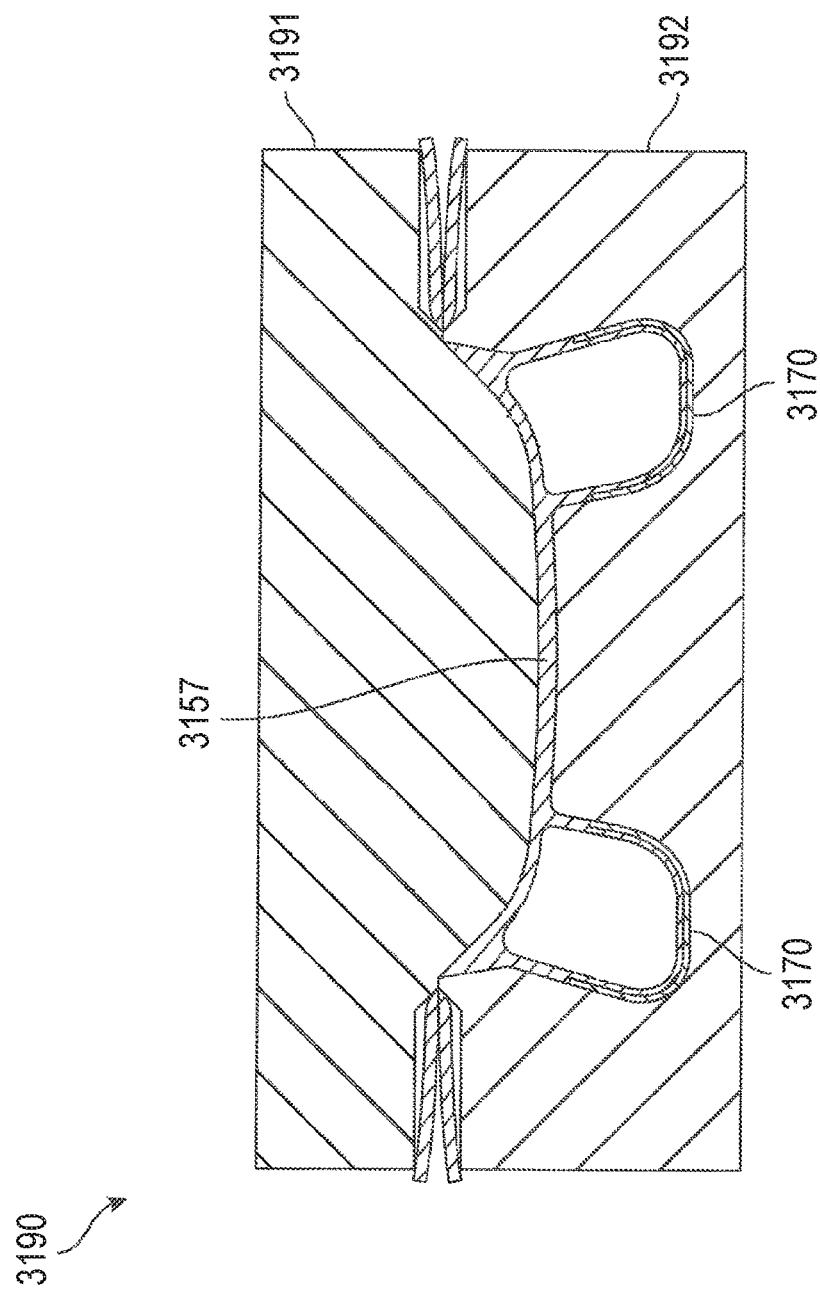
FIG. 45 is a schematic illustration in cross-sectional view of a closed mold illustrating the heel sole structure of FIG. 44 formed in the mold.

As first mold portion 3191 and second mold portion 3192 continue to move toward each other, first polymer layer 3181 and second polymer layer 3182 are compressed between first mold portion 3191 and second mold portion 3192, as depicted in FIG. 45. More particularly, first polymer layer 3181 and second polymer layer 3182 are compressed to form heel component flange 3156 and heel component web area 3157. Second polymer layer 3182 also bonds with outsole 3170.

Figure 46:
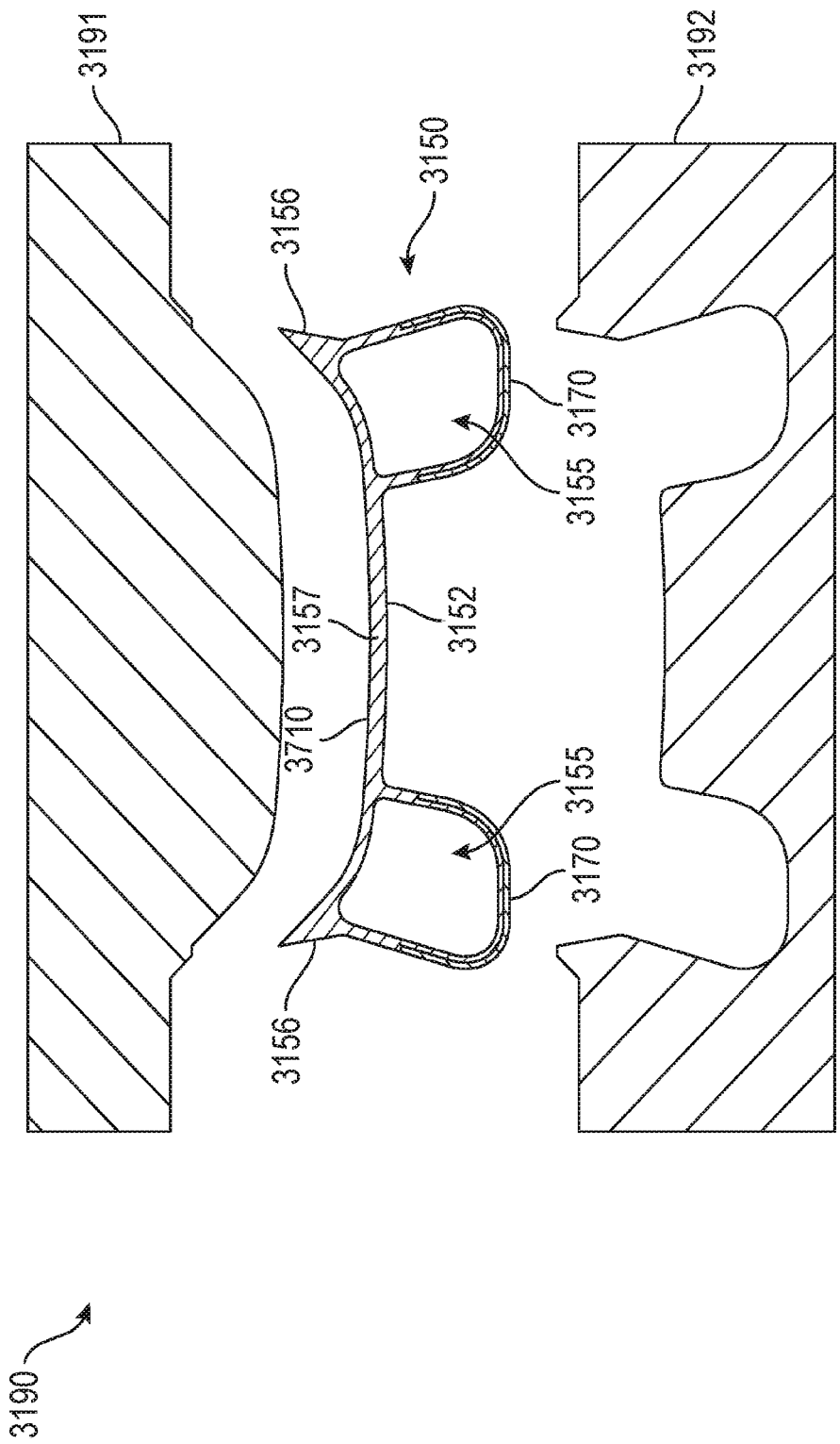
FIG. 46 is a schematic illustration in cross-sectional view of a heel sole structure of FIG. 45 removed from the opened mold after forming the structure.

When the manufacture of heel sole structure 3132 is complete, mold 3190 is opened and heel sole structure 3132 is removed and permitted to cool, as depicted in FIG. 46. A fluid then may be injected into heel component 3150 to pressurize heel component fluid-filled chambers 3155, thereby completing the manufacture of heel sole structure 3132. As a final step in the process, heel sole structure 3132 may be incorporated into sole structure 2130 of article of footwear 2100.

As first polymer layer 3181 and second polymer layer 3182 are drawn into mold 3190, particularly the larger volumes in second mold portion 3191, first polymer layer 3181 and second polymer layer 3182 stretch to conform to the contours of mold 3190. When first polymer layer 3181 and second polymer layer 3182 stretch, they also thin or otherwise decrease in thickness. Accordingly, the initial thicknesses of first polymer layer 3181 and second polymer layer 3182 may be greater than the resulting thicknesses after the manufacturing process.

Figure 47:
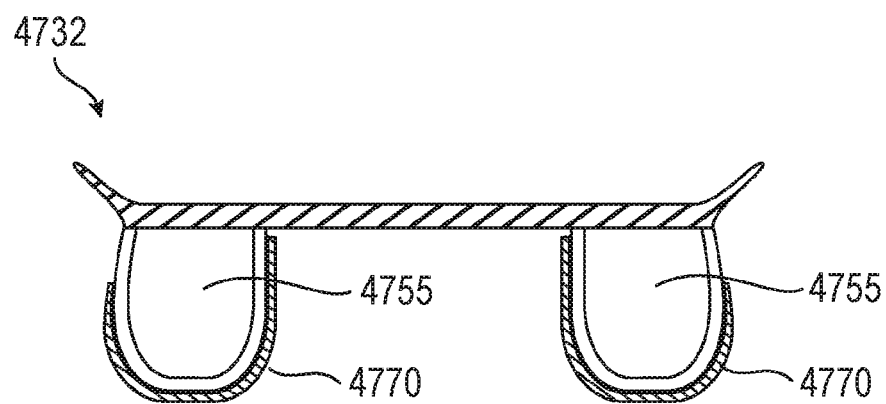
FIG. 47 is a schematic illustration in cross-sectional view of an embodiment of a heel sole structure.
Figure 48:
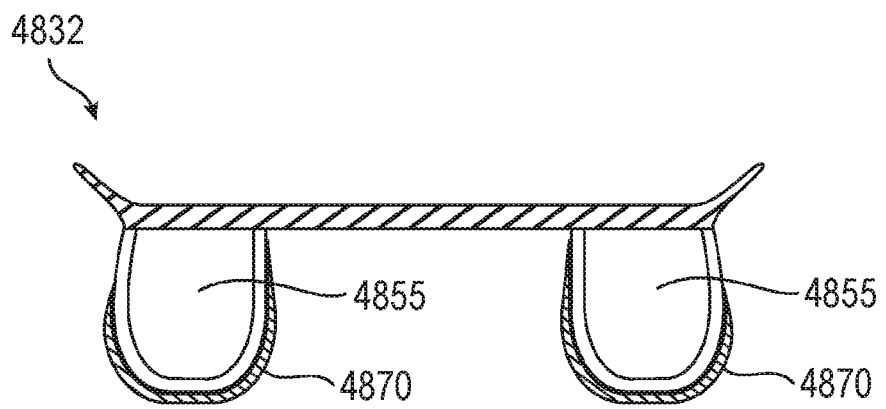
FIG. 48 is a schematic illustration in cross-sectional view of another embodiment of a heel sole structure.
Figure 49:
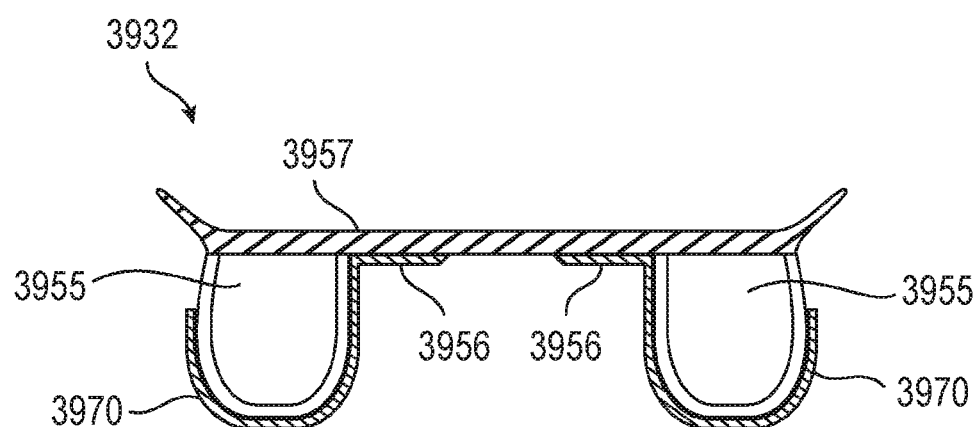
FIG. 49 is a schematic illustration in cross-sectional view of still another embodiment of a heel sole structure.

FIG. 47, FIG. 48, and FIG. 49 illustrate other embodiments of heel sole structures. FIG. 47 illustrates heel sole structure 4732 including heel outsole portions 4770. In embodiments illustrated in FIG. 47, heel outsole portions 4770 have a first thickness at the ground-engaging area, such as the location for traction lugs, and a second, lesser thickness on at least part of one or both vertical surfaces of heel component fluid-filled chamber 4755. The thickness may be changed in a gradual way, such as by a linear taper, or may be stepwise. Heel outsole portions 4770 are thinner on the outside vertical surfaces of heel component fluid-filled chamber 4755 than they are at the ground-engaging area. In this way, the elastic response of heel sole structure 4732 may be tuned.

FIG. 48 illustrates heel sole structure 4832 having heel outsole portions 4870, which are thinner on both vertical surfaces of heel component fluid-filled chambers 4855 than they are at the ground-engaging area. In other embodiments, only the inside vertical surfaces of heel outsole portions 4770 or 4870 may be thinned on the vertical surfaces of heel component fluid-filled chambers 4755 or 4855, respectively.

In some embodiments, any combination of such configurations may be used, thus providing additional opportunities to tune the elastic response of the heel sole structure.

FIG. 49 illustrates another embodiment of a heel sole structure. Heel sole structure 3932 includes heel outsole portions 3970. Heel outsole portions 3970 extend up the interior vertical surfaces of heel component fluid-filled chambers 3955 to heel component web area 3957. The heel outsole portions also include a flange 3956 that extends across a portion of heel component web area 3957. This flange 3956 provides an additional feature that can be varied to tune the elastic response of the heel component. Heel outsole portions 3970 extend a distance up the exterior vertical surfaces of heel component fluid-filled chambers 3955. This distance also may be varied to adjust the elastic response of the heel outsole portions.

Figure 50:
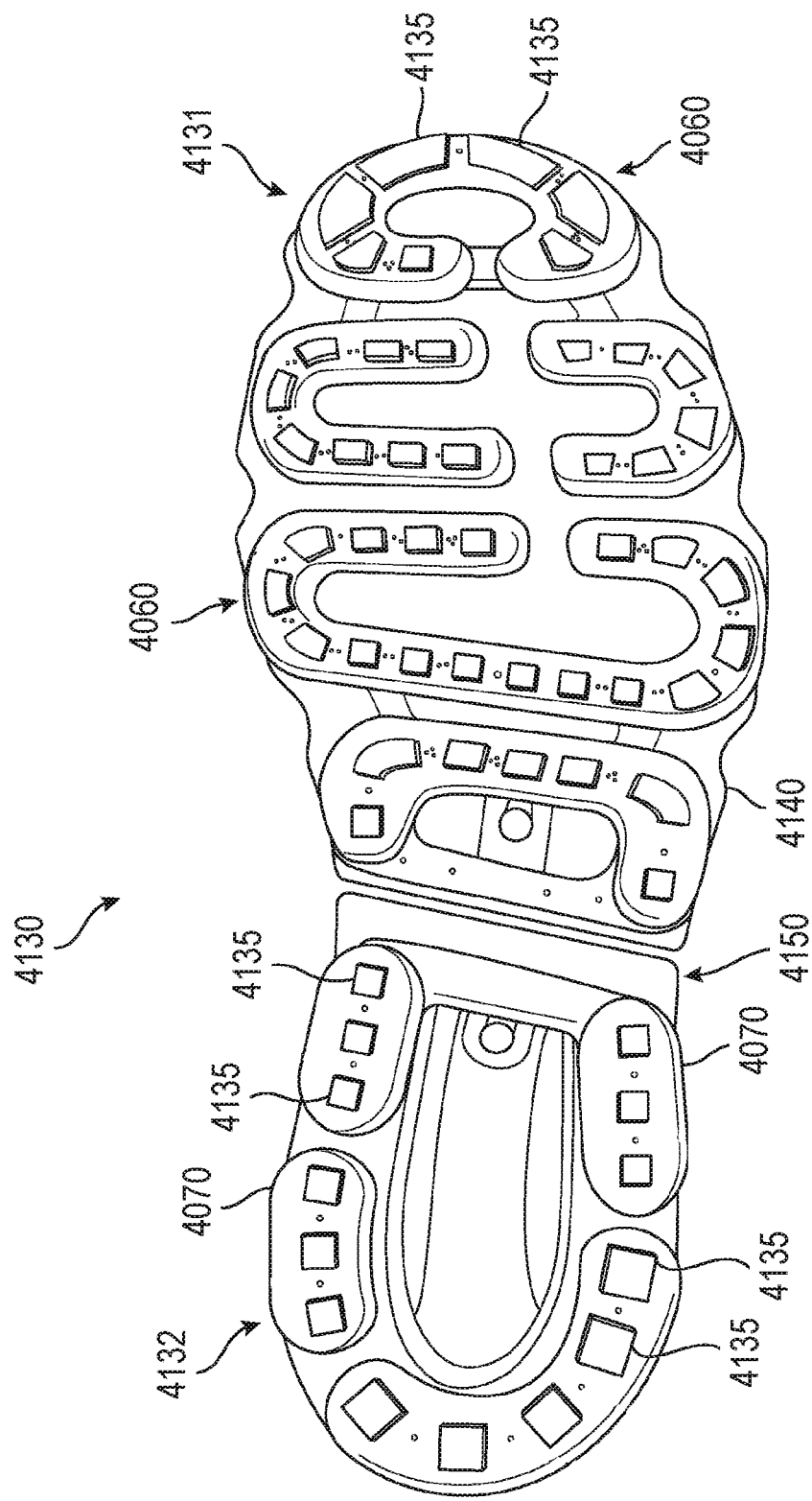
FIG. 50 is a schematic illustration in bottom view of an embodiment of an article of footwear.

FIG. 50 is a bottom view of an article of footwear in accordance with some embodiments of the disclosure. FIG. 50 illustrates sole structure 4130, which is secured to the lower end of an upper, such as upper 2120 (FIG. 68). Sole structure 4130 is located under the foot and supports the foot. The primary elements of sole structure 4130 are a forefoot sole structure 4131 including a forefoot component 4140 and forefoot outsole portions 4060, and a heel sole structure including a heel component 4150 and a heel outsole 4070. In some embodiments, each of forefoot component 4140 and heel component 4150 may be directly secured to a lower area of upper 2120. Forefoot component 4140 and heel component 4150 are formed from a polymer material that encloses a fluid, which may be a gas, liquid, or gel. During walking and running, for example, forefoot component 4140 and heel component 4150 may compress between the foot and the ground, thereby attenuating ground reaction forces. That is, forefoot component 4140 and heel component 4150 are inflated and generally pressurized with the fluid to cushion the foot.

In some configurations, sole structure 4130 may include a foam layer, for example, that extends between upper 2120 and one or both of forefoot component 4140 and heel component 4150, or a foam element may be located within indentations in the lower areas of forefoot component 4140 and heel component 4150. In other configurations, forefoot sole structure 4131 may incorporate plates, moderators, lasting elements, or motion control members that further attenuate forces, enhance stability, or influence the motions of the foot. Heel sole structure 4132 also may include such members to further attenuate forces, enhance stability, or influence the motions of the foot.

In addition to providing a wear surface in an article of footwear, forefoot outsole 4060 and heel outsole 4070 may enhance various properties and characteristics of sole structure 4130. Properties and characteristics of the outsoles, such as the thickness, flexibility, the properties and characteristics of the material used to make the outsole, and stretch, may be varied or selected to modify or otherwise tune the cushioning response, compressibility, flexibility, and other properties and characteristics of sole structure 4130. Reinforcement of the outsole (for example, inclusion of structural elements, such as ribs), apertures, the height of the overlap, the number and location of the edges that overlap, or other features of an outsole all may be used to tune the responses of the sole structure. An outsole also may incorporate tread elements, such as protrusions, ridges, or ground-engaging lugs or sections, that impart traction. In some embodiments, an outsole may be replaced by a plate or other structural element. A plate may have features that assist with securing an outsole or other element to heel component 4150.

In particular, overlap of a portion of an outsole away from the ground-engaging portion and up the edge of a forefoot component or a heel component, such as described above and illustrated at least in FIG. 47, FIG. 48, and FIG. 49, may be used to tune the elastic response and cushioning response of the resultant sole structure. With the guidance provided herein, these and other properties and characteristics of the outsole may be considered by the user in combination with the properties and characteristics of the fluid-filled components of the components to adjust the responses of a sole structure.

Sole structure 4130 may be translucent or transparent, and may be colored or patterned for aesthetic appeal.

Forefoot outsole 4060 is secured to lower areas of forefoot component 4140. In some embodiments, forefoot sole structure 4131 may extend into a midfoot region. The forefoot outsole 4060 also may be secured to lower areas of forefoot component 4140 in a midfoot region. Heel outsole 4070 is secured to lower areas of heel component 4150. Both heel component 4150 and heel outsole 4070 may extend into a midfoot region. Forefoot outsole 4060 and heel outsole 4070 may be formed from a wear-resistant material. The wear-resistant material may be transparent or translucent to provide a visually appealing effect. The wear-resistant material may be textured on the ground-engaging portions to impart traction. In some embodiments, the wear-resistant material may have ground-engaging lugs or portions 4135, as illustrated in FIG. 50.

Figure 51:
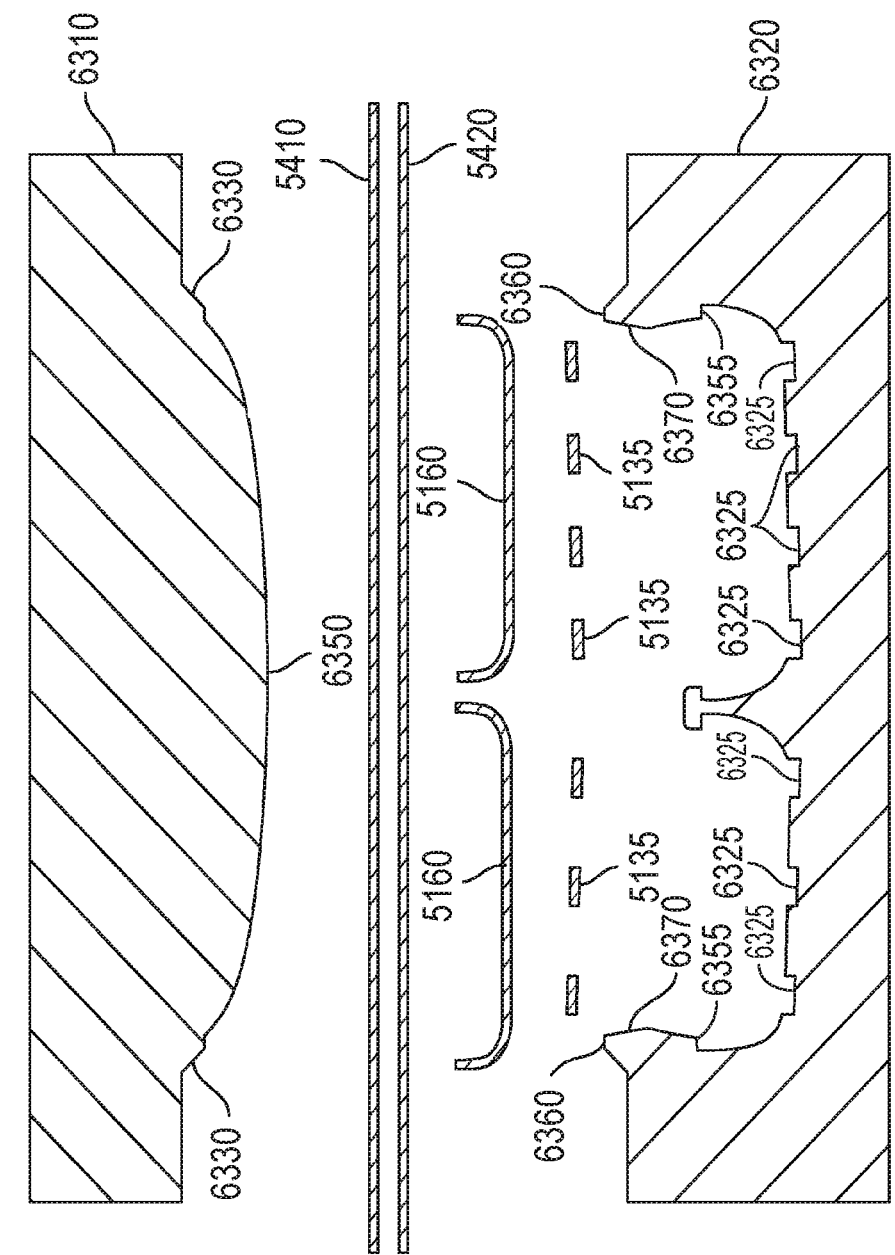
FIG. 51 is a schematic illustration in cross-sectional view of an open mold illustrating a relationship of parts for producing an article.
Figure 52:
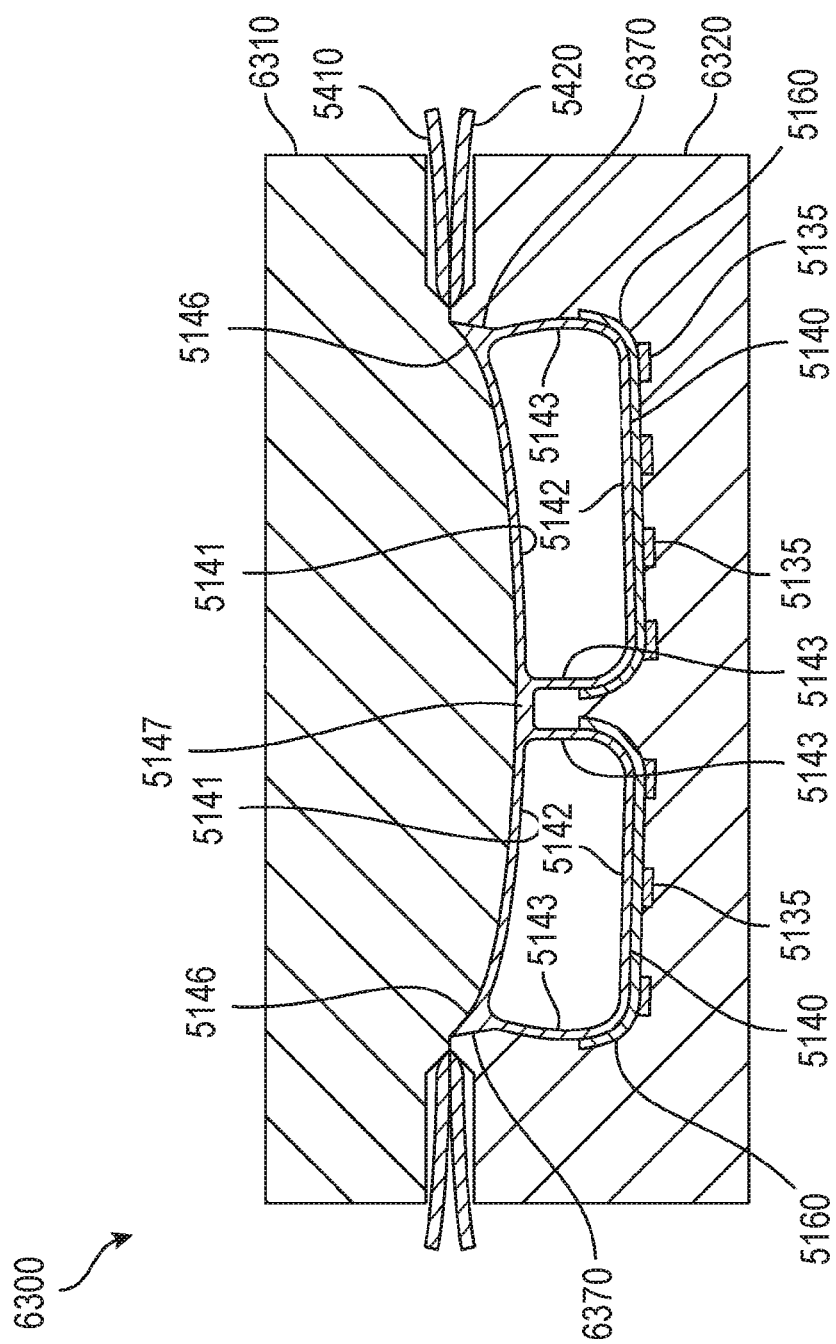
FIG. 52 is a schematic illustration in cross-sectional view of a closed mold illustrating a relationship of parts for producing the article of FIG. 51.

FIG. 51 and FIG. 52 illustrate a method of producing a sole structure such as but not limited to sole structure 2130 of FIGS. 33-35. FIG. 51 and FIG. 52 depict a cross-section of a mold 6300 for co-molding a fluid-filled chamber 5140 (from first and second polymer sheets 5410, 5420) and an outsole 5160 with protuberances 5135 thereon. The fluid-filled chamber 5140 may also be referred to as a barrier. Outsole 5160 may be produced by a number of pre-formed objects or elements assembled in the mold. In some embodiments, outsole 5160 wraps at least a portion of edge 5143 on fluid-filled chamber 5140. The outsole 5160 wraps a significant portion of the edge 5143 of fluid-filled chamber 5140. As the components are produced of thermoplastic materials, they may be softened to aid in producing the shapes in the mold.

FIG. 51 and FIG. 52 are cross-sectional depictions of the mold 6300. As shown in FIG. 51 and FIG. 52, fluid-filled chamber 5140 is co-molded with outsole 5160 present in the mold. Adhesive also may be present on appropriate surfaces.

Stated generally, the co-molded article may be produced in a two-piece mold with an upper and a lower mold portion by placing outsole elements into the lower mold portion, then placing the layers that will form the fluid-filled chamber 5140 on top of the outsole elements. The mold is then closed so that the upper and lower mold portions abut one another. The mold is shaped so that the closing the mold results in the formation of the chamber. Fluid under pressure is then introduced into the chamber so that the inflation of the chamber forces the upper surface of the chamber into conforming relationship with the underside of the upper mold portion, and also forces the lower portion of the chamber into conforming relationship with the outside elements underneath. Energy may be applied to the mold as heat, radio frequency, or the like to co-mold the first and second elements together with the chamber inflated and pushing the article against the mold surfaces and the outsole elements. The second element portions such as layers of polymer may be provided in the mold as a precursor for the completed product. Such precursor may be formed in the mold as part of the co-molding process as described herein, or may be provided as completely pre-formed chamber that is ready for inflation.

A variety of manufacturing processes may be utilized to produce a sole structure such as sole structure 2130. In some embodiments, mold 6300 that may be utilized in the manufacturing process is depicted as including a first mold portion 6310 and a second mold portion 6320. Mold 6300 is utilized to produce a forefoot component, also referred to as a barrier or a fluid-filled chamber 5140, from a first polymer layer 5410 and a second polymer layer 5420, which are the polymer layers producing fluid-filled chamber upper surface 5141 and fluid-filled chamber lower surface 5142, respectively. More particularly, mold 6300 facilitates the manufacturing process by (a) shaping first polymer layer 5410 and second polymer layer 5420 in areas corresponding with edges 5143 of the fluid-filled chambers 5140, flange 5146, and conduits between chambers, and (b) joining first polymer layer 5410 and second polymer layer 5420 in areas corresponding with flange 5146 and web area 5147.

Various surfaces or other areas of mold 6300 will now be defined for use in discussion of the manufacturing process. First mold portion 6310 includes a first mold portion surface 6350, which shapes the top surface of the co-molded article. Various parts of a first element, such as outsole 5160, and a second element, such as a fluid-filled chamber 5140 of FIG. 52, are illustrated in FIG. 51. Second mold portion 6320 is shaped so as to receive protuberances 5135 in close engagement with slots 6325 in second mold portion 6320. Outsole 5160 then is placed in the mold. Outsole 5160 fits within undercut 6335. Then, second element precursor or first polymer layer 5410 is put into place to become the top surface of the article and second element precursor or second polymer layer 5420 produces the bottom of the second element, herein the fluid-filled chamber, when the article is molded.

As first mold portion 6310 and second mold portion 6320 are moved toward each other, various techniques may be utilized to draw first polymer layer 5410 and second polymer layer 5420 against surfaces of first mold portion 6310 and second mold portion 6320, thereby beginning the process of shaping first polymer layer 5410 and second polymer layer 5420. For example, air may be partially evacuated from the areas between (a) first mold portion 6310 and first polymer layer 5410 and (b) second mold portion 6320 and second polymer layer 5420. More particularly, air may be withdrawn through various vacuum ports in first mold portion 6310 and second mold portion 6320. By removing air, first polymer layer 5410 is drawn into contact with the surfaces of first mold portion 6310 and second polymer layer 5420 is drawn into contact with the surfaces of second mold portion 6320. As another example, fluid may be injected into the area between first polymer layer 5410 and second polymer layer 5420, thereby elevating the pressure between first polymer layer 5410 and second polymer layer 5420. During a preparatory stage of this process, an injection needle may be located between first polymer layer 5410 and second polymer layer 5420, and a fluid, such as a gas, a liquid, or a gel, for example, or a blend thereof, then may be ejected from the injection needle such that first polymer layer 5410 and second polymer layer 5420 engage the surfaces of mold 6300. Each of these techniques may be used together or independently.

As first mold portion 6310 and second mold portion 6320 continue to move toward each other, first polymer layer 5410 and second polymer layer 5420 are pinched between first mold portion 6310 and second mold portion 6320. More particularly, first polymer layer 5410 and second polymer layer 5420 are compressed between pinch surface 6330 and pinch edge 6360. In addition to beginning the process of separating excess portions of first polymer layer 5410 and second polymer layer 5420 from portions that form fluid-filled chamber 5140, the pinching of first polymer layer 5410 and second polymer layer 5420 begins the process of bonding or joining first polymer layer 5410 and second polymer layer 5420 in the area of flange 5146.

Following the pinching of first polymer layer 5410 and second polymer layer 5420, first mold portion 6310 and second mold portion 6320 proceed with moving toward each other and into a closed configuration, as depicted in FIG. 52. As the mold closes, pinch surface 6330 contacts and slides against a portion of second seam-forming surface 6370. The contact between pinch surface 6330 and second seam-forming surface 6370 effectively severs excess portions of first polymer layer 5410 and second polymer layer 5420 from portions that form fluid-filled chamber 5140. The material forming first polymer layer 5410 and second polymer layer 5420 compacts or otherwise collects to form flange 5146. In addition to forming flange 5146, first polymer layer 5410 and second polymer layer 5420 are (a) shaped to produce fluid-filled chamber 5140 and (b) compressed and joined to produce web area 5147.

When producing of fluid-filled chamber 5140 with co-molded outsole 5160 is complete, mold 6300 is opened. Fluid then may be injected into the forefoot component to pressurize forefoot component fluid-filled chambers 5140. The completed structure may be incorporated into an article of footwear.

Figure 53:
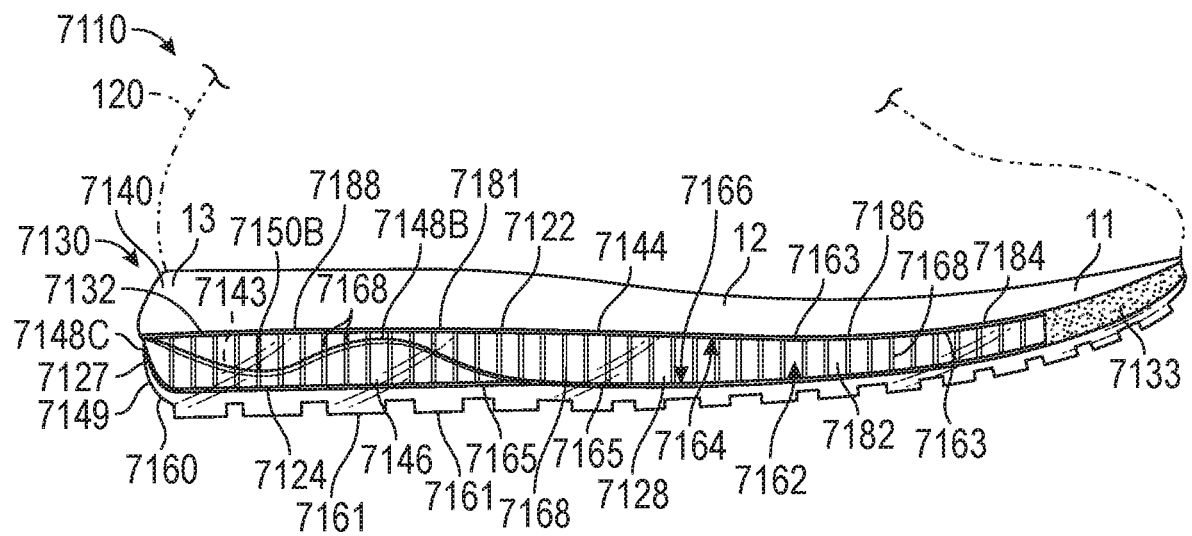
FIG. 53 is a schematic lateral side view illustration of another configuration of an article of footwear with an upper shown in phantom.
Figure 54:
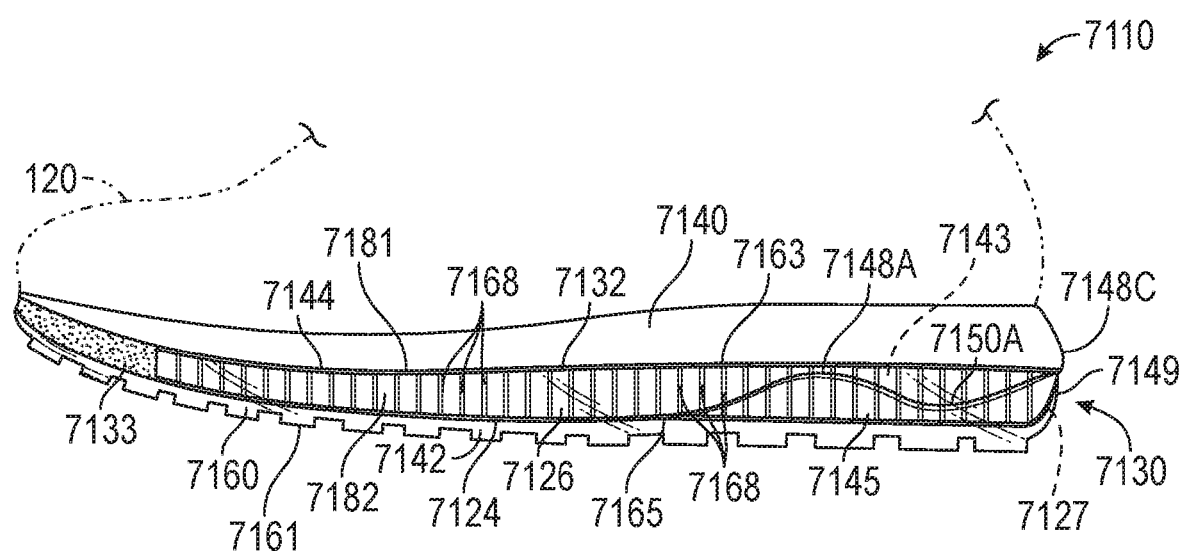
FIG. 54 is a schematic medial side view illustration of the article of footwear of FIG. 53.
Figure 55:
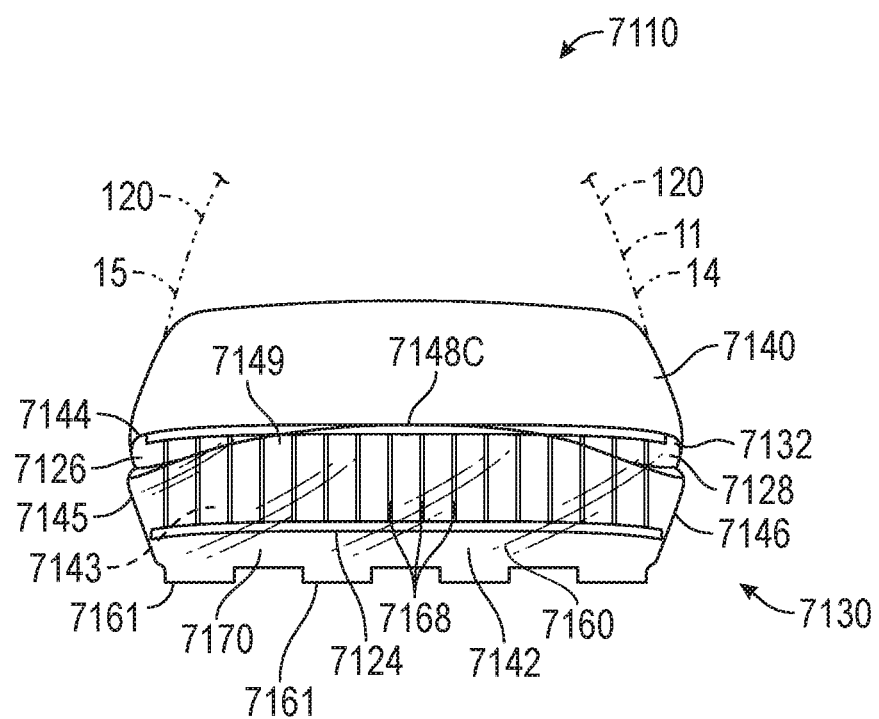
FIG. 55 is a schematic rear view illustration of the article of footwear of FIGS. 53 and 54.

FIGS. 53-55 show another configuration of an article of footwear 7110. Features of the article of footwear 7110 that are the same as those shown and described with respect to article of footwear 10 and 110 are indicated with like reference numbers. The article of footwear 7110 has a sole structure 7130 that includes a cushioning component 7132 defining an enclosed, fluid-filled chamber 7143. As shown in FIG. 53, the sole structure 7130 also includes a unitary outsole 7160 bonded to a bottom wall 7124, to a medial sidewall 7126 (FIG. 53), and a lateral sidewall 7128 (FIG. 54) of the cushioning component 7132 such that the outsole 7160 wraps substantially up the side walls 7126, 7128. The outsole 7160 is also bonded to a rear wall 7127 of the cushioning component 7132, as indicated in FIG. 53.

The cushioning component 7132 extends over the heel portion 13, the midfoot portion 12, and a rearward part of the forefoot portion 11. A forefoot component 7133 is disposed forward of the cushioning component 7132 in the forefoot portion 11. The forefoot component 7133 may be, by way of non-limiting example, a foam layer. The outsole 7160 extends under and is bonded to the forefoot component 7133 and the cushioning component 7132.

As shown in FIG. 55, the outsole 7160 includes tread portions 7161 that can be injection molded integrally with a body portion 7170 of the unitary outsole 7160. Alternatively, the tread portions 7161 can be positioned in a mold assembly adjacent the body portion 7170 and can thermally bond to the body portion 7170 during molding of the cushioning component 7132. The tread portions 7161 may have a variety of different shapes and patterns.

The sole structure 7130 includes an additional midsole layer 7140 positioned between and secured to the cushioning component 7132 and the upper 120. The midsole layer 7140 is secured to the top wall 7122 of the cushioning component 7132.

The cushioning component 7132 may be formed from a polymer material, such as any of the polymer materials described with respect to the article of footwear 10. For example, in the embodiment of FIG. 53, the cushioning component 7132 includes a first polymer sheet 7181 and a second polymer sheet 7182, which may also be referred to as an upper polymer sheet and a lower polymer sheet, respectively. The first polymer sheet 7181 is only visible in side view at the peripheral flange 7144 at which the first polymer sheet 7181 is bonded to the second polymer sheet 7182. The second polymer sheet 7182 is bonded to the first polymer sheet 7181 so that the first and second polymer sheets form the peripheral flange 7144 and define the fluid-filled chamber 7143. More specifically, with reference to FIG. 53, the first polymer sheet 7181 forms a top wall 7122 of the cushioning component 7132. The second polymer sheet 7182 forms a bottom wall 7124, a medial side wall 7126 and a lateral side wall 7128 of the cushioning component 7132. The cushioning component 7132 has a forefoot portion 7184, a midfoot portion 7186, and a heel portion 7188.

The first and second polymer sheets 7181, 7182 may be molded by thermoforming, as described herein, so that the peripheral flange 7144 is nearer the top wall 7122 than the bottom wall 7124 as shown in FIG. 53.

In one embodiment, the first and second polymer sheets 7181, 7182 are multi-layer polymer sheets including thermoplastic polyurethane layers alternating with barrier layers that comprise a copolymer of ethylene and vinyl alcohol (EVOH) impermeable to fluid contained in the chamber 7143. The fluid may be air, nitrogen, or another gas used to inflate the chamber 7143.

As best shown in FIGS. 53 and 54, the cushioning component 7132 may include a tether element 7162 within the chamber 7143. Similar to tether element 162 of FIG. 30, the tether element 7162 includes a first plate 7163 bonded to an inner surface 7164 of the top wall 7122. The tether element 7162 further includes a second plate 7165 bonded to an inner surface 7166 of the bottom wall 7124. The plates 7163, 7165 may be a thermoplastic material that thermally bonds to the first and second polymer sheets 7181, 7182 during thermoforming of the polymer sheets 7181, 7182, as discussed with respect to tether element 162. The plates 7163, 7165 extend through the entire cushioning component 7132, in the forefoot portion 7184, the midfoot portion 7186, and the heel portion 7188. In other embodiments, the plates 7163, 7165 may extend in only one or only two of the forefoot portion 7184, the midfoot portion 7186, and the heel portion 7188, or multiple tether elements can be secured to the first and second polymer sheets 7181, 7182 within the chamber 7143.

The cushioning component 7132 also includes a plurality of tethers 7168 secured to the first plate 7163 and to the second plate 7165 and extending in the fluid-filled chamber 7143 between the first plate 7163 and the second plate 7165. Only some of the tethers 7168 are indicated with a reference number in FIG. 53. The tethers 7168 are placed in tension by fluid in the chamber 7143, and, because they are secured to the plates 7163, 7165, act to control the shape of the cushioning component 7132 when the chamber 7143 is filled with pressurized fluid. The tethers 7168 may be any of a variety of different configurations including single strands of textile tensile members secured at each end to plates 7163, 7165, or repeatedly passing through one or both plates 7163, 7165. Various configurations of tethers are shown and described in U.S. Pat. No. 8,479,412, which is hereby incorporated by reference in its entirety.

Multiple rows of tethers 7168 are present and extend across a width of the plates 7163, 7165 between the lateral side 14 and the medial side 15 of the article of footwear 7110 included in FIG. 55. FIG. 55 shows one row of tethers 7168. FIG. 53 shows multiple rows of tethers 7168 extending laterally and positioned in the forefoot region 11, the midfoot region 12, and the heel region 13. Each tether 7168 shown in the side view of FIG. 53 is in a different row.

The outsole 7160 has a bottom portion 7142, a medial side portion 7145, and a lateral side portion 7146. The bottom portion 7142 is bonded to an outer surface of the second polymer sheet 7182 at the bottom wall 7124 of the cushioning component 7132. The bottom portion 7142 of the outsole 7160 extends under the bottom wall 7124 of the cushioning component 7132 and under the forefoot component 7133. The medial side portion 7145 of the outsole 7160 is bonded to the outer surface of the second polymer sheet 7182 at the medial side wall 7126 of the cushioning component 7132, and the lateral side portion 7146 of the outsole 7160 is bonded to the outer surface of the second polymer sheet 7182 at the lateral side wall 7128 of the cushioning component 7132. The outsole 7160 has a rear portion 7149 that wraps around the rear of the heel portion 7188 of the cushioning component 7132 and is bonded to the rear wall 7127 of the cushioning component 7132.

As shown in FIG. 54, medial side portion 7145 has only one peak 7148A and one valley 7150A. As shown in FIG. 53, lateral side portion 7146 has only one peak 7148B and one valley 7150B. The medial side portion 7145 and the lateral side portion 7146 each form a single peak 7148A, 7148B, respectively, disposed between the midfoot portion 7186 and the heel portion 7188, and a single valley 7150A, 7150B, respectively, disposed rearward of the peak. The outsole 7160 wraps up and is bonded to the rear wall 7127, forming a peak 7148C at the rear of the cushioning component 7132.

Peaks 7148A, 7148B are aligned with one or more rows of the tethers 7168. A peak is aligned with a row of tethers 7168 when it is positioned laterally adjacent the row. For example, FIGS. 53 and 54 shows peaks 7148A and 7148B laterally aligned with multiple rows of the tethers 7168. The positioning of the peaks 7148A, 7148B relative to the rows of tethers 7168 provides lateral and medial support to the cushioning component 7132. There may be fewer or more peaks and valleys than shown in the embodiment of FIGS. 53 and 54, and the peaks and valleys may have different shapes than shown. The single peak 7148A is positioned at or rearward of the midfoot portion 7186, and the valley 7150A is rearward of the single peak 7148A. The single peak 7148B is positioned at or rearward of the midfoot portion 7186, and the valley 7150B is rearward of the single peak 7148B.

In the embodiment of FIGS. 53-55 the entire outsole 7160 is substantially transparent. For example, the outsole 7160 may be a substantially transparent thermoplastic polyurethane material. The polymer sheets 7181, 7182 can also be substantially transparent. This allows the tethers 7168 to be viewed through the outsole 7160 and the second sheet 7182. The tethers 7168 can be viewed through the outsole 7160 at both the peaks 7148A, 7148B, 7148C, and the valleys 7150A, 7150B. Those skilled in the art will readily understand a variety of methods to determine transparency of an object, such as by a test of luminous transmittance and haze. For example, the luminous transmittance and haze of the cushioning component 7132 and of the outsole 7160 can be determined according to American Society for Testing and Materials (ASTM) Standard D1003-00, Standard Test Method for Haze and Luminous Transmittance of Transparent Plastics.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

What is claimed is:

1. An article of footwear comprising:
 a sole structure having:
  a cushioning component defining an enclosed, fluid-filled chamber and having a top wall, a bottom wall, a medial side wall at a medial side of the article of footwear, a lateral side wall at a lateral side of the article of footwear, and a rear wall at a rear of the article of footwear; wherein the cushioning component has a midfoot portion and a heel portion rearward of the midfoot portion;
  a tether element within the fluid-filled chamber and joined to an inner surface of the top wall and to an inner surface of the bottom wall; and
  a unitary outsole having a bottom portion, a medial side portion, a lateral side portion, and a rear portion; wherein the bottom portion is bonded to the bottom wall, the medial side portion is bonded to the medial side wall, the lateral side portion is bonded to the lateral side wall, and the rear portion is bonded to the rear wall of the cushioning component;
  wherein the medial side portion forms a single peak at which the medial side portion terminates on the medial side wall of the cushioning component, the single peak of the medial side portion disposed at or rearward of the midfoot portion and the medial side portion forms a single valley disposed on the medial side wall of the cushioning component, the single valley of the medial side portion disposed rearward of the single peak of the medial side portion, the lateral side portion forms a single peak at which the lateral side portion terminates on the lateral side wall of the cushioning component, the single peak of the lateral side portion disposed at or rearward of the midfoot portion and the lateral side portion forms a single valley on the lateral side wall of the cushioning component, the single valley of the lateral side portion disposed rearward of the single peak of the lateral side portion, and the rear portion forms a single peak at which the rear portion terminates on the rear wall of the cushioning component, the single peak of the rear portion disposed between the single valley of the medial side portion and the single valley of the lateral side portion.

2. The article of footwear of claim 1, wherein the single peak of the medial side portion and the single peak of the lateral side portion are at least partially aligned with the tether element.

3. The article of footwear of claim 1, wherein the tether element includes:
 a first plate bonded to the inner surface of the top wall;
 a second plate bonded to the inner surface of the bottom wall; and
 a plurality of tethers secured to the first plate and to the second plate and extending in the fluid-filled chamber between the first plate and the second plate.

4. The article of footwear of claim 3, wherein the fluid-filled chamber is pressurized by fluid in the fluid-filled chamber to place the tethers in tension.

5. The article of footwear of claim 1, wherein the cushioning component is substantially transparent.

6. The article of footwear of claim 1, wherein the outsole is a substantially transparent thermoplastic polyurethane.

7. The article of footwear of claim 1, wherein the outsole has integral tread portions on the bottom portion.

8. The article of footwear of claim 1, wherein the cushioning component includes:
a first polymer sheet;
a second polymer sheet bonded to the first polymer sheet so that the first and second polymer sheets form a peripheral flange and define the fluid-filled chamber; and
wherein:
the first polymer sheet includes the top wall;
the second polymer sheet includes the bottom wall, the medial side wall and the lateral side wall; and
the peripheral flange is nearer the top wall than the bottom wall.

9. The article of footwear of claim 8, wherein:
the first polymer sheet and the second polymer sheet are multi-layer polymer sheets including thermoplastic polyurethane layers alternating with barrier layers; and
the barrier layers comprise a copolymer of ethylene and vinyl alcohol (EVOH) impermeable to fluid contained in the fluid-filled chamber.

10. The article of footwear of claim 8, further comprising:
an additional footwear component having a bottom surface, a lateral surface, and a medial surface; wherein the bottom surface is supported on the top wall of the cushioning component.

11. The article of footwear of claim 10, wherein the additional footwear component is an additional midsole layer.

12. The article of footwear of claim 11, further comprising:
an upper secured to the additional midsole layer.

13. The article of footwear of claim 12, wherein the additional midsole layer and the upper both include a heel portion, a midfoot portion, and a forefoot portion; and
wherein the forefoot portion of the additional midsole layer and the forefoot portion of the upper extend forward of the forefoot portion of the cushioning component.

14. The article of footwear of claim 13, wherein the sole structure further includes a forefoot component disposed forward of the forefoot portion of the cushioning component;
wherein the outsole is bonded to the forefoot component; and
wherein the additional midsole layer extends over the forefoot component such that the forefoot component is disposed above the outsole and below the additional midsole layer.

15. The article of footwear of claim 1, wherein:
the bottom wall of the cushioning component has a heel portion, a midfoot portion, and a forefoot portion; and
the bottom portion of the outsole extends under the heel portion, the midfoot portion, and the bottom wall of the cushioning component, and extends forward of the forefoot portion of the bottom wall of the cushioning component.

16. The article of footwear of claim 1, wherein the sole structure further includes a forefoot component disposed forward of the cushioning component such that the cushioning component comprises a rearward part of a forefoot portion of the sole structure and the forefoot component comprises a forward part of the forefoot portion of the sole structure.

17. The article of footwear of claim 16, wherein the outsole is bonded to the forefoot component.

18. The article of footwear of claim 16, wherein the sole structure further includes an additional midsole layer having a bottom surface supported on the top wall of the cushioning component and on the forefoot component.

19. The article of footwear of claim 18, wherein both the forefoot component and the additional midsole layer are foam.

* * * * *